United States Patent
Iwasaki et al.

(10) Patent No.: US 12,209,971 B2
(45) Date of Patent: Jan. 28, 2025

(54) FOREIGN SUBSTANCE/DEFECT INSPECTION DEVICE, IMAGE GENERATION DEVICE IN FOREIGN SUBSTANCE/DEFECT INSPECTION, AND FOREIGN SUBSTANCE/DEFECT INSPECTION METHOD

(71) Applicant: VIENEX CORPORATION, Kanoji (JP)

(72) Inventors: Osamu Iwasaki, Kanoji (JP); Yukihiro Kagawa, Kanoji (JP)

(73) Assignee: VIENEX CORPORATION, Kagawa (JP)

( * ) Notice: Subject to any disclaimer, the term of this patent is extended or adjusted under 35 U.S.C. 154(b) by 224 days.

(21) Appl. No.: 18/011,521

(22) PCT Filed: Jun. 15, 2021

(86) PCT No.: PCT/JP2021/022599
§ 371 (c)(1),
(2) Date: Dec. 19, 2022

(87) PCT Pub. No.: WO2022/034736
PCT Pub. Date: Feb. 17, 2022

(65) Prior Publication Data
US 2023/0314334 A1 Oct. 5, 2023

(30) Foreign Application Priority Data
Aug. 11, 2020 (JP) .................................. 2020-135738

(51) Int. Cl.
*G01N 21/88* (2006.01)
*G01N 21/94* (2006.01)
(Continued)

(52) U.S. Cl.
CPC ......... *G01N 21/8806* (2013.01); *G01N 21/94* (2013.01); *H04N 23/56* (2023.01);
(Continued)

(58) Field of Classification Search
CPC ............... G01N 21/8806; G01N 21/94; G01N 2201/0633; G01N 2201/0826;
(Continued)

(56) References Cited

U.S. PATENT DOCUMENTS

2004/0252295 A1* 12/2004 Miyakawa ......... G01N 21/9501
356/237.2
2010/0046826 A1* 2/2010 Dirix ..................... B07C 5/3422
382/141
(Continued)

FOREIGN PATENT DOCUMENTS

JP 3-134609 A 6/1991
JP 2006-090728 A 4/2006
(Continued)

OTHER PUBLICATIONS

PCT/2021/022599, International Search Report and Written Opinion dated Aug. 19, 2021, 7 pages—Japanese, 4 pages—English.

*Primary Examiner* — Jared Walker
(74) *Attorney, Agent, or Firm* — Andrew F. Young, ESQ.; NOLTE LACKENBACH SIEGEL

(57) ABSTRACT

One pixel unit including at least one light receiving element of a light receiving element array (photodiode array) and a light source have a one-to-one correspondence, and only when the light source emits light, the light beam is detected by at least one light receiving element (one pixel unit) corresponding to the light source. An illumination optical system includes a light guiding means for guiding to an inspection object by reducing an interval between optical axes of light beams emitted from a plurality of light sources
(Continued)

in an arrangement direction of a plurality of the light sources.

21 Claims, 58 Drawing Sheets

(51) Int. Cl.
    *H04N 23/56*     (2023.01)
    *H04N 25/701*     (2023.01)

(52) U.S. Cl.
    CPC ... *H04N 25/701* (2023.01); *G01N 2201/0633* (2013.01); *G01N 2201/0826* (2013.01)

(58) Field of Classification Search
    CPC ......... G01N 2021/4745; G01N 21/474; G01N 21/8851; G01N 21/8901; G01N 21/896; G01N 21/8422; G01N 2021/8816; G01N 2021/8835; G01N 2021/8838; G01N 2021/8845; G01N 2021/8858; G01N 2021/8887; G01N 2201/08; H04N 23/56; H04N 25/701

See application file for complete search history.

(56) References Cited

U.S. PATENT DOCUMENTS

| | | | |
|---|---|---|---|
| 2013/0016346 A1* | 1/2013 | Romanovsky | G01N 21/8806 356/237.5 |
| 2016/0161750 A1* | 6/2016 | Kirshner | G06T 7/32 250/201.1 |
| 2016/0327493 A1* | 11/2016 | Sullivan | G02B 27/0944 |
| 2019/0265171 A1* | 8/2019 | Kato | G01B 11/2527 |

FOREIGN PATENT DOCUMENTS

| | | |
|---|---|---|
| JP | 2010-271133 A | 12/2010 |
| JP | 2015-219090 A | 12/2015 |
| JP | 6451980 B2 | 1/2019 |
| JP | 2019-144203 A | 8/2019 |

* cited by examiner

SOLID LINE: LIGHT SOURCE SIDE END PORTION, DOTTED LINE: CENTRAL PORTION, ONE DOT CHAIN LINE: LIGHT RECEIVING ELEMENT SIDE END PORTION

FOREIGN SUBSTANCE/DEFECT INSPECTION DEVICE, IMAGE GENERATION DEVICE IN FOREIGN SUBSTANCE/DEFECT INSPECTION, AND FOREIGN SUBSTANCE/DEFECT INSPECTION METHOD

CROSS REFERENCE TO RELATED APPLICATIONS

This application relates to and claims priority from PCT Ser. no.: PCT/JP2021/022599 filed Jun. 15, 2021, the entire contents of which are incorporated herein by reference, which in turn claims priority to JP Ser. no.: 2020-135738 filed Aug. 11, 2020.

TECHNICAL FIELD

The present invention relates to an inspection method and an inspection device for a foreign substance in a light scattering transmissive medium or a scratch, unevenness, defect, missing, or attached foreign substance in a thick inspection object, and an image generation device for a detected foreign substance.

BACKGROUND ART

Conventionally, a system employed in a surface inspection device mainly using a light source in a visible range is an inspection system typified by a combination of a line sensor camera, a contact-type image sensor (hereinafter referred to as CIS), or a scanning optical system by or a laser beam and a light receiving optical system including a photoelectric conversion element (photomultiplier, avalanche photodiode, CCD sensor, CMOS sensor, and the like) and a light guide. Many of the systems are of a reflection type that receives reflected light or fluorescence from scratches, unevenness, defects, missing, attached foreign substances, or the like on an inspection object.

On the other hand, in a transmitting type in which a light receiving system and an illumination system are arranged to face each other with an inspection object interposed between them, the inspection object is often transparent, thin, and has high transmittance. Then, in a thick inspection object, a system that detects a foreign substance, a scratch, a defect, or the like included in the inspection object is rare.

An X-ray inspection device with excellent transmitting property, which is well-known as a non-destructive inspection device, uses an X-ray which is a radiation, and thus, it is necessary to provide a radiation control area, and it is also necessary to control an exposure dose of a person to a radiation. That is, there are difficulties in determining an installation place. Moreover, due to its large size and heavy weight, it is not easy to additionally introduce the X-ray inspection device to existing production lines in factories. Further, since cost is high, it is not possible to provide many inspection points.

Further, in many cases, foreign substances, defects, scratches, and the like transmit an X-ray itself having excellent transmittance, and the X-ray inspection device cannot distinguish between them.

In an inspection device using a wavelength other than that of X-rays, in a case where the transmitting medium has light scattering property, a detection device for detecting a foreign substance, a scratch, a defect, a missing, or the like contained in the transmitting medium is not realized.

The present invention assumes use of a light source other than that of X-rays in consideration of convenience of installation, danger to a human body, installation equipment cost, and the like in considering introduction to a site as well as technical problems.

Patent Document 1 shows a means for detecting depressions and folds of a film by scanning with a laser beam as illumination light in a main scanning direction.

In Patent Document 2, by shifting an optical axis of an illumination optical system and an optical axis of a light receiving optical system, transmitted light of an inspection object is prevented from being buried in direct light from the illumination optical system or ambient light. That is, Patent Document 2 is a method of irradiating an inspection object with light and using information included in a shadow of transmitted light in order to detect a foreign substance, a defect, or the like inside the inspection object, and at that time, a device is made to more easily detect a foreign substance and a defect by preventing a component such as disturbance light that becomes noise from being mixed into a signal from the foreign substance and the defect in the vicinity of a surface of the inspection object.

Patent Document 3 shows that noise is canceled by acquiring a plurality of images in which shifting of polarization axes on the illumination side and the light receiving side is changed using polarized light, and applying processing such as difference after contrast adjustment, and accurate foreign substance and defect detection inside an inspection object can be realized.

Patent Document 4 shows that a transmission image can be obtained by matching optical axes of a laser beam scanning optical system and a light receiving optical system that receives light transmitted through a sample.

PRIOR ART DOCUMENT

Patent Documents

Patent Document 1: Japanese Patent Application Laid-Open No. 2010-271133
Patent Document 2: Japanese Patent Application Laid-Open No. 2015-219090
Patent Document 3: Japanese Patent No. 6451980
Patent Document 4: Japanese Patent Application Laid-Open No. 3-134609

SUMMARY OF THE INVENTION

Problems to be Solved by the Invention

In Patent Document 1, scratches and unevenness on a surface of an inspection object are mainly detected. Many inspection objects are thin materials such as a film and can be inspected with a CIS having a small depth of field. However, when an inspection object is a thick object having large surface unevenness or inspection is performed for a wiring pattern such as a laminated electronic substrate, it is difficult to perform detection with a conventional CIS having only a depth of field of 1 to 2 mm (millimeters). It is necessary to newly provide an inspection device including a light receiving optical system having a large depth of field and a long operation distance (hereinafter referred to as WD.)

An optical system having a large depth of field is mainly a telecentric optical system, and a line sensor camera including the optical system is mainly used. However, the telecentric optical system has large dimensions, and is difficult to use for a narrow transportation path in a factory. Furthermore, when a transportation width of a production line of a factory is large, the telecentric optical system requires many cameras because the field of view is narrow. Therefore, there is also a disadvantage that introduction cost is high.

In the case of the optical system of Patent Document 2, in a case of detecting a foreign substance, a defect, a scratch, or the like in a transmitting medium having large light scattering property, since light in the vicinity of an optical axis of an illumination optical system is not used, an amount of light received by a light receiving optical system decreases, and, for transmitted light that can be detected, scattered light in an inspection object is mainly received. Therefore, disturbance light scattered by the inspection object itself becomes a dominant component of a signal component, and it is difficult to discriminate and detect net scattered light scattered by a foreign substance in a deep portion in the inspection object.

In the case of Patent Document 3, there is no problem in a case where light scattering property of a sample is small, but in a case where light scattering ability of an inspection object is large, since polarization information is lost due to depolarization due to scattering, a difference by shifting a polarization axis is less likely to appear, and it is difficult to detect foreign substances and defects in the inspection object which is a transmissive light scattering medium.

In the case of Patent Document 4, for a thick inspection object, even if a medium has a high total light transmittance, there is a case where optical axes of a laser beam scanning optical system and a light receiving optical system do not match with each other due to a factor of inhomogeneity of a minute refractive index in the medium, and a signal itself is not obtained, that is, there is a case where a foreign substance, a scratch, a defect, a missing, or the like is missed.

As described above, in the conventional technique, since the depth of field is generally small, for example, when an inspection object is a food inspection object or a circuit board having a thickness of 10 mm or more, information in a depth direction cannot be obtained, and as a result, there is a case where foreign substances, defects, scratches, missing, and the like cannot be detected. Alternatively, since a telecentric optical system having a large depth of field is large in size, it is difficult to arrange the telecentric optical system in a narrow place. Further, for example, in a case where foreign substance inspection is performed for all objects on a production line of a factory, the above-described detection method cannot detect a scratch or a defective portion of an electronic substrate, and there is a risk of overlooking the fact that a foreign substance is mixed particularly in food and the like and shipping the product.

As described above, since the conventional CIS has a small depth of field, information in a depth direction of a thick inspection object cannot be grasped, and reliability of the inspection cannot be secured. Further, in a conventional system other than the CIS, since a camera lens or a telecentric optical system is used, an increase in size cannot be avoided, and it is difficult to additionally introduce the system into an existing production line of a factory, and, in particular, it is impossible to additionally introduce the system into a narrow place.

A typical CIS is illustrated in FIG. 1, and a linear illumination optical system for a CIS is similarly illustrated in FIG. 2. FIG. 1 is a cross-sectional view in the vicinity of a central portion in a longitudinal direction of the CIS. FIG. 2 is a perspective view. A Z direction is a main scanning direction, and an X direction is a sub-scanning direction. A linear illumination light source 10 is an illumination optical system having light quantity distribution elongated in the main scanning direction.

In the CIS illustrated in FIG. 1, two housings 16 are arranged to face each other across a focal plane 20. In each of the housings 16, the linear illumination light source 10 for illuminating an inspection object on the focal plane 20 is provided. In one of the housings 16, a lens array 11 and a light receiving unit 12 are provided, and light from the illuminated inspection object is guided to the light receiving unit 12 by the lens array 11. The lens array 11 is an optical element that forms an image of light from the inspection object on the light receiving unit 12. In the CIS illustrated in FIG. 1, one of two of the linear illumination light sources 10 is arranged on the light receiving unit 12 side with respect to the focal plane 20, and the other is arranged on the opposite side to the light receiving unit 12 side.

The light receiving unit 12 is mounted on a substrate 13 fixed to one of the housings 16. Light having passed through the lens array 11 is received by a light receiving surface 12A of the light receiving unit 12, and a signal corresponding to an amount of received light is output from the light receiving unit 12. When the inspection object is conveyed in one direction X along the focal plane 20, light from the inspection object is continuously received by the light receiving unit 12, and an image (color image, fluorescence image, or the like) of the inspection object is obtained based on an output signal from the light receiving unit 12.

Light B3 emitted from one of the linear illumination light sources 10 passes through protective glass 14 fixed to the housing 16, is reflected by the reflecting member 17A provided on an inner surface of protective glass 14A fixed to the other one of the housings 16, and is guided to the focal plane 20. An ultraviolet light blocking filter (UV cut filter) 15 that prevents ultraviolet light from entering the light receiving unit 12 is provided at an optional position from the focal plane 20 to the light receiving unit 12. Further, a color filter 18 that allows visible light in a specific wavelength range to pass through is provided between the light receiving unit 12 and the ultraviolet light blocking filter 15. At a position facing a bottom surface of the linear illumination light source 10 in one of the housings 16, a substrate 5 for fixing a light source unit 103 (ultraviolet light source, visible light source, or the like) provided in the linear illumination light source 10 is installed.

The linear illumination light source 10 includes a transparent light guide body 101 extending along a longitudinal direction L, a light source unit 103 provided in the vicinity of one end surface in the longitudinal direction L, and a cover member 102 for holding each side surface of the light guide body 101. Light emitted from the light source unit 103 is incident on the light guide body 101, appropriately reflected by a light diffusion pattern P while propagating in the light guide body 101 and emitted from a light exit surface in an arrow direction to illuminate an inspection object as linear illumination light. However, in the illumination optical system, illumination light is diffused by the light guide body 101, and attenuation of an amount of received light in an optical axis direction becomes a problem in a thick inspection object having light scattering transmittance. Furthermore, the depth of field of the conventional CIS is small, and in a case where an inspection object is thick, it is difficult to perform an inspection in the entire thickness direction, and, since W.D. is narrow, the CIS comes into contact with the inspection object, and the inspection itself is not established in many cases. That is, in the conventional CIS optical system, it is very difficult to inspect a thick transmitting medium for foreign substances and defects, and it is even more difficult when the transmitting medium has light scattering property.

Means for Solving the Problems

As a result of intensive studies on the above problem, the inventor of the present application has found a means capable of detecting foreign substances, defects, scratches, missing, and the like even in an inspection object of a light scattering medium having thickness of 10 mm or more, and achieving thickness reduction and miniaturization as in a conventional CIS. Further, the inventor has also found that even when a transmitting medium that has large light scattering ability and is thick is an inspection object, foreign substances, defects, and the like in the inspection object can be detected. Specifically, there is provided a system in which a light beam or scattered light from a foreign substance/defect irradiated with the light beam is prevented from entering a pixel that is not irradiated with the light beam, and at the same time, an output signal is extracted from only at least one light receiving element of one pixel unit having a one-to-one correspondence with a light source, so that a crosstalk component between pixels is reduced as much as possible, and detection of a foreign substance, a defect, or the like in the inspection object can be accurately performed. In a case where at least one light receiving element of a light receiving optical system is set as a unit pixel, the unit pixel is switched to output only during a stay time for one pixel in scanning with a light beam that is light scanning illumination light passing through the pixel, and if a light beam or scattered light from a foreign substance/defect irradiated on the light beam is not incident on a pixel that is not irradiated with the light beam, it is possible to reduce a crosstalk component between pixels as much as possible and to accurately detect a foreign substance, a defect, or the like in the inspection object. Here, the stay time means a period during which a substantially central portion of the light beam crosses from one end portion to the other end portion of the one pixel. When an irradiation light beam diameter of the illumination optical system is made substantially the same in a depth direction of an inspection object and smaller than a pixel resolution of the light receiving optical system, a foreign substance, defect, scratch, missing, and the like in the inspection object can be substantially uniformly illuminated.

In the invention of the present application, in addition to the above-described arrangement of the light source and the light receiving element in one-to-one correspondence and a relationship between illumination and output of the light receiving element, a method capable of detecting with higher resolution is proposed. Specifically, an illumination optical system includes a light guiding means for guiding to an inspection object by reducing an interval between optical axes of light beams emitted from a plurality of light sources in an arrangement direction of a plurality of the light sources. In addition, a means for enlarging an interval between optical axes of light beams emitted from a plurality of light sources that is reduced once in accordance with the light receiving element may be included.

Effects of the Invention

According to the present invention, one pixel unit including at least one light receiving element of a light receiving element array (photodiode array) and a light source have a one-to-one correspondence, and only when the light source emits light, the light beam is detected by at least one light receiving element (one pixel unit) corresponding to the light source. For this reason, only one light beam that is collimated or further substantially concentrated is incident on a "foreign substance/defect" in an inspection object, and only scattered light is separated and detectable by a light receiving element, so that the "foreign substance/defect" can be detected with excellent S/N (extremely little crosstalk) even in an inspection object that has light scattering property and is thick. Further, the light guiding means enables detection with high resolution. In the present invention, an inspection object having light scattering property includes not only a light scattering transmissive medium but also a reflective medium. In the present invention, since a depth of field on the light source side is large, it is possible to perform a "foreign substance/defect" inspection even when a reflective medium or the like is an inspection object, and it is also possible to perform high-resolution inspection even when a thin inspection object such as a film moves in an optical axis direction in a place where vertical movement of a conveyance system in a process is intense.

MODE FOR CARRYING OUT THE INVENTION

Figure 1:
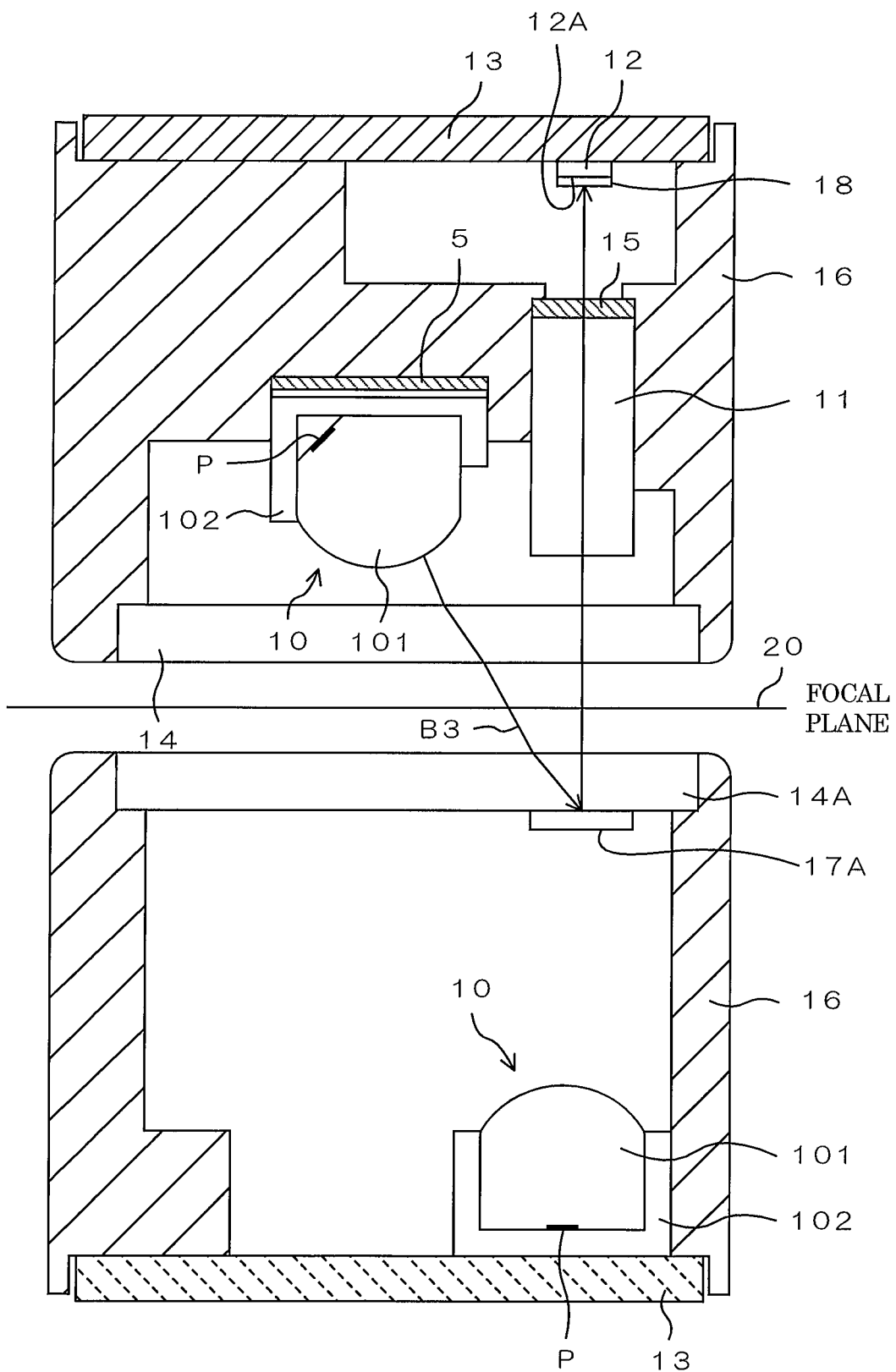
FIG. 1 is a cross-sectional view of a conventional CIS.
Figure 2:
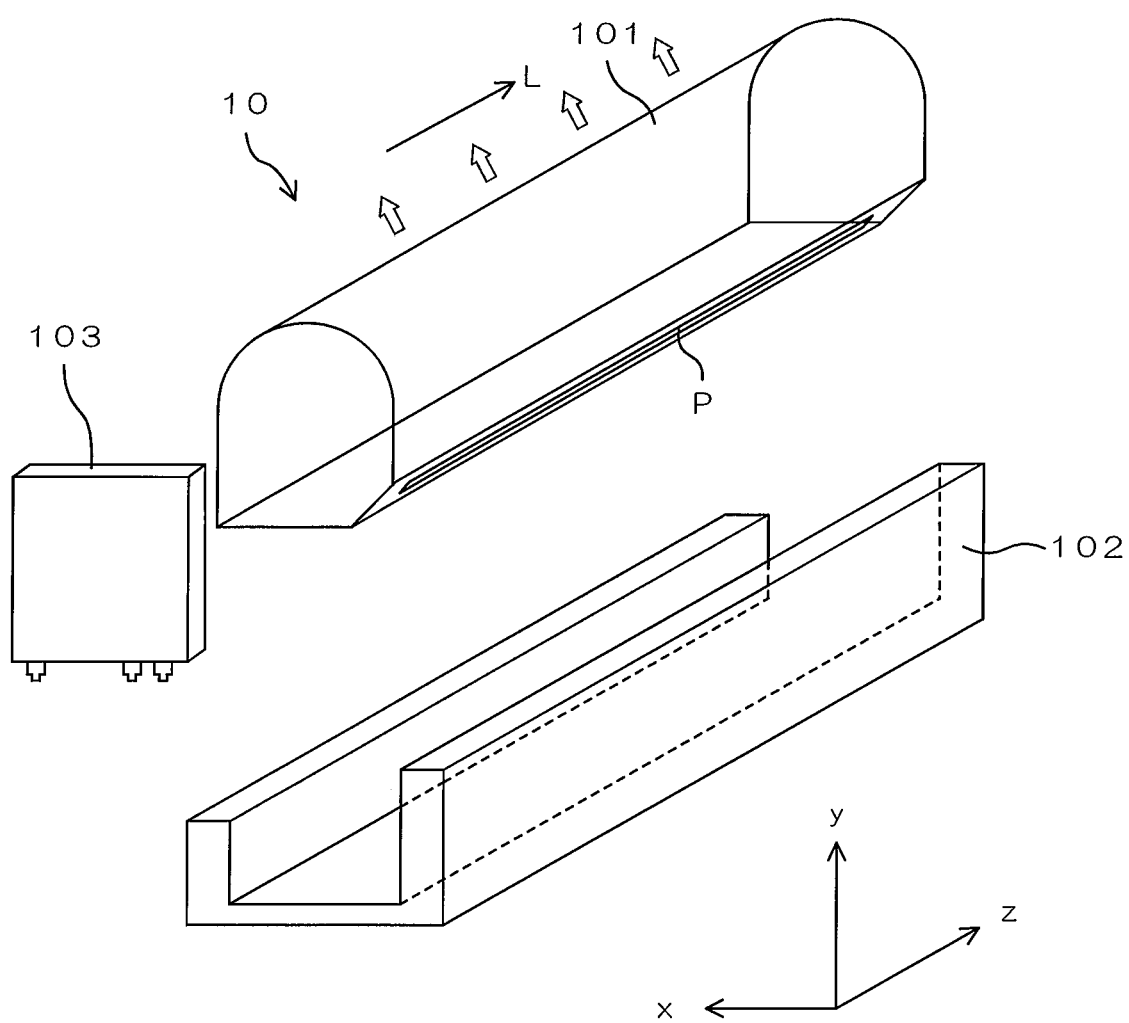
FIG. 2 is an exploded perspective view of a linear illumination optical system for the conventional CIS.
Figure 3A:
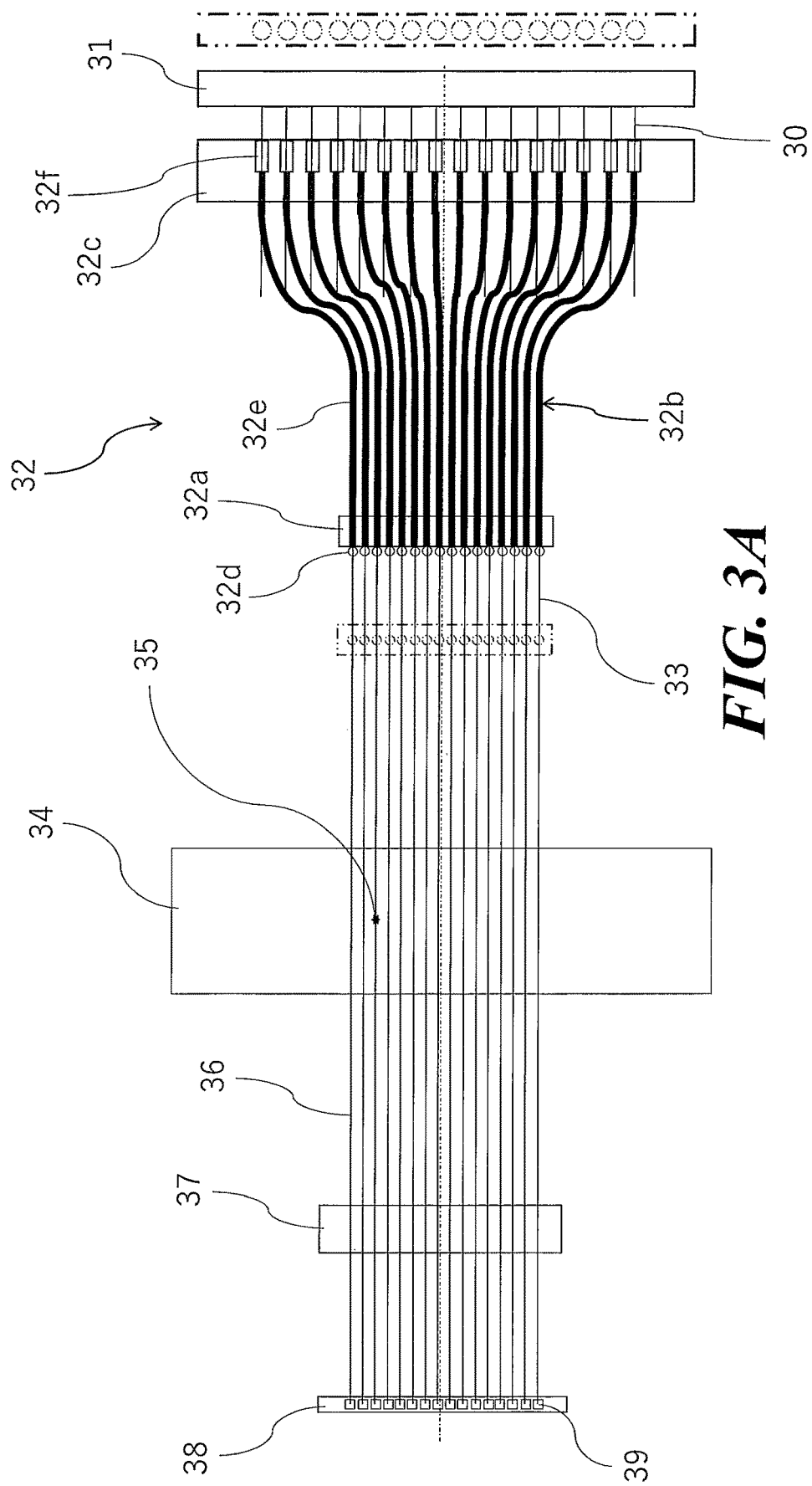
FIG. 3A is a schematic diagram illustrating a foreign substance/defect inspection device according to the present invention.

Hereinafter, in the present invention, the foreign substance and the scratch, unevenness, defect, missing, attached foreign substance, and the like in a thick inspection object as described above are simply referred to as "foreign substance/defect". FIG. 3A is a schematic diagram illustrating an example of a foreign substance/defect inspection device according to the present invention. However, it is also possible to provide an image generation device that processes a signal acquired by the foreign substance/defect inspection device into image information and outputs the image information.

Reference numeral 31 in FIG. 3A denotes a light source. In the light source 31, a plurality of laser diodes (LDs) or a plurality of LEDs are arranged to be separated in a line shape. The light source 31 indicated by a solid line in FIG. 3A is a side view, and a front view of the light source 31 is virtually indicated by a two-dot chain line on a side of the light source 31 indicated by the solid line. Light beams emitted from a plurality of the light sources 31 are guided to an inspection object 34 by a light guiding means 32.

The light guiding means 32 includes a collimator lens array 32a, an optical fiber array 32b, a lens array 32c, and the like. In the collimator lens array 32a, a plurality of collimator lenses 32d are arranged on a straight line. The number of the collimator lenses 32d arranged is the same as the number of the light sources 31, but an interval between the collimator lenses 32d adjacent to each other is smaller than an interval between the light sources 31 adjacent to each other. In the lens array 32c, a plurality of lenses 32f are arranged on a straight line. The number of the lenses 32f arranged is the same as the number of the light sources 31, and an interval between the lenses 32f adjacent to each other also coincides with an interval between the light sources 31 adjacent to each other. The optical fiber array 32b optically connects the collimator lens array 32a and the lens array 32c. Specifically, the optical fiber array 32b includes the same number of optical fibers 32e as the number of the light sources 31, and each of the optical fibers 32e is associated with each of the collimator lenses 32d and each of the lenses 32f on a one-to-one basis.

Each of the lenses 32f of the lens array 32c faces a position of each of the light sources 31. The lens array 32c is for guiding light from each of the light sources 31 to each of the optical fibers 32e, and each of the lenses 32f is arranged in substantially close contact with an incident side end surface of each of the optical fibers 32e. The lens 32f used in the lens array 32c is preferably a micro ball lens, a refractive index distribution lens, or the like. The optical fibers 32e are arranged and fixed in a line shape on the emission side, have a narrower interval than that on the incident side, and are at intervals equal to a pitch of light receiving elements in a light receiving element array 38 (photodiode array). That is, in a plurality of the optical fibers 32e on which light beams emitted from a plurality of the light sources 31 are incident, an interval between emission ends (end portions on the side of the collimator lens 32d) of the optical fibers 32e is smaller than an interval between incidence ends (end portions on the side of the lens) of the optical fibers 32e. By the above, an interval between optical axes of light beams emitted from a plurality of the light sources 31 can be reduced in an arrangement direction of a plurality of the light sources 31 for guiding to the inspection object 34.

Light emitted from each of the optical fibers 32e is transmitted through a collimator lens 32d including a micro lens such as a micro ball lens, for example, to become a collimated light beam. As described above, a plurality of the collimator lenses 32d collimate light emitted from each of the optical fibers 32e in one-to-one correspondence with an emission end of each of the optical fibers 32e. An arrangement direction of a plurality of the collimator lenses 32d arranged as many as a plurality of the light sources 31 coincides with an arrangement direction of light receiving elements. Since a pitch in an arrangement direction of the optical fibers 32e needs to be substantially the same as a pitch of the light receiving elements (photodiodes), the optical fibers 32e having a small outer diameter (cladding diameter or coating diameter) are preferable. Further, the light source 31 preferably has low coherence. Examples of the optical fiber 32e include a step index (SI) type, a graded index (GI) type, and a single mode type. Further, an arrangement direction of an illumination system and an arrangement direction of elements of a light receiving system are parallel.

An advantage of the above is that restriction in size of the light source 31 is reduced, and a line illumination system on the emission side can be arranged more densely than on the light source 31 side. Further, a measurement against heat dissipation is relatively easy, leading to an increase in the amount of light of an LD and an LED, operation stability, improvement in durability, and the like.

Light emitted from each of the optical fibers 32e is collimated by the collimator lens 32d and becomes substantially parallel beams 33 as many as the number of the light sources 31. The collimator lens array 32a indicated by a solid line in FIG. 3A is aside view, and a front view of the collimator lens array 32a is virtually indicated by a two-dot chain line on a side of the collimator lens array 32a indicated by a solid line. A plurality of the substantially parallel beams 33 are incident on an inspection object 34, and scattered light 36 scattered by a "foreign substance/defect" 35 in the inspection object 34 is captured in a depth of field of a light receiving lens array 37, concentrated at a focal position 39 of the light receiving lens array 37, and incident on a light receiving element array 38. The light receiving element array 38 is generally a line sensor having one line in a sub-scanning direction, but may be a line sensor or an area sensor having a plurality of lines in the sub-scanning direction. The light receiving lens array 37 is preferably a refractive index distribution lens array represented by a SELFOC lens but may be a lens array in which a plurality of other spherical lenses and the like are arranged linearly. Further, light collimated by the collimator lens 32d may be further substantially concentrated. Here, "substantially concentrated" is not limited to a configuration in which light emitted from the LED is concentrated and includes a case where a beam waist of a laser beam is formed using a converging lens or the like. Size (beam diameter) of a light beam collimated by the collimator lens 32d or a light beam obtained by further substantially concentrating the collimated light beam is preferably about 10 μm with which "foreign substance/defect" particles in a Mie scattering region can be supported to about 1000 μm with which "foreign substance/defect" particles in a geometric optical approximation region can be supported. However, light collimated by the collimator lens 32d may be adjusted to be narrowed or spread according to a depth and thickness of a light scattering transmissive medium.

In a case where there is no "foreign substance/defect" in an inspection object, light is incident on the light receiving lens array 37 as a substantially parallel beam, and thus, the light is not focused and radiated at the focal position 39 of the light receiving lens array 37, and in the light receiving element array (photodiode array) 38, direct light is attenuated and becomes a bias component. For this reason, in the light receiving element array (photodiode array) 38, only a signal component (fluctuation component) of the scattered light 36 due to the "foreign substance/defect" to which the bias component of the direct light is added or subtracted is detected.

Here, a method of suppressing a crosstalk component in the light receiving element array (photodiode array) 38 will be described. In a case where light sources are simultaneously turned on, light is linearly illuminated in an arrangement direction of the light receiving element array (photodiode array) 38. For this reason, in a situation where "foreign substances/defects" are arranged in the arrangement direction, the same light receiving element (photodiode) receives scattered light of the "foreign substances/defects" at different positions at the same time, and it becomes difficult to identify a position. That is, position detection resolution is lowered. A crosstalk prevention method is to make one light source correspond to one photodiode. That is, making a light source and a light receiving element (photodiode) correspond to each other on a one-to-one basis in one pixel unit is one of means for avoiding crosstalk. One pixel includes at least one light receiving element, and the configuration is not limited to a configuration in which one pixel includes one light receiving element, and one pixel may include a plurality of light receiving elements.

FIG. 3A will be described again. In FIG. 3A, a plurality of combinations of a light source and a light receiving element are provided on one inspection surface of an inspection object. In this case, it is preferable to perform scanning with a light beam in a main scanning direction (arrangement direction of a plurality of light sources) by sequentially turning on a plurality of the light sources so that adjacent light sources are not simultaneously turned on. At this time, a control unit (not illustrated) capable of individually controlling operation of each light source functions as a light scanning means for scanning with a light beam. The light scanning means, the light source 31, the light guiding means 32, and the like constitute an illumination optical system. On the other hand, the light receiving element array (photodiode array) 38 constitutes a light receiving optical system. Further, the light receiving lens array 37 constitutes a lens system that forms an image of light transmitted through an inspection surface of an inspection object on a light receiving element of the light receiving element array (photodiode array) 38, and the lens system is included in the light receiving optical system. A set of the illumination optical system and the light receiving optical system may be movable in an optical axis direction or may be a plurality of the illumination optical systems and the light receiving optical systems in which a depth of field does not overlap in the optical axis direction corresponding to a plurality of inspection surfaces. In a case where there are a plurality of the illumination optical systems, for example, a plurality of the light sources 31 arranged to be separated linearly may have a plurality of lines. In this case, a plurality of the linear light sources 31 having the same wavelength may be used, or the linear light sources 31 having a plurality of different wavelengths may be used. In a case where only the light receiving optical system does not overlap in the optical axis direction, various means for branching light to the light receiving optical system are used. For example, there is a method of using one or a plurality of optical elements such as abeam splitter. Alternatively, there is also a method in which each wavelength is separated by a dichroic mirror to determine a type of a foreign substance.

Figure 3B:
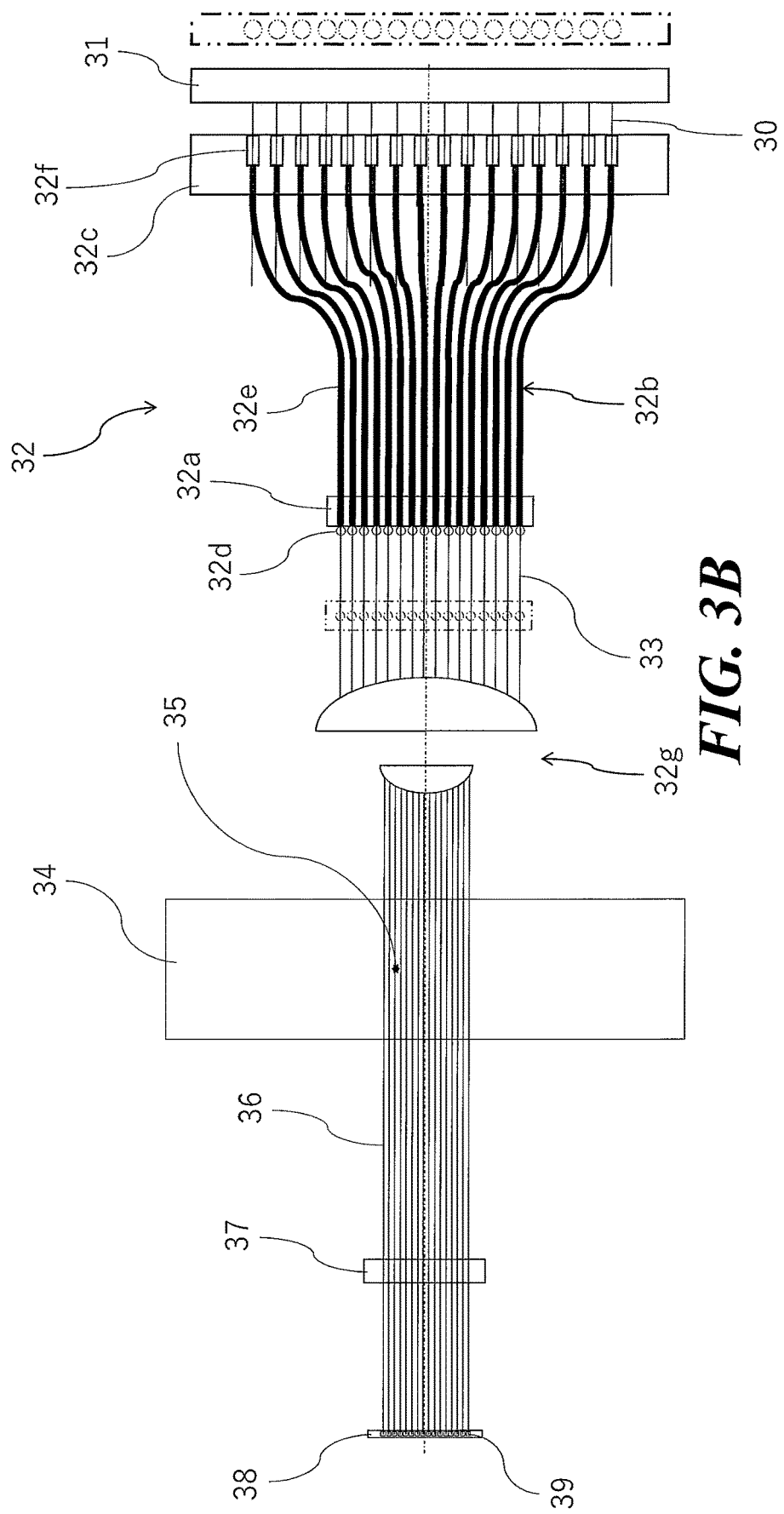
FIG. 3B is a schematic diagram illustrating a first variation of the foreign substance/defect inspection device.

FIG. 3B is a schematic diagram illustrating a first variation of the "foreign substance/defect" inspection device. FIG. 3B illustrates a structure in a case where a pitch of the light receiving element (photodiode) is further narrowed to further improve resolution. In this example, the light guiding means 32 includes a combination lens (reduction combination lens) 32g including a combination of a plurality of lenses.

The combination lens 32g is arranged between the optical fiber array 32b and the inspection object 34, more specifically, between the collimator lens array 32a and the inspection object 34. The combination lens 32g includes, for example, a set of cylindrical lenses including a combination of a convex type and a convex type. By the above, an interval between optical axes of light beams emitted through the combination lens 32g is smaller than an interval between optical axes of light beams incident on the combination lens 32g. As described above, a pitch of collimated light beams is appropriately reduced by the reduction magnification by a set of cylindrical lenses having different focal lengths and can be made equal to a pitch of higher-definition light receiving element array (photodiode array) with improved resolution.

Figure 3C:
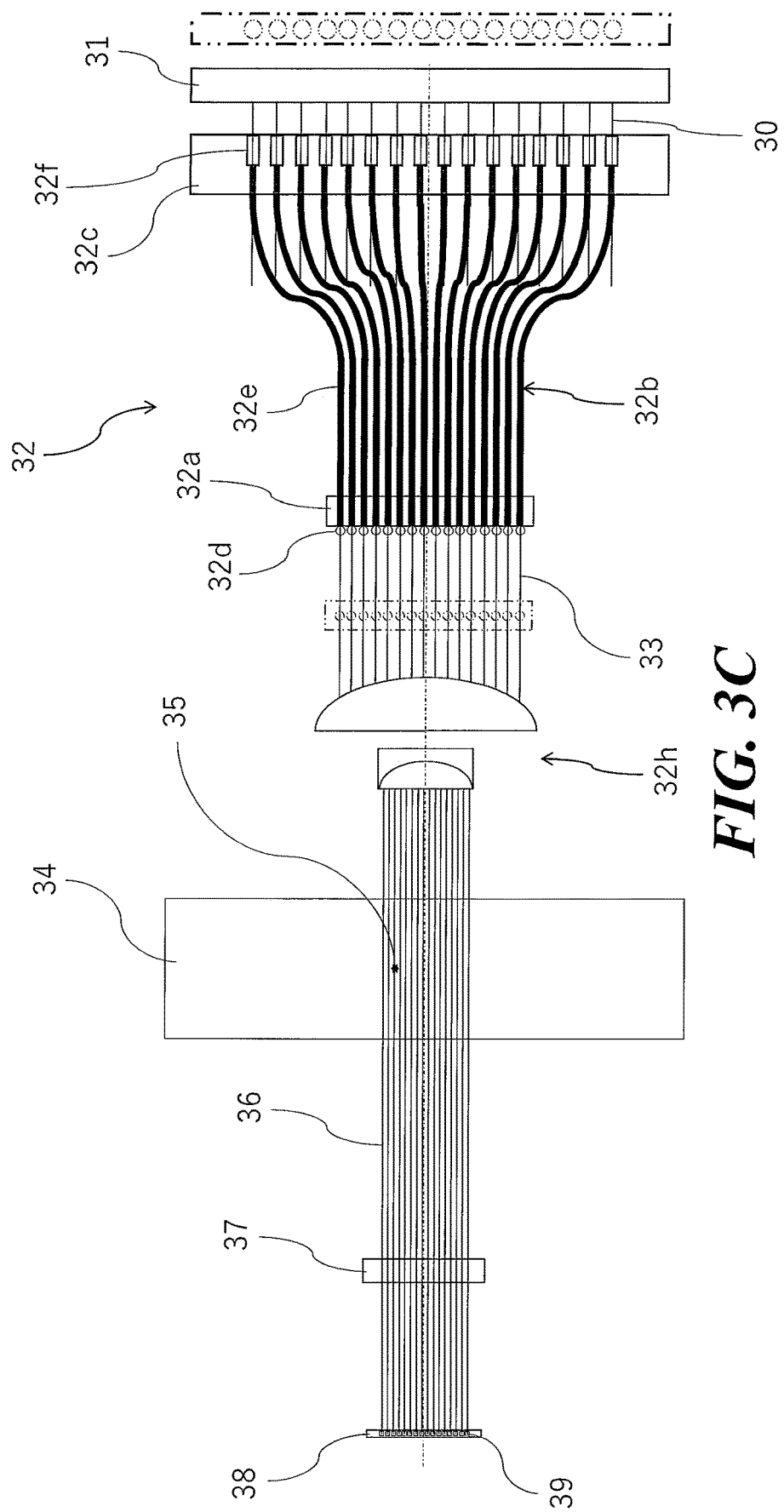
FIG. 3C is a schematic diagram illustrating a second variation of the foreign substance/defect inspection device.

FIG. 3C is a schematic diagram illustrating a second variation of the "foreign substance/defect" inspection device. As well as the case of FIG. 3B, FIG. 3C illustrates a structure in a case where a pitch of the light receiving element (photodiode) is further narrowed to further improve resolution. In this example, a combination lens (reduction combination lens) 32h included in the light guiding means 32 is not a combination of a convex type and a convex type, but a set of cylindrical lenses including a combination of a convex type and a concave type. A convex cylindrical lens is arranged on the collimator lens array 32a side, and a concave cylindrical lens is arranged on the inspection object 34 side. Even with such a configuration, an interval between optical axes of light beams emitted through the combination lens 32h can be made smaller than an interval between optical axes of light beams incident on the combination lens 32h.

In FIGS. 3A to 3C, the configuration using the optical fiber array 32b is described, but the present invention is not limited to such a configuration. At present, densification of LEDs is progressing as represented by LED printers, and 1200 dpi has already been achieved. By using this LED array, high resolution can be realized. That is, emitted light emitted from an LED array is preferably collimated, and the collimated light beam is preferably used instead of the light source of FIG. 3B or 3C. The lens array is an equal magnification imaging system of a refractive index distribution type lens in a case of an LED printer, but one of the refractive index distribution type lenses used in the present invention has a focus at infinity. Further, it is more preferable to use a high-density LD array such as a VCSEL. A specific example of the above system will be described below.

Figure 3D:
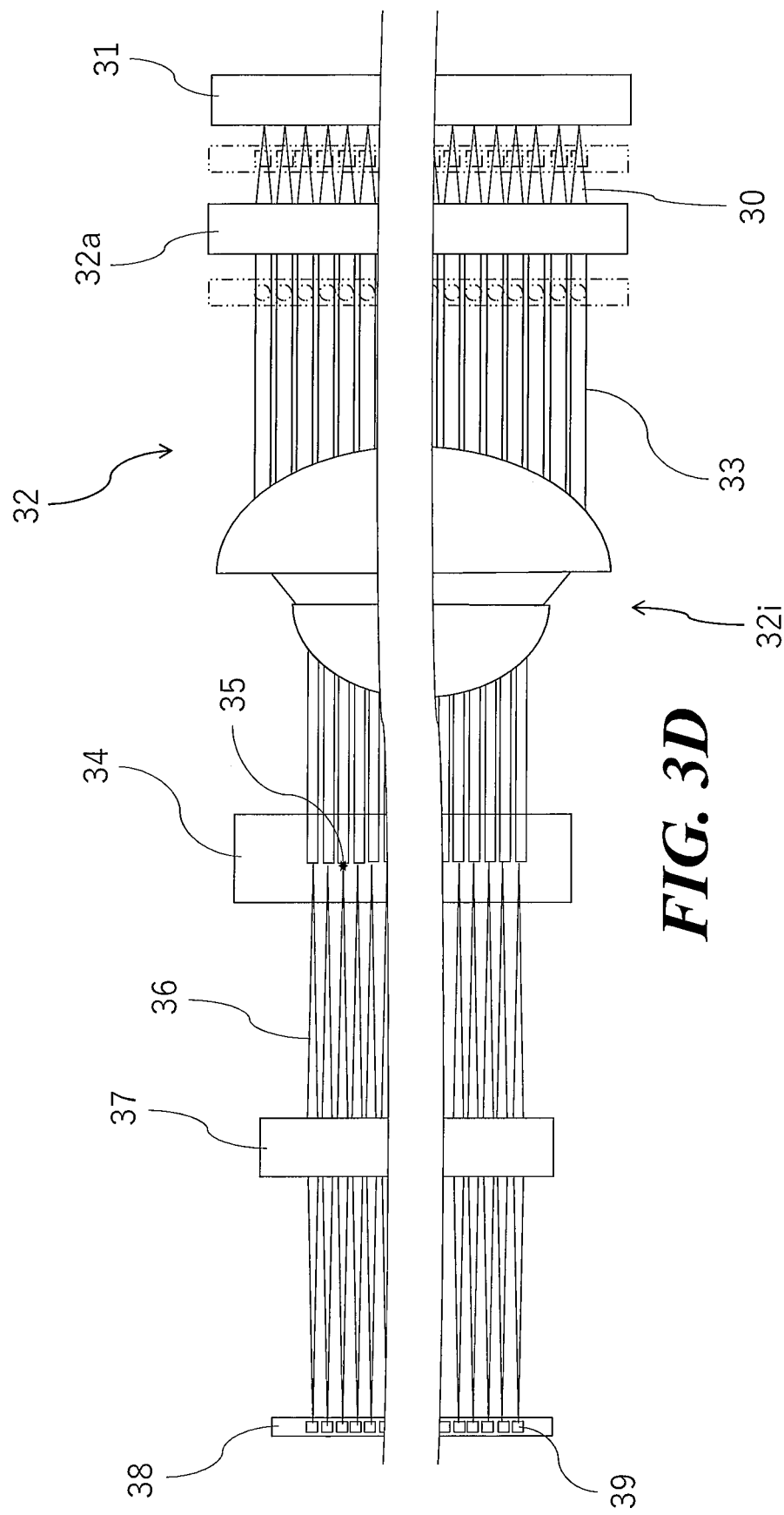
FIG. 3D is a schematic diagram illustrating a third variation of the foreign substance/defect inspection device.

FIG. 3D is a schematic diagram illustrating a third variation of the "foreign substance/defect" inspection device. In this example, by using a combination lens (reduction combination lens) 32i instead of the optical fiber array 32b, an interval between optical axes of light beams emitted from a plurality of the light sources 31 can be reduced in an arrangement direction of a plurality of the light sources 31 for guiding to the inspection object 4. That is, the light guiding means 32 includes a combination lens 32i including a combination of a plurality of lenses.

Reference numeral 31 denotes an LED or an LD array which is a light source. Reference numeral 32a denotes a collimator lens array. The light source 31 and the collimator lens array 32a indicated by solid lines in FIG. 3D are side views, and front views of the light source 31 and the collimator lens array 32a are virtually indicated by two-dot chain lines on sides of the light source 31 and the collimator lens array 32a indicated by solid lines. Reference numeral 34 denotes an inspection object, and reference numeral 35 denotes a foreign substance or a defect in the inspection object. Reference numeral 37 denotes a light receiving lens array. Reference numeral 38 denotes a light receiving element array (photodiode array). Further, reference numeral 30 denotes a light flux emitted from the light source 31, and reference numeral 33 denotes a collimated light beam emitted from the collimator lens array 32a. The collimated light beam 33 enters the inspection object 34, and then enters the "foreign substance/defect" 35. The light flux 33 incident on the "foreign substance/defect" 35 is scattered by the "foreign substance/defect" 35, becomes the scattered light 36, is incident on the light receiving lens array 37, and then is incident on the light receiving element array 38.

The combination lens 32i is arranged between a plurality of the light sources 31 and the inspection object 34, more specifically, between the collimator lens array 32a and the inspection object 34. The combination lens 32i includes, for example, a set of cylindrical lenses including a combination of a convex type and a convex type but may include a combination of a convex type and a concave type. By the above, an interval between optical axes of light beams emitted through the combination lens 32i is smaller than an interval between optical axes of light beams incident on the combination lens 32i.

Figure 3E:
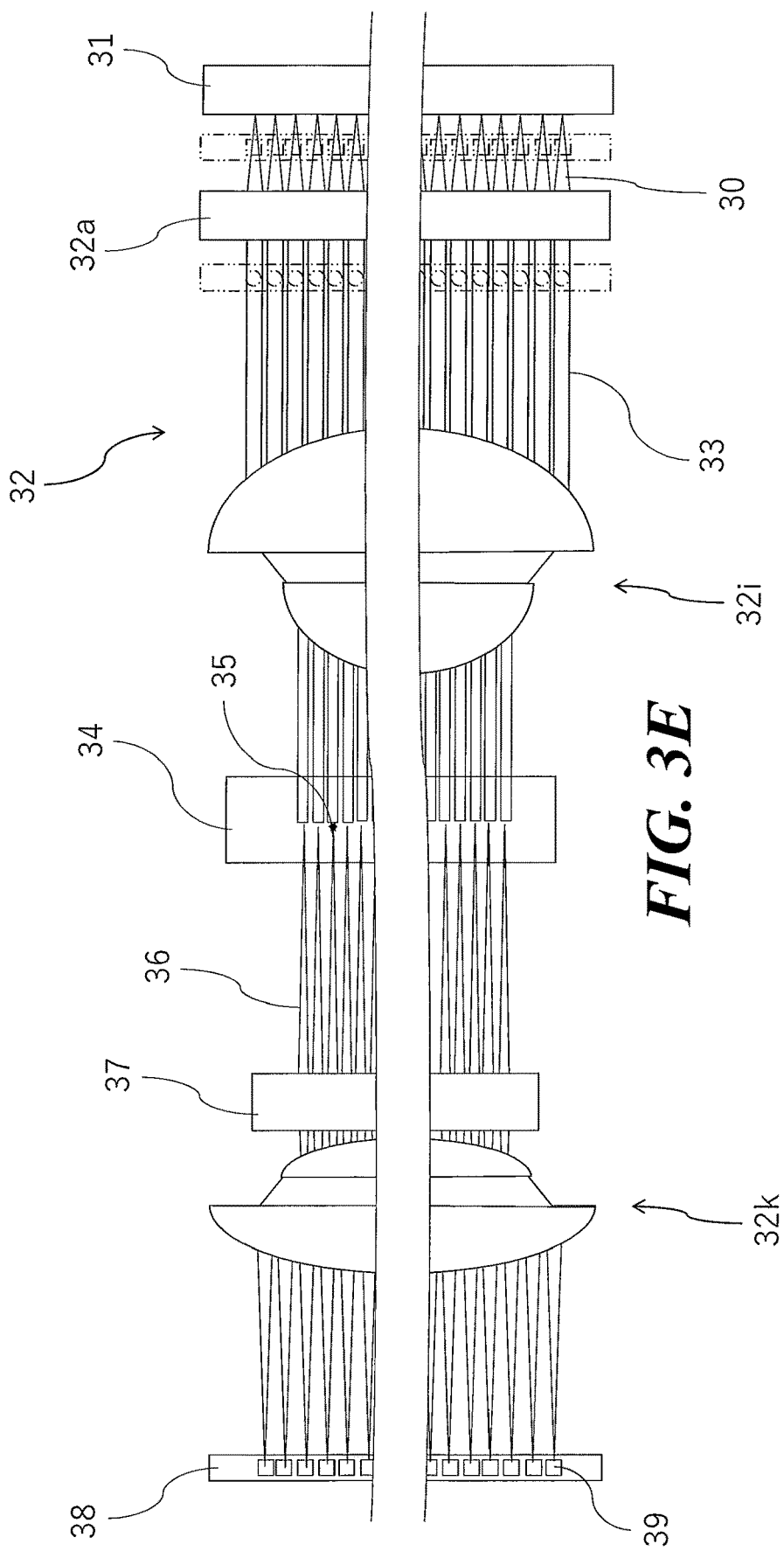
FIG. 3E is a schematic diagram illustrating a fourth variation of the foreign substance/defect inspection device.

FIG. 3E is a schematic diagram illustrating a fourth variation of the "foreign substance/defect" inspection device. In this example, a combination lens (enlargement combination lens) 32k is added to the configuration of FIG. 3D. However, it is also possible to add the combination lens 32k to the configuration of FIG. 3B or 3C instead of the configuration of FIG. 3D.

The combination lens 32k is arranged between the inspection object 34 and the light receiving element array 38, more specifically, between the inspection object 34 and the light receiving lens array 37. The combination lens 32k includes, for example, a set of cylindrical lenses including a combination of a convex type and a convex type but may include a combination of a convex type and a concave type. By the above, an interval between optical axes of light beams emitted through the combination lens 32k is larger than an interval between optical axes of light beams incident on the combination lens 32k.

As in this example, if a beam is compressed by a reduction optical system and expanded (beam interval is enlarged) after passing through a foreign substance, an interval between the light receiving elements can be widened. For this reason, since size of the light receiving element array can be increased, a light receiving area of the light receiving element array can be widened while resolution with respect to a foreign substance is secured, and as a result, S/N can be improved.

Each of a plurality of lenses constituting the combination lenses 32g, 32h, 32i, and 32k illustrated in FIGS. 3B to 3E has power in an arrangement direction of a plurality of the light sources 31. Here, the power of the lens is a reciprocal of a focal length and is a measure representing a refractive power of the lens. The combination lenses 32g, 32h, 32i, and 32k are configured by a combination of lenses having different powers. That is, a compression rate can be changed by a combination of a lens with high power and a lens with low power. For example, when a power ratio is 1:3, a compression ratio is 1/3, and a beam interval is 1/3.

The number of lenses constituting the combination lenses 32g, 32h, 32i, and 32k is not limited to two, and may be three or more. Further, the lens constituting the combination lens is not limited to a cylindrical lens and may be another reduction/enlargement optical element such as a fiber optical plate. Further, a combination of a cylindrical mirror and a cylindrical mirror having different power, a combination of a cylindrical mirror and a cylindrical lens having different power, or the like may be used, or various combinations of a spherical lens and a spherical mirror may be used. Other than the above, various lenses such as a Fresnel lens can be used.

Figure 20:
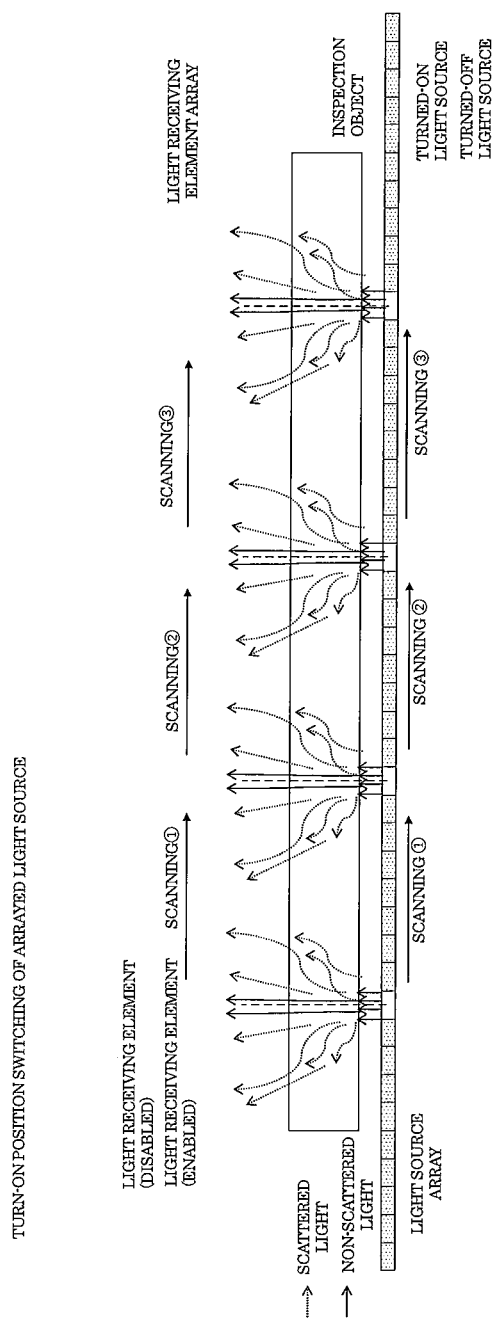
FIG. 20 is a schematic diagram illustrating a one-to-one correspondence between a plurality of light sources arranged in a main scanning direction and a plurality of pixels including at least one light receiving element.
Figure 22:
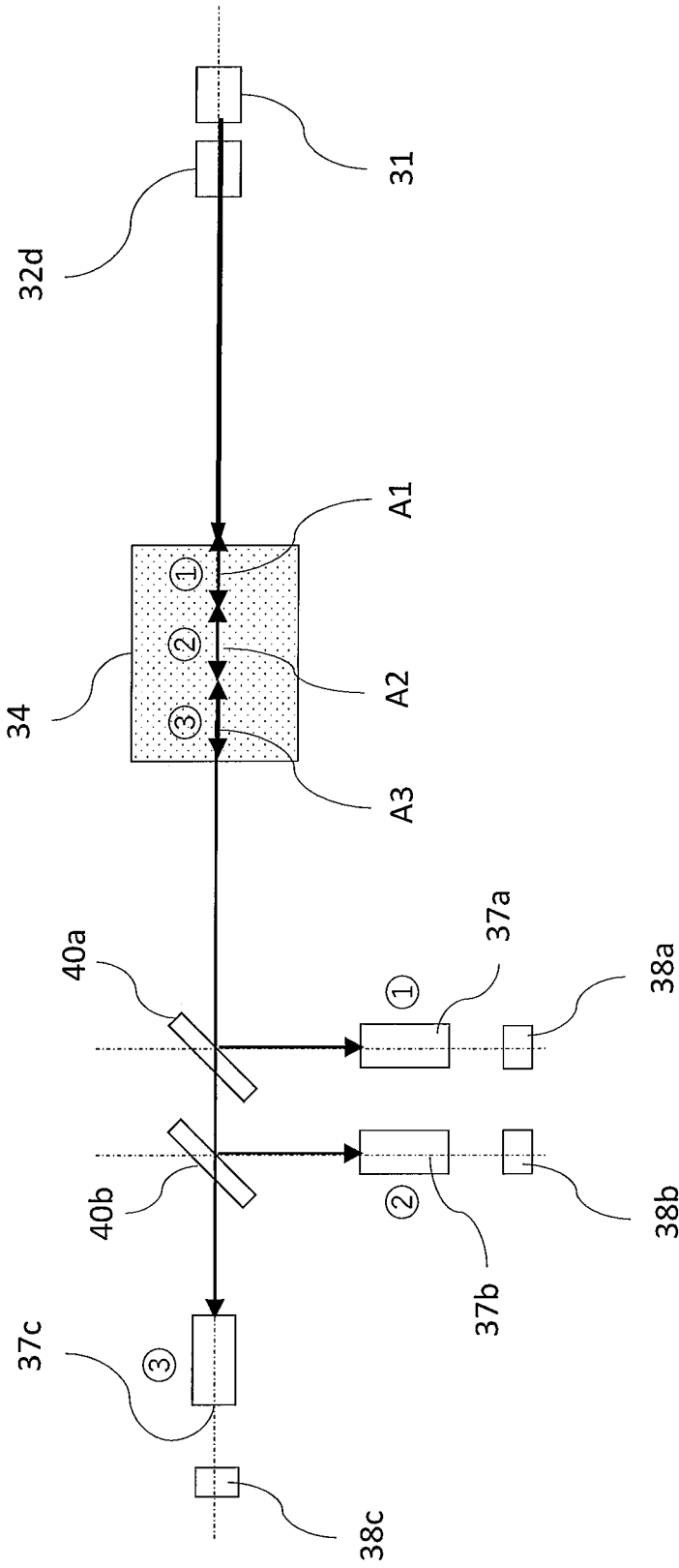
FIG. 22 illustrates a system in which in a case where an inspection object is thick and a depth of field of a light receiving lens array is smaller than thickness of the inspection object, a depth of field position is shifted in an optical axis direction, scattered light is branched by a beam splitter, and detection can be performed in the entire thickness direction of the inspection object.

Next, a method of branching with a beam splitter is illustrated in FIG. 22. FIG. 22 illustrates a system in which in a case where the inspection object 34 is thick and a depth of field of the light receiving lens array 37 is smaller than thickness of the inspection object 34, a depth of field position is shifted in an optical axis direction, scattered light is branched by beam splitters 40a and 40b, and detection can be performed in the entire thickness direction of the inspection object 34. In FIG. 22, three of light receiving lens arrays 37a, 37b, and 37c and light receiving element arrays 38a, 38b, and 38c, and two of the beam splitters 40a and 40b are provided. The inspection object 34 has a plurality of depth of field regions A1 to A3 in an optical axis direction. The light receiving lens array 37a and the light receiving element array 38a correspond to the depth of field region A1, the light receiving lens array 37b and the light receiving element array 38b correspond to the depth of field region A2, and the light receiving lens array 37c and the light receiving element array 38c correspond to the depth of field region A3. A part of light transmitted through the inspection object 34 is reflected by the beam splitter 40a, concentrated by the light receiving lens array 37a, and incident on the light receiving element array 38a. Further, a part of light having passed through the beam splitter 40a is reflected by the beam splitter 40b, concentrated by the light receiving lens array 37b, and incident on the light receiving element array 38b. Light having passed through the beam splitter 40b is concentrated by the light receiving lens array 37c and is incident on the light receiving element array 38c. The respective transmittance and reflectance of the beam splitters 40a and 40b are made equal to those of the light receiving element arrays 38a, 38b, and 38c. For example, as illustrated in FIG. 22, in a case of three branches, by setting the reflectance of the beam splitter 40a on which light is incident first to approximately 33% and the reflectance of the beam splitter 40b on which light is incident next to 50%, an amount of light incident on each of the light receiving element arrays 38a, 38b, and 38c can be made approximately 1:1:1, and S/N can be made approximately equal. It is preferable that a beam splitter does not have wavelength dependency and not use an interference effect. Here, the system of the present invention will be summarized once again. FIG. 20 is a schematic diagram illustrating that a plurality of light sources of the present invention has a one-to-one correspondence with a plurality of pixels including at least one light receiving element.

Figure 21:
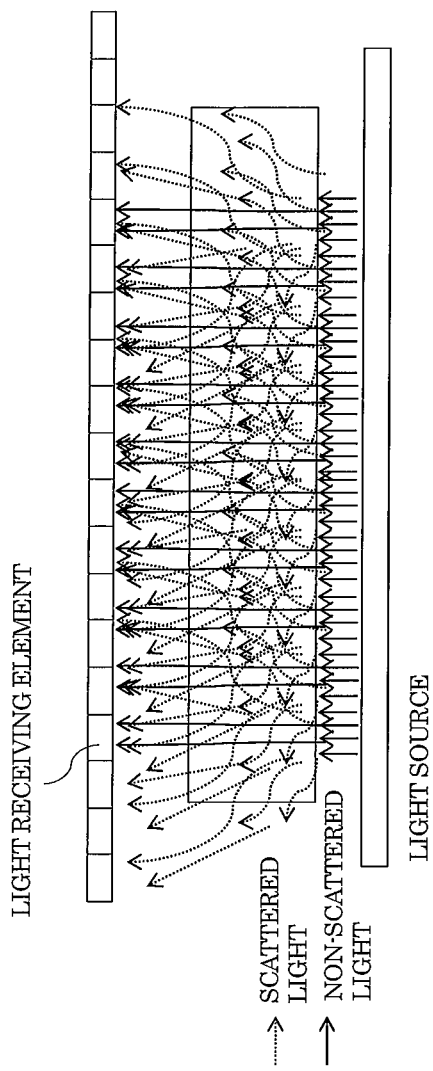
FIG. 21 is a conceptual diagram of an inspection method according to a conventional technique.

Next, FIG. 21 shows a conceptual diagram of an inspection method according to a conventional technique. However, a light receiving lens system is not illustrated for simplicity. A light source of the conventional technique of FIG. 21 illuminates the entire inspection object. Further, with respect to a light receiving element, light is divided into scattered light and non-scattered light directed directly to the light receiving element, and the non-scattered light contributes to foreign substance detection. However, it is not incident on a foreign substance and is mixed with the non-scattered light directed directly to the light receiving element from another path of the inspection object other than a foreign substance, and crosstalk is shown to occur.

On the other hand, in the case of FIG. 20, a plurality of light sources (light source arrays) arranged spaced apart in the main scanning direction have a one-to-one correspondence as appropriate. In the conceptual diagram illustrated in FIG. 20, since the light source and the light receiving element have a one-to-one correspondence, it can be seen that scattered light is less likely to be incident on the light receiving element, and crosstalk can be suppressed.

Figure 6A:
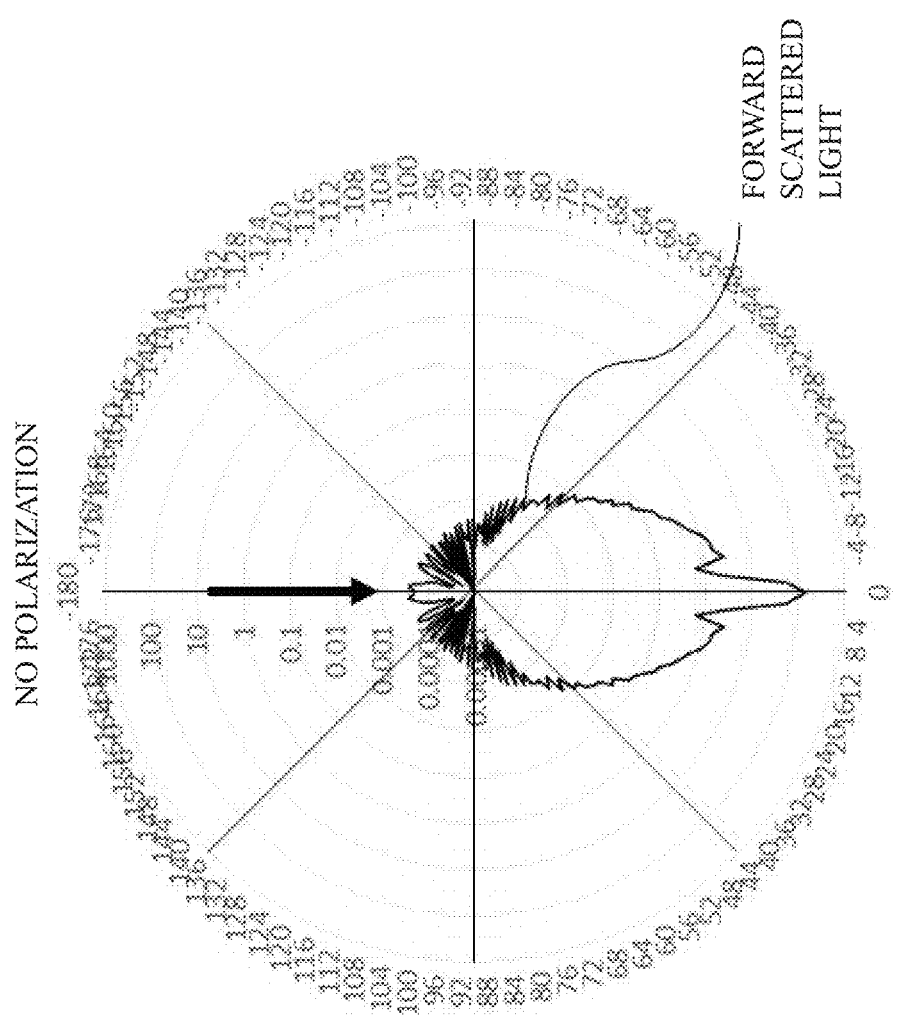
FIG. 6A is a graph showing forward scattering with particle size of 10 μm and shows Mie scattering in a case where a transmissive medium is polycarbonate and particles are silica (logarithmic scale).
Figure 6B:
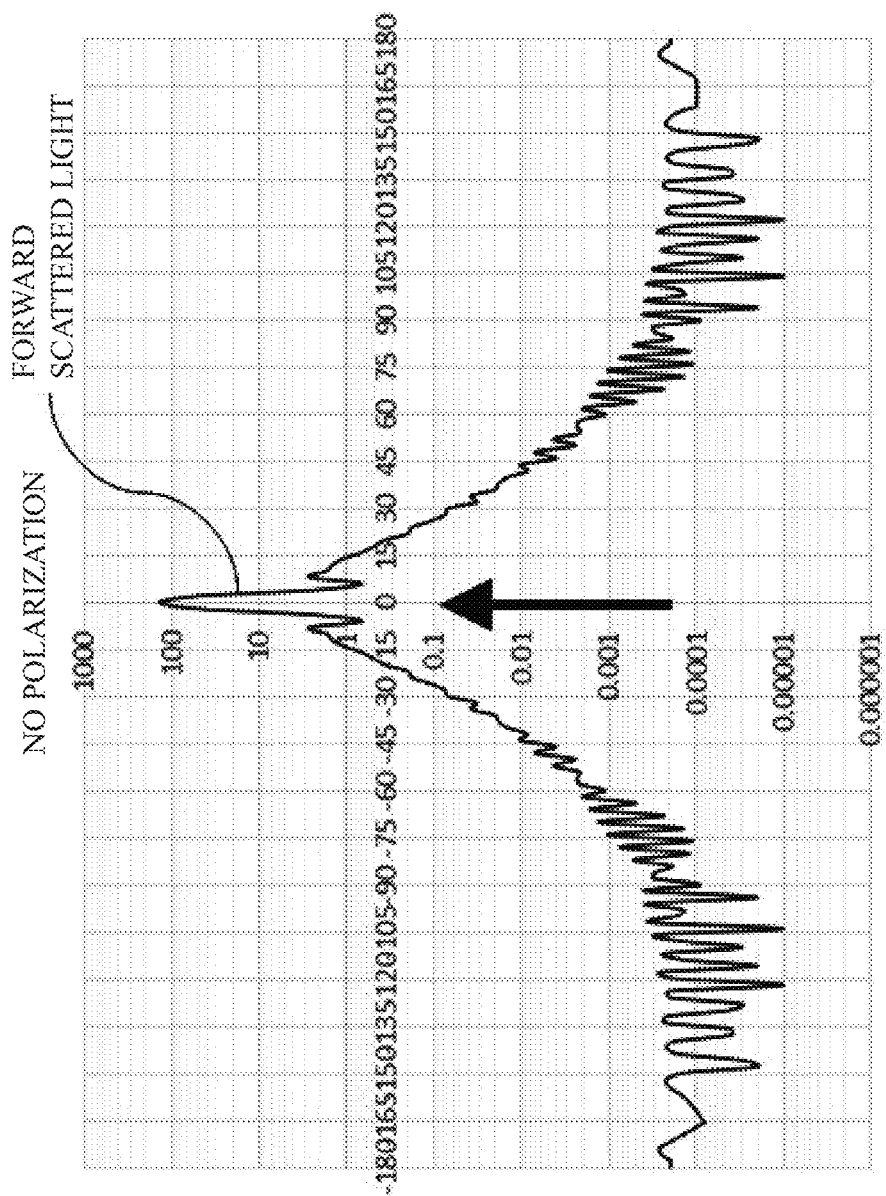
FIG. 6B is a graph showing forward scattering with particle size of 10 μm and shows Mie scattering in a case where a transmissive medium is polycarbonate and particles are silica (logarithmic scale).
Figure 6C:
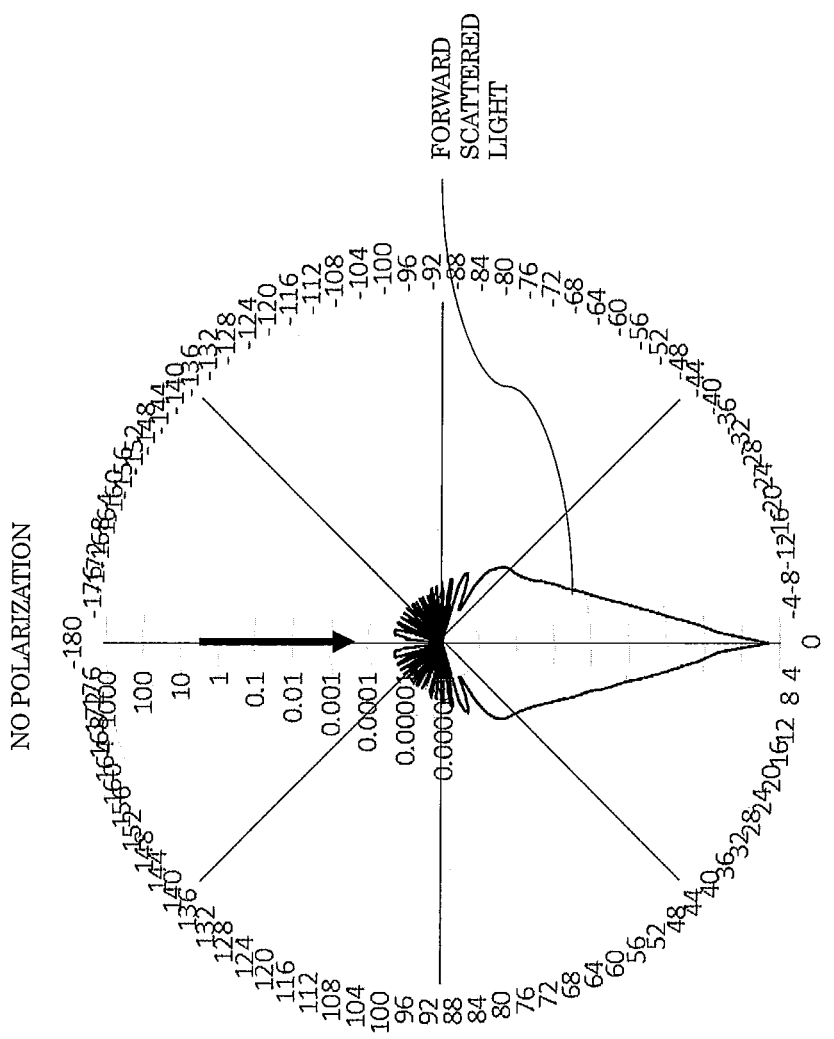
FIG. 6C is a graph showing forward scattering with particle size of 17 μm and shows Mie scattering in a case where a transmissive medium is polycarbonate and particles are silica (logarithmic scale).
Figure 6D:
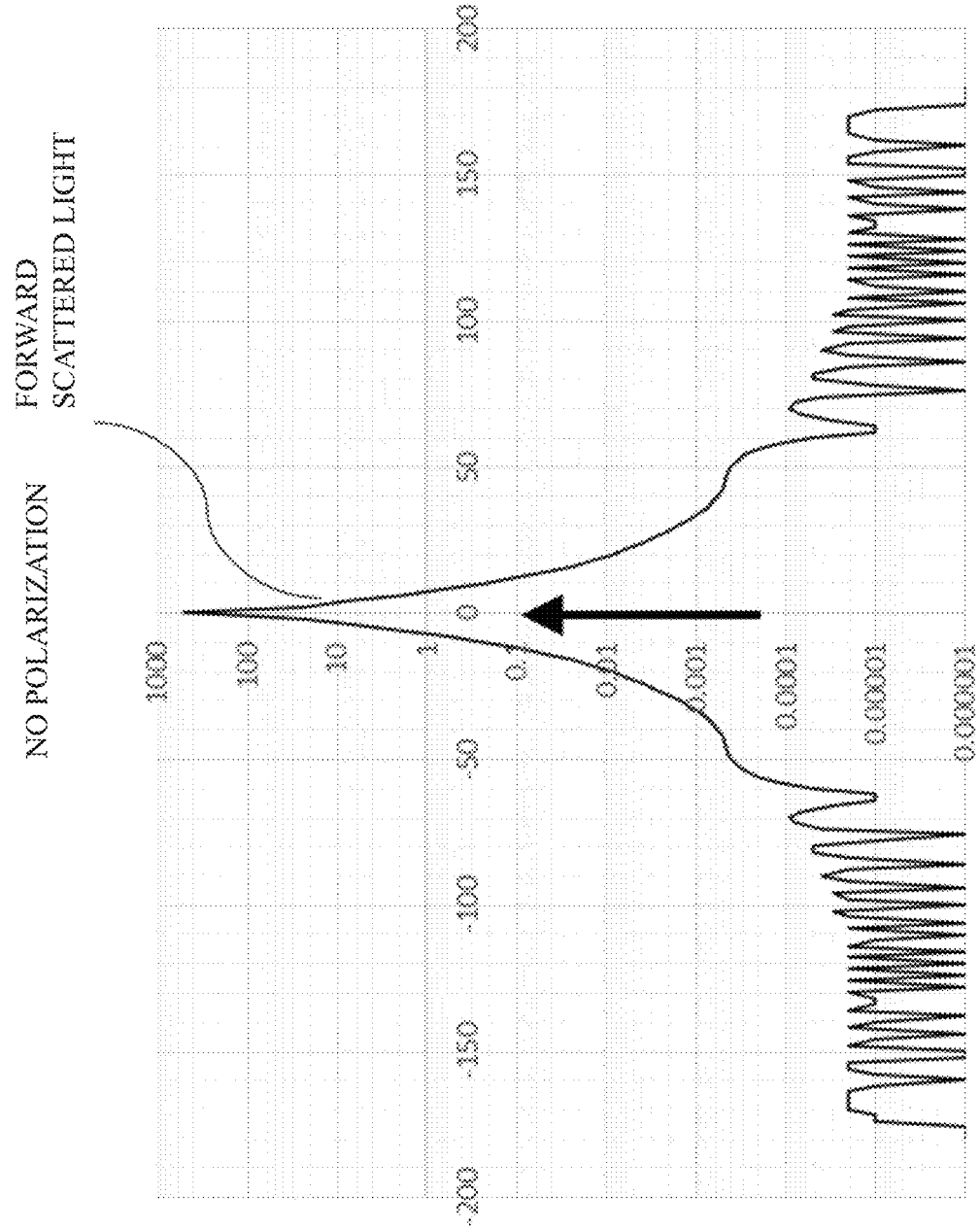
FIG. 6D is a graph showing forward scattering with particle size of 17 μm and shows Mie scattering in a case where a transmissive medium is polycarbonate and particles are silica (logarithmic scale).
Figure 6E:
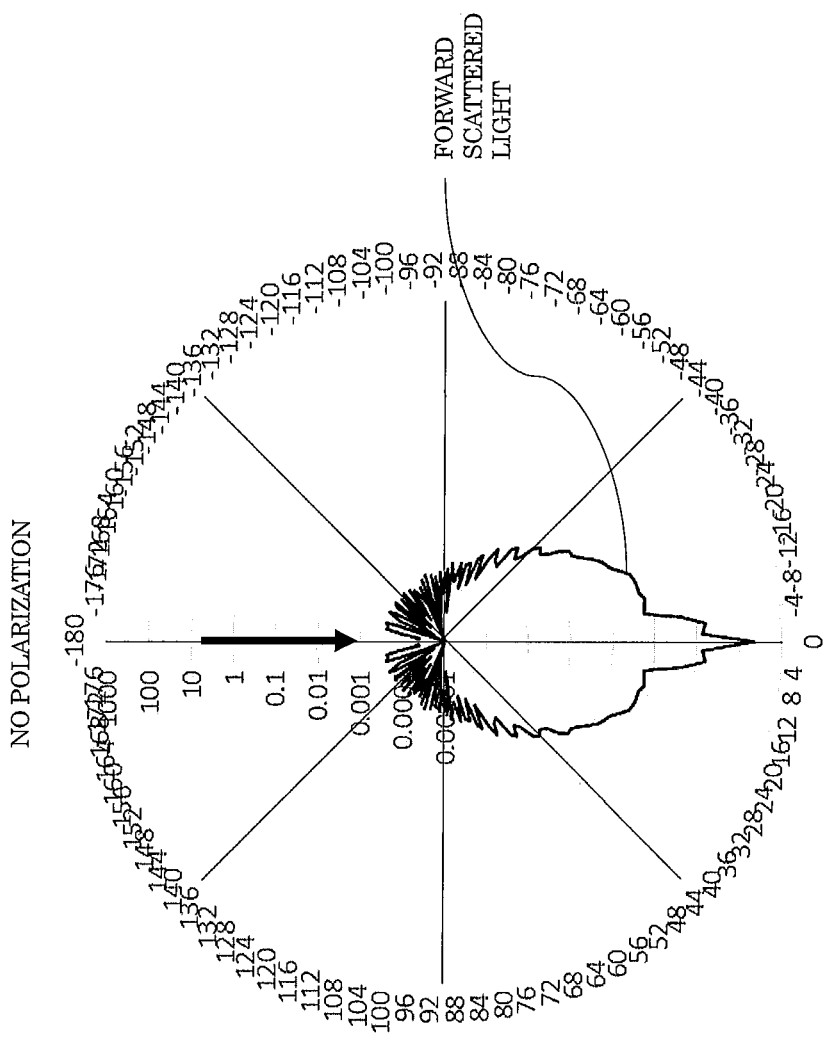
FIG. 6E is a graph showing forward scattering with particle size of 25 μm and shows Mie scattering in a case where a transmissive medium is polycarbonate and particles are silica (logarithmic scale).
Figure 6F:
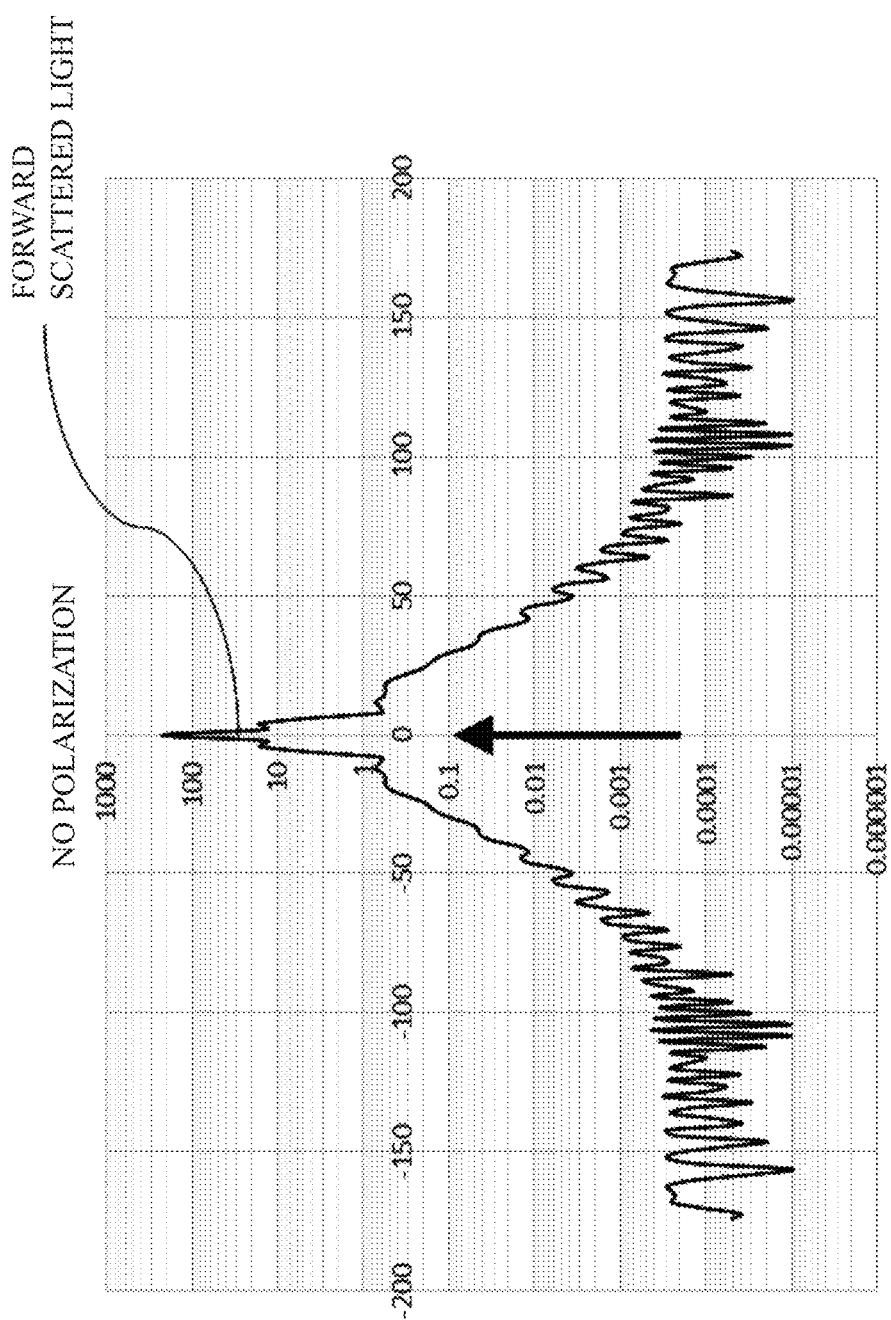
FIG. 6F is a graph showing forward scattering with particle size of 25 μm and shows Mie scattering in a case where a transmissive medium is polycarbonate and particles are silica (logarithmic scale).
Figure 6G:
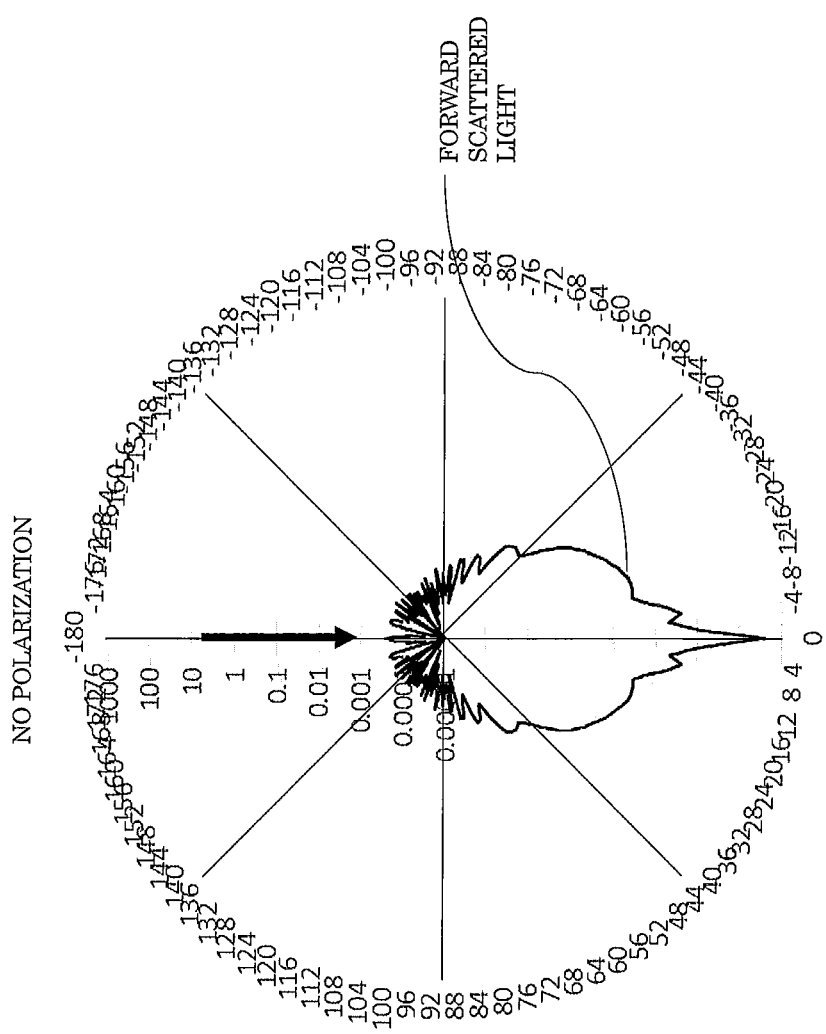
FIG. 6G is a graph showing forward scattering with particle size of 30 μm and shows Mie scattering in a case where a transmissive medium is polycarbonate and particles are silica (logarithmic scale).
Figure 6H:
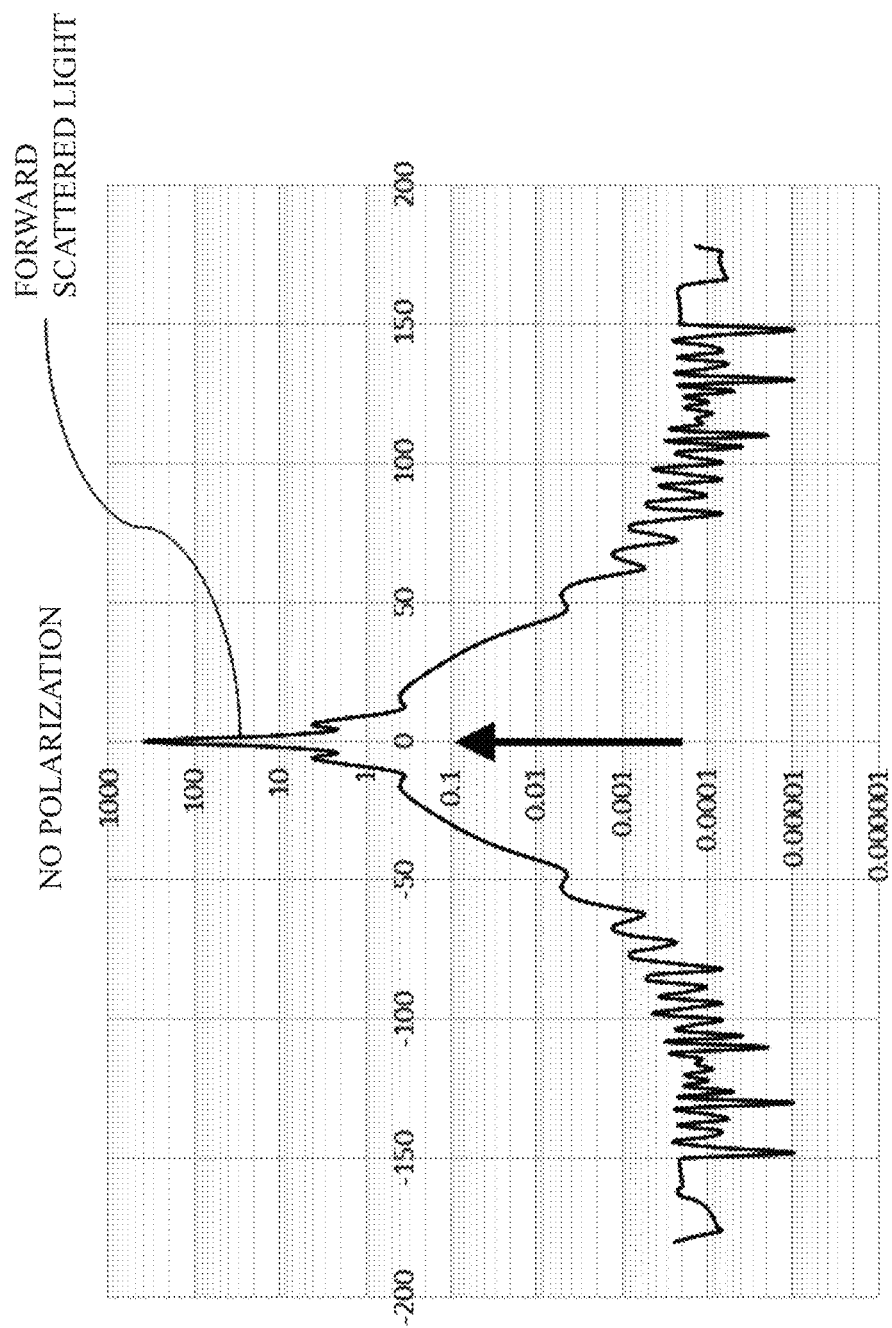
FIG. 6H is a graph showing forward scattering with particle size of 30 μm and shows Mie scattering in a case where a transmissive medium is polycarbonate and particles are silica (logarithmic scale).

Most of actual "foreign substances/defects" are not perfect spheres but are assumed to be typically spherical particles for simplification. In a case where a foreign substance has a particle diameter of about several 10 µm or less, scattering in a Mie scattering region occurs. Further, geometric optical approximation can be applied when a foreign substance has size of a raindrop of about several 100 µm. For example, a case of spherical particles having a diameter of 10 µm, a light scattering transmissive medium being resin, and a foreign substance being silica is considered. A wavelength of light of a light source is not limited to one wavelength, and an illumination light source having a plurality of wavelengths may be provided. Now, when a wavelength of light of a light source is λ=830 nm in a near infrared region, the resin at that time is polycarbonate, a relative refractive index is Nm=1.57, a foreign particle is silica, and a relative refractive index of the foreign substance is Np=1.45, forward scattering occurs. For particle size of about several 100 µm, if it is transmissive with respect to a light source wavelength, light is focused and diffused in a forward scattering manner by a lens effect, and if it is not transmissive, a shadow cast by a circle that is a geometric optical scattering cross-sectional area is created. The shadow is represented by intensity of light absorption/diffuse reflection and transmission and diffusion. Although it may be necessary to consider influence of diffraction due to an edge of a foreign particle, sensitivity to the contrast as to whether scattered light including diffraction is projected or a shadow is projected to a pixel only needs to be high. As an example, scattered light intensity of scattering of the spherical particle is shown in FIGS. 6A to 6D. FIGS. 6A and 6B are graphs showing forward scattering with particle size of 10 µm, and FIGS. 6C and 6D are graphs showing forward scattering with particle size of 17 µm and show Mie scattering when a transmissive medium is polycarbonate and particles are silica (logarithmic scale). It can be seen that intensity of forward scattered light is extremely strong. A zero-degree direction (direction of arrow) is a light traveling direction. Further, at the same time, it can also be seen that forward scattering power is about several times larger when particle size is 17 µm than when particle size is 10 µm. Furthermore, graphs showing forward scattering of foreign substance particles having particle size of 25 µm are shown in FIGS. 6E and 6F. However, a wavelength of incident light is λ=1.55 µm. Forward scattering intensity in this case lies between 10-µm and 17-µm particle size. Incidentally, 25-µm particle size is close to resolution of 1200 dpi (pixel resolution: about 21 µm), and 10-µm particle size is close to resolution of 2400 dpi (pixel resolution: slightly more than 10 µm). Further, FIGS. 6G and 6H are graphs showing Mie scattering of foreign particles having particle size of 30 µm when a wavelength of incident light of 1.55 µm. It is found that forward scattering intensity at particle size of 30 µm is about two times that in the case of particle size of 25 µm.

Figure 4A:
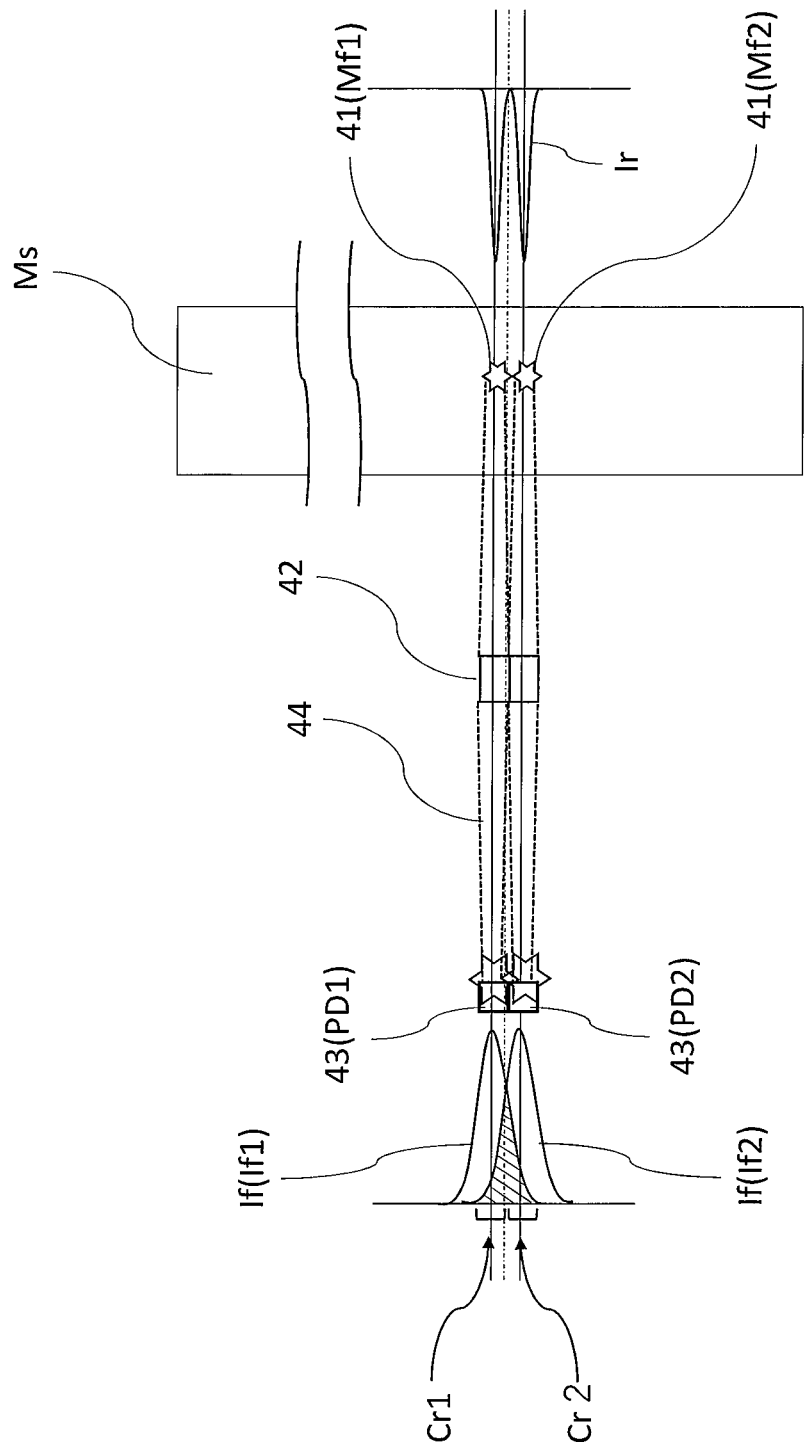
FIG. 4A is a diagram illustrating crosstalk of scattered light to an adjacent pixel according to the present invention.

Hereinafter, a method for suppressing a crosstalk component for scattered light in a Mie forward scattering region will be described in a simplified manner. First, description will be made with reference to FIG. 4A. FIG. 4A is a schematic diagram in which scattered light is received from "foreign substance/defect" and illustrates crosstalk of the scattered light to an adjacent pixel. A star-shaped mark 41 represents a foreign substance (defect). Scattered light from the foreign substance (defect) 41 is concentrated and forms an image on a light receiving element array (photodiode array) 43 by a light receiving lens array 42. FIG. 4A illustrates a case where a plurality of separate and independent light beams are simultaneously incident on a foreign substance.

A bell-shaped light intensity distribution waveform If on the left side of FIG. 4A represents intensity distribution of scattered light incident on the light receiving element array (photodiode array) 43. The scattered light incident on the light receiving element array (photodiode array) 43 is larger than an actual dimension of a "foreign substance/defect" due to influence of aberration and diffraction of a light receiving lens and forms an image in what is called a blurred state. That is, even if a dimension of one pixel of the light receiving element (photodiode) and a dimension of a "foreign substance/defect" are the same in an arrangement direction of the light receiving element array (photodiode array) 43, an image formation dimension of the "foreign substance/defect" on the light receiving element (photodiode) 43 becomes larger than the dimension of the "foreign substance/defect" due to influence of aberration and diffraction of the light receiving lens. An aperture angle of the light receiving lens is preferably sufficiently small with respect to an incident angle on the light receiving lens of scattered light generated by light scattering in light transmitted through an inspection surface of an inspection object, diffused light, or light having intensity of absorption/diffuse reflection and transmission and diffusion. For example, the aperture angle is preferably about 5 mrad to 15 mrad, and may be 1 mrad to 20 mrad according to desired W.D. As the aperture angle decreases, an amount of received light decreases, and thus it is necessary to relatively compensate with power on the light source side. Furthermore, since transmittance that depends on thickness of a light scattering transmitting medium is directly related to gain of a light receiving sensor, by employing a circuit configuration in which the light receiving sensor includes automatic gain control (referred to as AGC), it is possible to construct a light receiving system having excellent S/N and a wide dynamic range that do not depend on various transmittances. Further, at that time, for an optional pixel, a feedback system (signal processing circuit system) using an average value of output up to output immediately before output of the optional pixel can also be used. Further, at the same time, if two-dimensional analysis in a depth direction of an inspection object of comprehensive information (output data) of position-output information in which a signal is taken in for each line is simultaneously advanced, real-time inspection is also possible. In any case, S/N of a signal is further improved by adjustment to a maximum sensitivity range of the light receiving sensor in order to improve the S/N of the signal, and as a result, an application range in a "defect/foreign substance" inspection is widened. A bell-shaped light intensity distribution waveform Ir on the right side of FIG. 4A is intensity distribution of each light beam illuminating a foreign substance of the present invention. Comparing widths of the left and right light intensity distribution waveforms in the arrangement direction on the light receiving element array (photodiode array) 43 side, the light intensity distribution waveform If on the light receiving element array (photodiode array) 43 side is shown to be wider than the light intensity distribution waveform Ir on the incident side.

Next, two of the light intensity distribution waveforms If of the light receiving element array (photodiode array) 43 will be described. In a light scattering medium Ms, two "foreign substances/defects" Mf1 and Mf2 are arranged in parallel with the light receiving element array (photodiode array) 43 so as to face the light receiving element array (photodiode array) 43, and an interval of them is the same as an element interval of the light receiving element array (photodiode array) 43. Further, the light receiving lens array 42 is in unit systems, and W.D. is made long in advance.

In this case, it can be seen that a light intensity distribution waveform If1 obtained by image formation of one "foreign substance/defect" of the "foreign substances/defects" Mf1 or Mf2 spreads also onto a light receiving element (photodiode) PD2 adjacent to a light receiving element (photodiode) PD1 facing itself, and crosstalk occurs. Portions where crosstalk occurs are hatched portions Cr1 and Cr2 of the light intensity distribution waveforms.

In other words, the light intensity components Cr1 and Cr2 protruding from pixels adjacent to each other are added to their own net signal components. This causes a crosstalk component mixed in net signal components of the light receiving elements (photodiodes) to become noise, so that a dynamic range is made smaller, which is one of factors that deteriorate a signal to noise ratio (SNR: synonymous with S/N) of a signal.

Figure 4B:
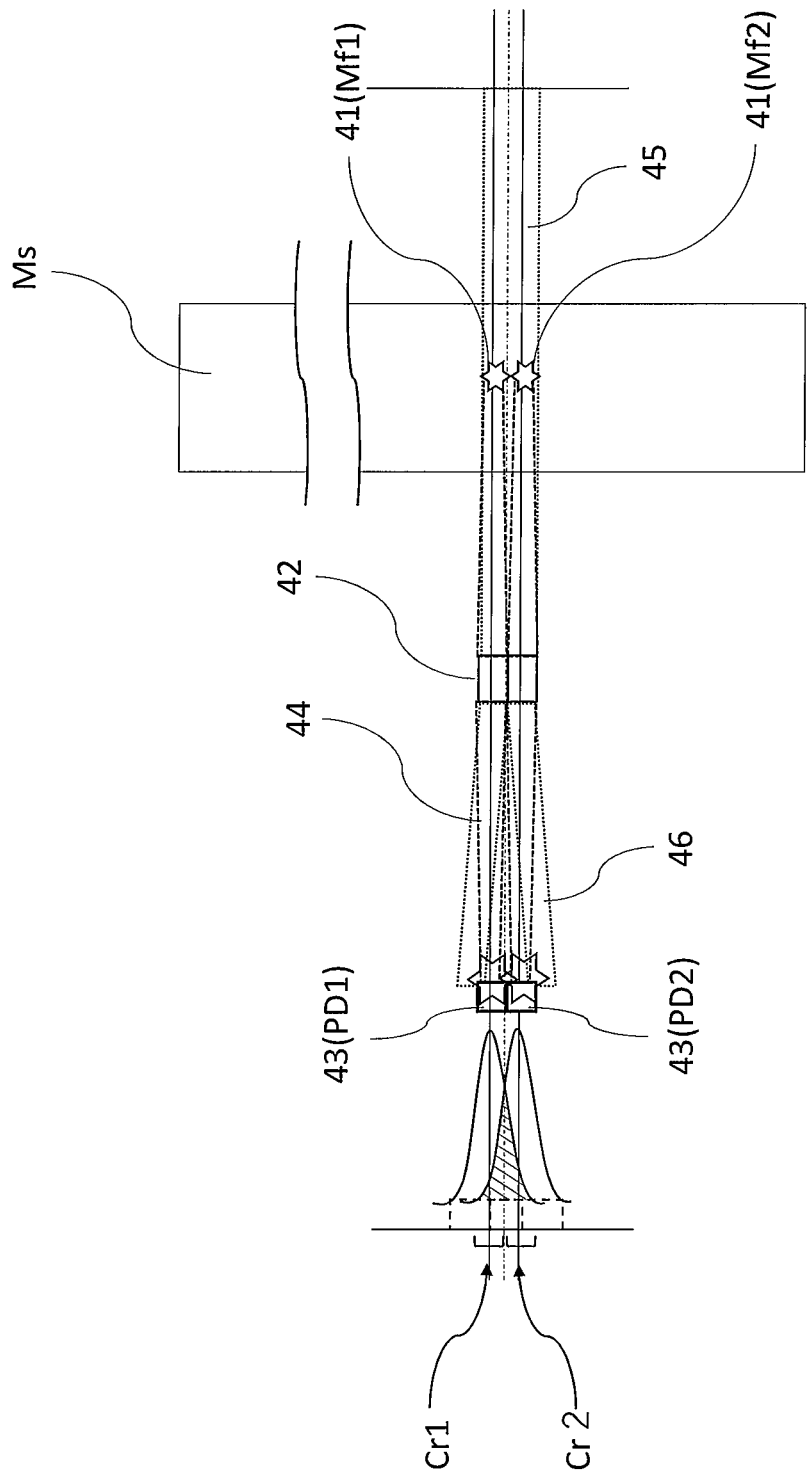
FIG. 4B is a diagram illustrating that a parallel light flux of the present invention is incident on a light receiving lens array, spreads after emission, and becomes background noise on a light receiving element.

Next, FIG. 4B will be described. FIG. 4B is a schematic diagram illustrating that a collimated light beam is incident on the light receiving lens array 42, spreads after emission, and becomes background noise on the light receiving elements PD1 and PD2. Illumination used in a conventional CIS or the like has light intensity distribution continuous in a longitudinal direction of a light receiving element array (photodiode array) 43. Light scattered by a "foreign substance/defect" in the light scattering medium Ms is indicated by 44 in FIG. 4A, and in addition to this, a collimated light beam 45 is incident on the light receiving lens array 42. Since the light receiving lens array 42 is set to unit systems, light from a region other than the vicinity of the depth of field hardly focuses. That is, since the light diffuses and does not contribute to image formation, the light spreads on the light receiving element array (photodiode array) 43. That is, when a collimated light beam is incident on the light receiving lens array 42, the light beam spreads greatly on the light receiving element array (photodiode array) 43 and becomes a background noise component 46, which causes deterioration of S/N. The background noise component 46 is indicated by a portion surrounded by a square dotted line. When the background noise increases, contrast deteriorates. That is, in "foreign substance/defect" detection, it is buried in a background noise component, and the detection becomes difficult.

Figure 5A:
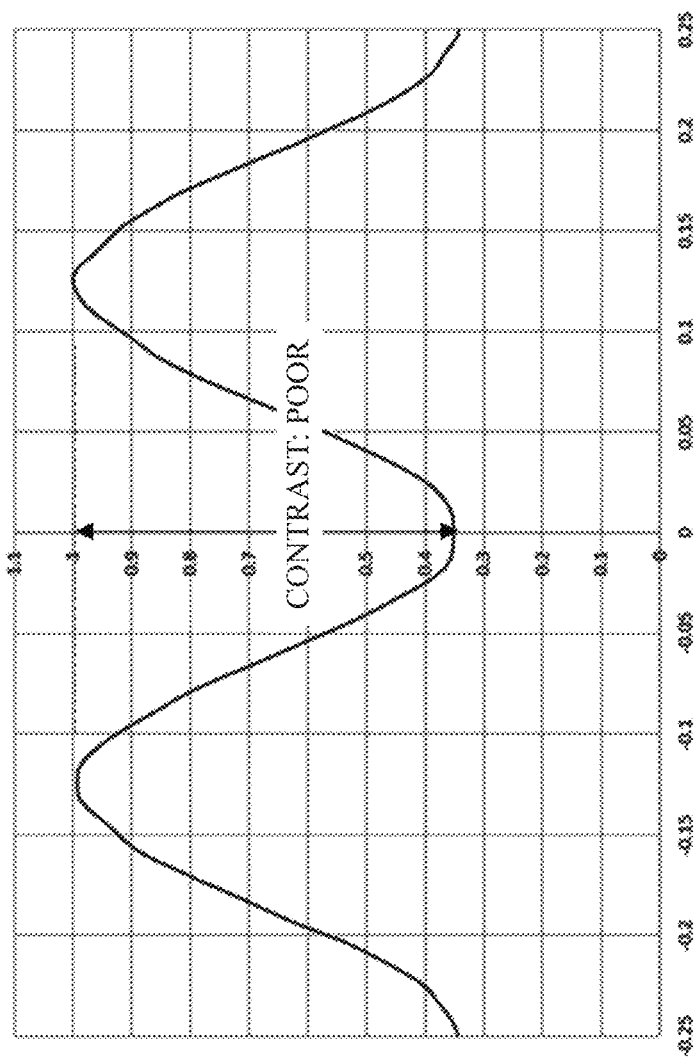
FIG. 5A is a signal in which a crosstalk component and a background noise component are mixed in a conventional invention.
Figure 5B:
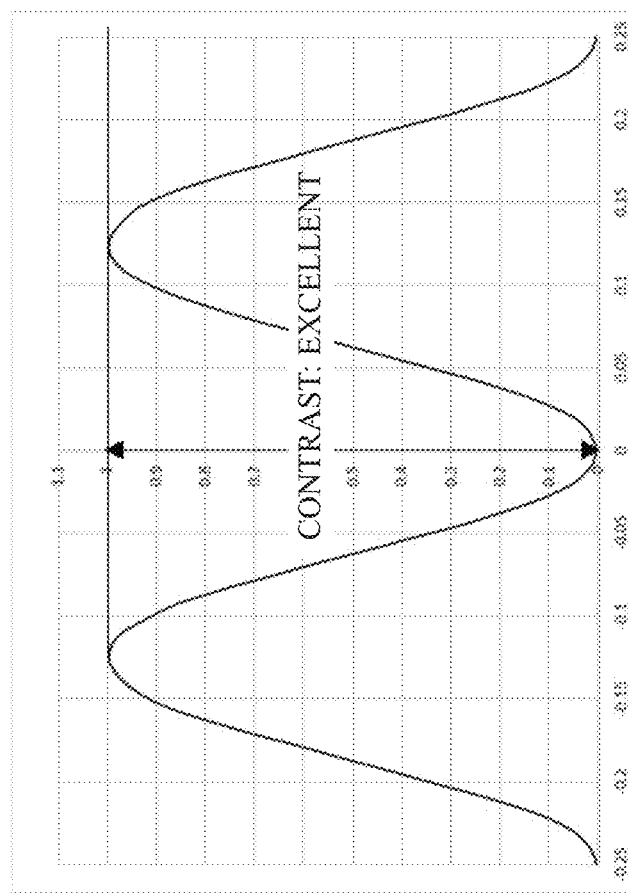
FIG. 5B is a signal in a case where there is almost no crosstalk component or background noise component in the present invention.

A signal actually detected includes the crosstalk component and the background noise component described above, and eventually becomes a signal as illustrated in FIG. 5A. FIG. 5B illustrates a case where there is almost no crosstalk component or background component. Further, in a case of geometric optical scattering, intensity distribution of "foreign substances/defects" becomes distribution similar to FIG. 8 described later due to a shielding effect.

In addition to the system of illumination in a manner that a light receiving element (photodiode) and a light source are in one-to-one correspondence in one pixel unit illustrated in FIGS. 3A to 3E of the present invention, a method of further reducing a crosstalk component will be described. As illustrated in FIGS. 3A to 3E, in the method of simultaneously performing linear illumination, a component from a light source adjacent to an adjacent photodiode is mixed. A method for avoiding this is not to turn on light sources at the same time, but to operate only a pair of a light source and a light receiving element (photodiode) of one pixel unit in one-to-one correspondence, then move to an adjacent combination of a pair of a light source and a light receiving element (photodiode) of one pixel unit in one-to-one correspondence, and sequentially repeat this until the end. That is, a light beam from a light source at an optional position in the main scanning direction is detected only by a corresponding light receiving element of one pixel unit. Such control can be performed by a control unit (not illustrated) including a CPU individually switching ON/OFF of each light source and each light receiving element, and at this time, the control unit functions as a detecting means. More specifically, in synchronization with scanning with a light beam in an illumination optical system, a signal is output only for a light receiving element in the vicinity of a center portion of the light beam at each scanning position in a plurality of light receiving elements. In this way, even if a light beam having a large light beam diameter and emitted from one light source and collimated by a collimator lens is scattered by a "foreign substance/defect" and, when the scattered light is incident on a light receiving element (photodiode) having one-to-one correspondence in one pixel unit, the light is incident on an adjacent pixel or a pixel in the vicinity, the adjacent pixel or pixel in the vicinity does not output, and thus only a net signal for the "foreign substance/defect" corresponding to a light source and at least one light receiving element (photodiode) in one pixel unit having a one-to-one correspondence is obtained. At this time, since the above-described crosstalk component is not output from other pixels, only a collimated light beam component incident on a light receiving lens array is received, and crosstalk is very little.

Figure 7:
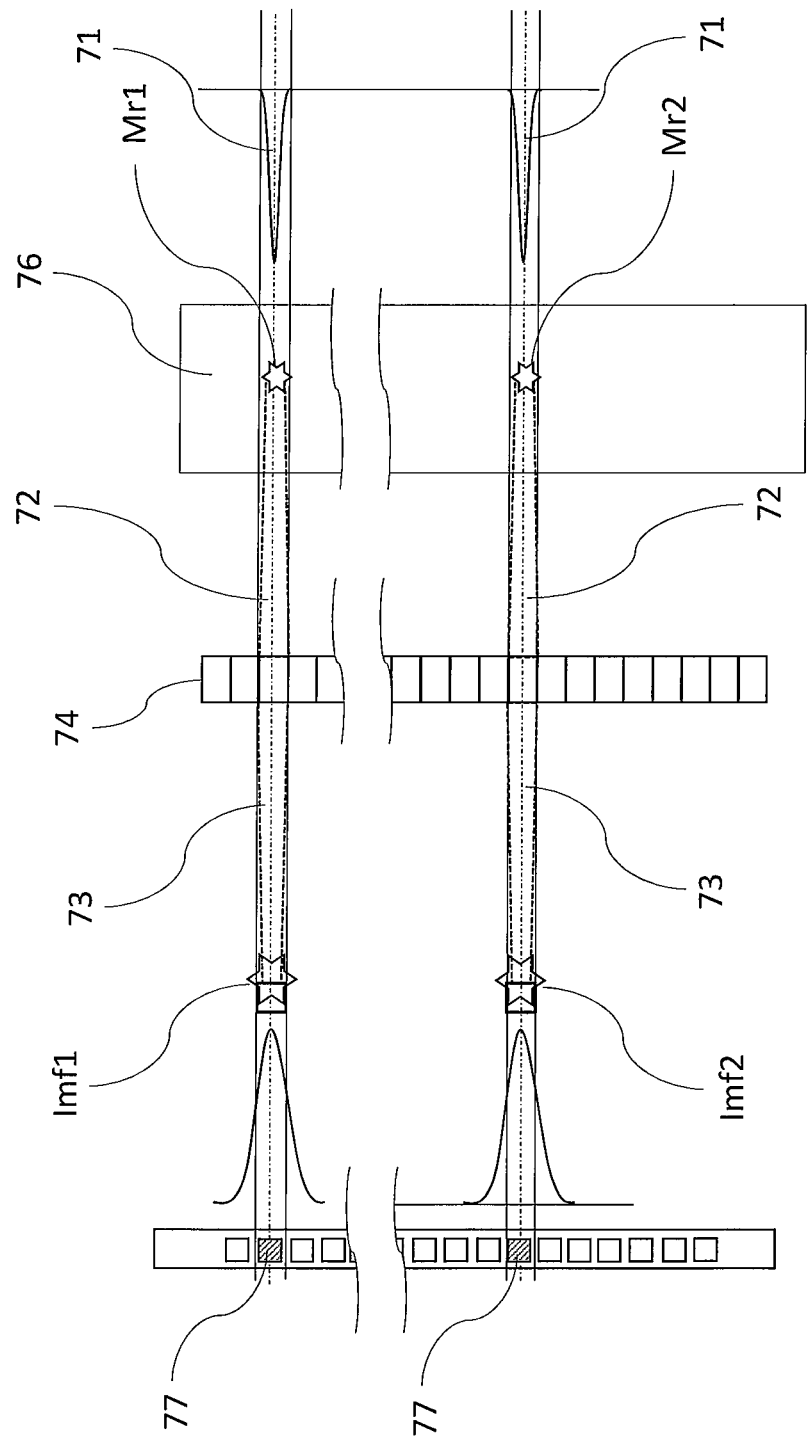
FIG. 7 is a schematic diagram illustrating a multi-beam illumination-multi-scanning light receiving system of the present invention.

This is shown in FIG. 7. FIG. 7 is a schematic diagram illustrating a multi-beam illumination-multi-scanning light receiving system. Reference numeral 71 denotes light intensity distribution of an incident light beam, and reference numeral 72 denotes scattered light. A light flux 73 is a light flux when light passing through a light receiving lens array 74 is concentrated on a light receiving element array (photodiode array) 75. Projection images of scattered light of "foreign substances/defects" Mr1 and Mr2 in an inspection object 76 are Imf1 and Imf2. As described above, image formation size at this time is larger than actual size of the "foreign substance/defect", and image formation size in an arrangement direction of the light receiving element array (photodiode array) 75 becomes large and blurred due to aberration or diffraction. However, since a location where a light beam is incident is limited and output of pixels other than a pixel having one-to-one correspondence is limited, there is no output from pixels other than a pixel 77 corresponding to the incident light beam.

Further, an incident light beam having one-to-one correspondence with another one of the pixels 77 at a position where crosstalk does not need to be a problem may be simultaneously emitted. In this case, as illustrated in FIG. 7, a large number of illuminations can be simultaneously performed at the same timing, so that there is an advantage that scanning time is shortened. The present system is called "multi-beam illumination-multi-scanning light receiving system" to be distinguished from the "one-beam illumination-one scanning light receiving system" described above.

Spatial resolution of one pixel unit including at least one light receiving element is equal to or higher than spatial resolution of a light beam on an inspection surface of an inspection object. Here, spatial resolution of a light beam corresponds to a beam diameter of the light beam on the inspection surface of the inspection object. That is, one pixel unit including at least one light receiving element has an ability of discriminating two points that are close to each other at a beam diameter of the light beam or less. In other words, spatial resolution of the light beam is equal to or less than spatial resolution of a pixel unit including at least one light receiving element arranged in the main scanning direction.

A scanning interval with a light beam may be equal to or less than spatial resolution of a pixel unit including at least one light receiving element arranged in the main scanning direction. In other words, spatial resolution of a pixel unit including at least one light receiving element is equal to or more than a scanning interval of a light beam. That is, one pixel unit including at least one light receiving element has an ability to discriminate two points close to each other at a scanning interval of a light beam (an interval of a light source).

Figure 8:
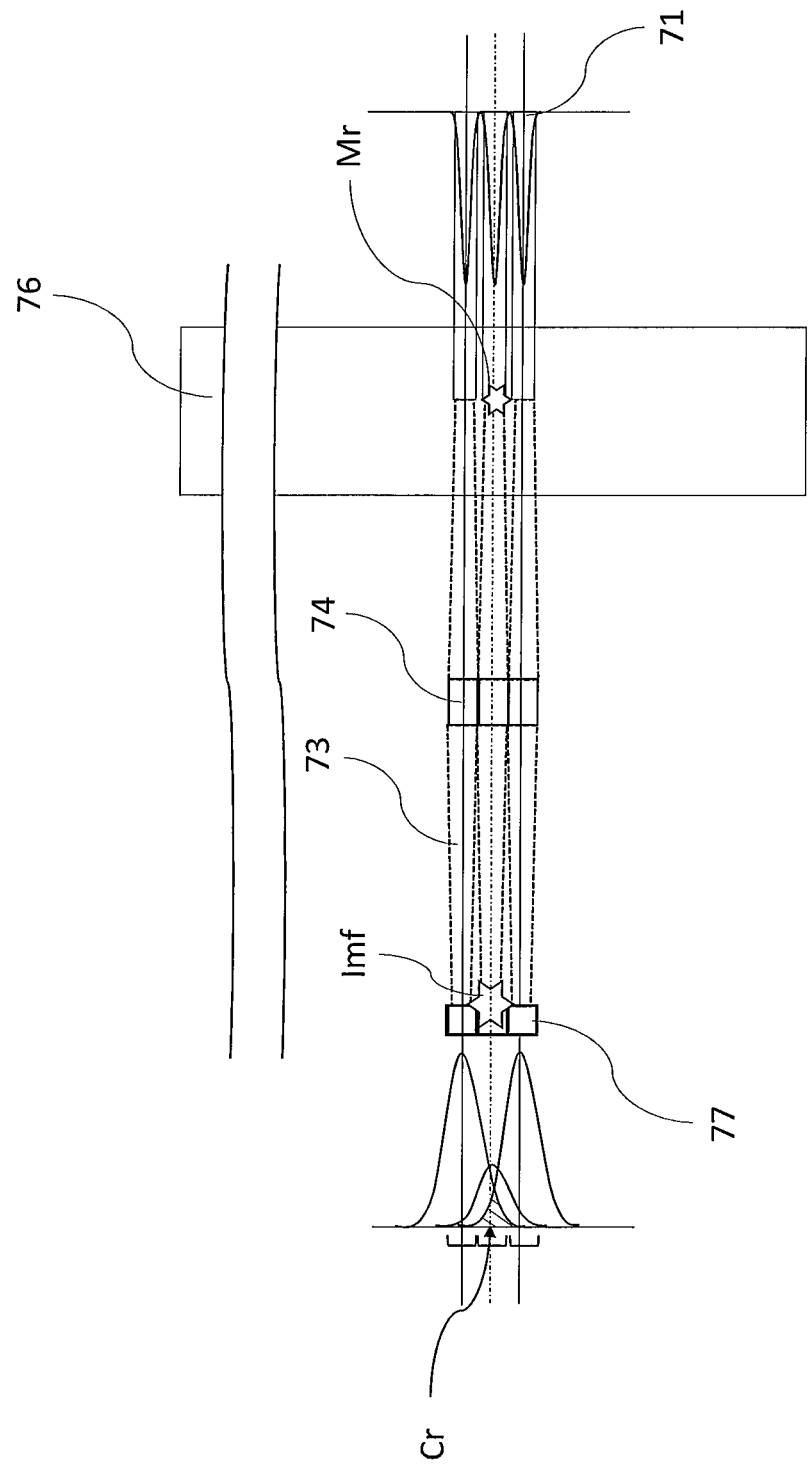
FIG. 8 illustrates light scattering due to a non-transmissive "foreign substance/defect".

Next, a case where a "foreign substance/defect" in an inspection object is a geometrical optical scattering region or non-transmissive will be described. Scattering of the "foreign substance/defect" is illustrated in FIG. 8. Cr (hatched portion) in FIG. 8 is a crosstalk component of an element (center) operating an illumination beam for the adjacent pixels 77. A transmitting component has intensity distribution lower than a peak of intensity distribution of a bell shape of an adjacent one. Since output of a central pixel is low and output of the adjacent pixel is high, it is possible to detect presence of a "foreign substance/defect" Mr.

As described above, a shape of a signal changes depending on whether a "foreign substance/defect" in an inspection object is a Mie scattering region, a geometric optical scattering region, a transmissive one, or a non-transmissive one, and surface property, a dielectric constant, and the like. However, when a "foreign substance/defect" can be detected by a level of a detected signal, and intensity and a signal waveform of a signal by a foreign substance are set as reference data in a lookup table in advance, a type of the "foreign substance/defect" can be discriminated by collating with the reference data.

Figure 9A:
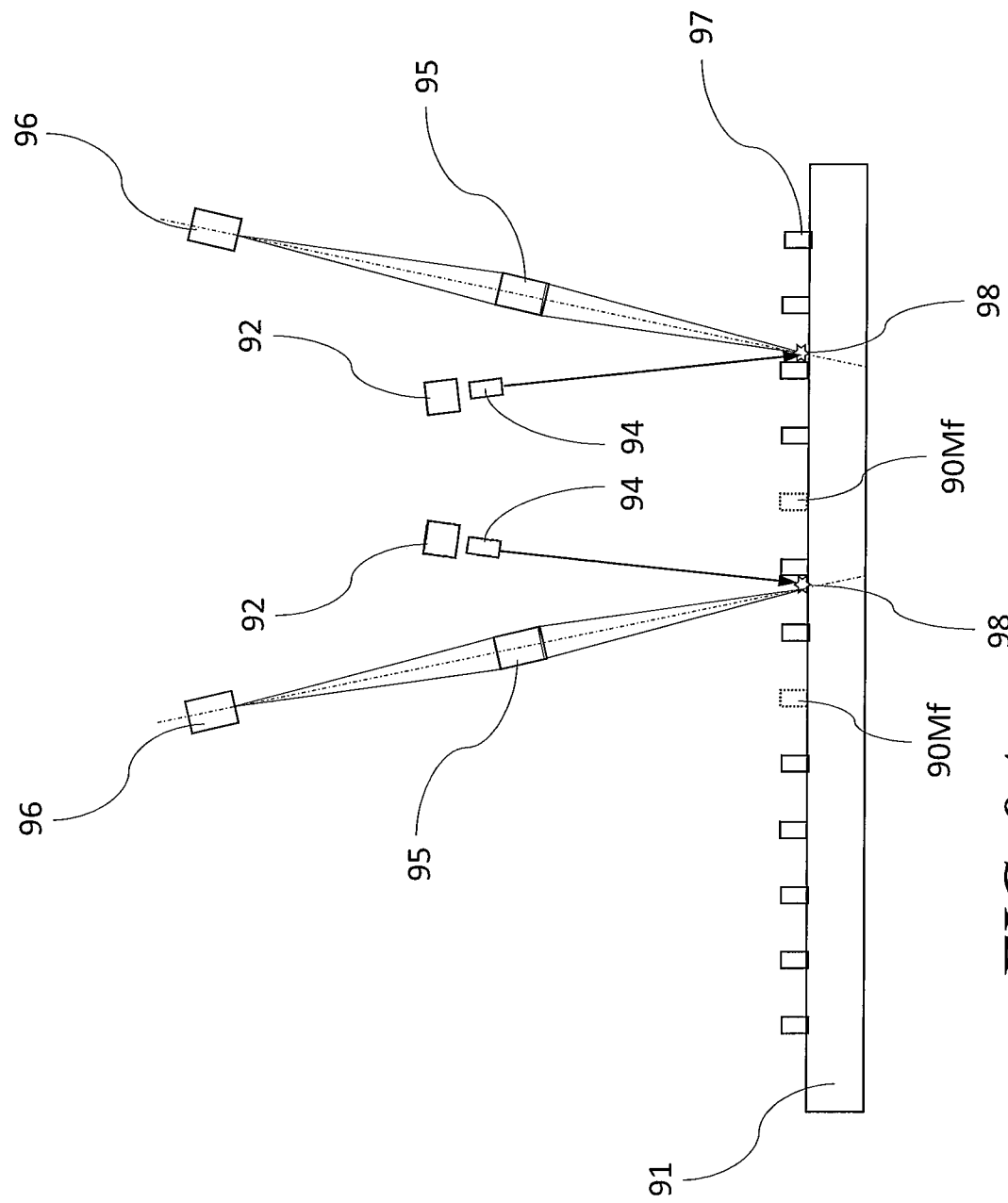
FIG. 9A is a schematic diagram illustrating an embodiment of a reflection type.
Figure 9B:
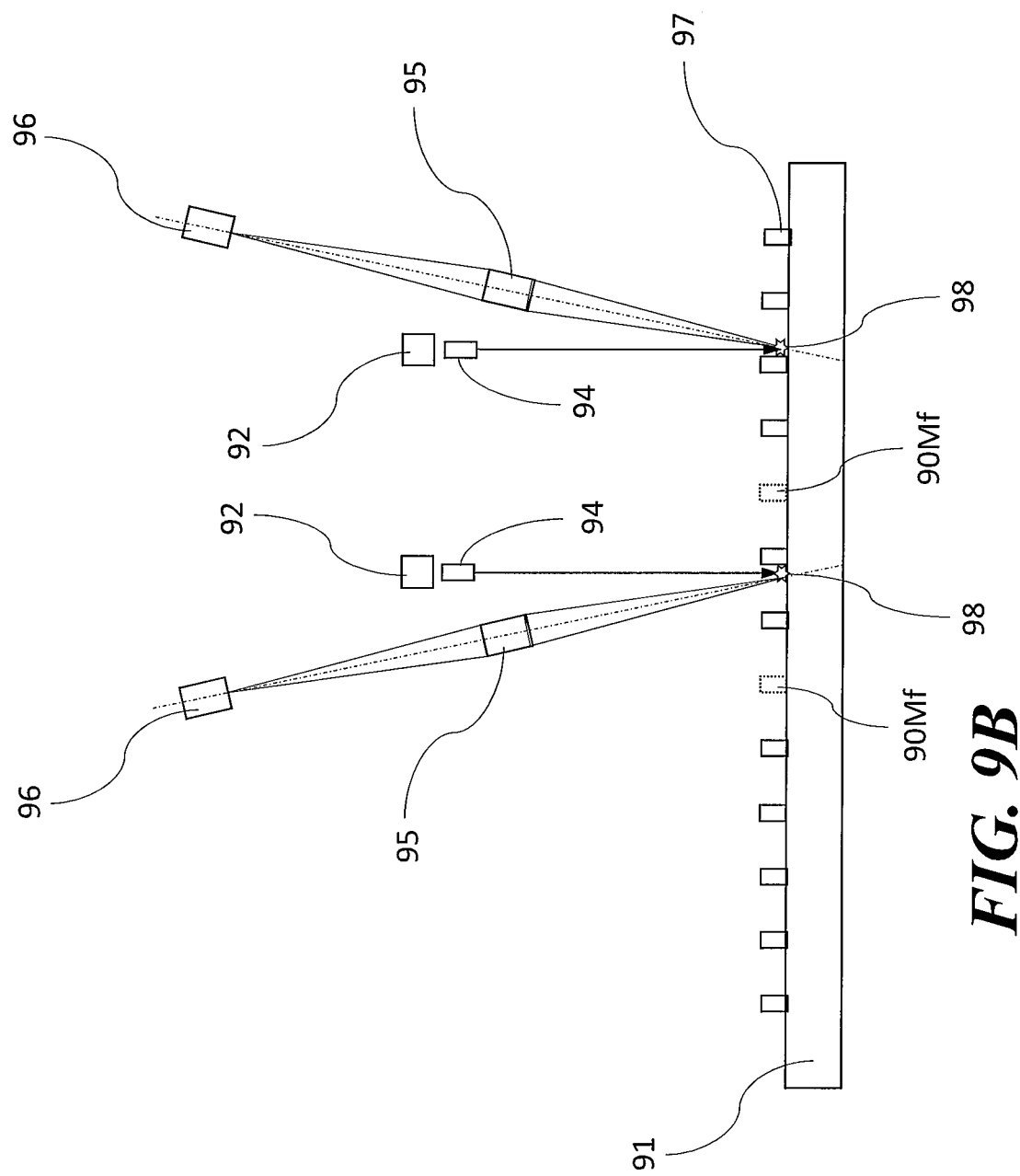
FIG. 9B is a schematic diagram illustrating another embodiment of a reflection type of the present invention.

Although above description is made on a case where an inspection object is limited to a light scattering transmissive medium, the present invention can also be applied to a reflecting medium. FIG. 9A illustrates an example. Note that, in FIG. 9A and FIG. 9B to be described later, a part of the light guiding means 32 is omitted for simplification of description. FIG. 9A is a schematic diagram illustrating an embodiment of a reflection type, and illustrates a cross section of a measurement system with respect to a longitudinal direction of the measurement system. Reference numeral 91 denotes an inspection object such as an electronic substrate, a paper sheet, or a film. Light emitted from a light source 92 such as an LED and an LD is collimated by a collimator lens 94 such as a refractive index distribution type lens and a ball lens, and the inspection object 91 is irradiated with the light. In a light receiving optical system, lenses typified by a refractive index distribution lens are arranged in an array, in a manner that an incident light beam and reflected light form an angle. A light receiving element array (photodiode array) 96 is arranged at a focal position on the light receiving element side of a light receiving lens array 95.

In an inspection, information on the inspection target 91 as a reference is acquired in advance, and then a product is inspected. The information on the inspection object 91 as a reference is stored in advance in a memory. When an inspection of a product in a process is performed, collation with reference information stored in advance is performed (verification is performed). Further, a case where a "foreign substance/defect" is attached to, mixed with, or present in the inspection object 91 is indicated by a star 98. If there is a "foreign substance/defect" on the inspection object 91, data different from the reference data is acquired, a difference from the acquired data is obtained, and the "foreign substance/defect" is determined to exist on the inspection object 91 and removal from the process is performed. Further, a case where an element 97 is missing is indicated by a dotted line at 90Mf in FIG. 9A. If the element indicated by a dotted line is missing, data different from the reference data is acquired in a similar manner as described above, and thus, from the difference, the element is determined to be missing, and removal from the process is performed. Furthermore, even in a case where a fine wiring on or inside an electronic substrate is disconnected, it is similarly detected as a "foreign substance/defect".

Furthermore, even in a case where there is a protrusion on an electronic substrate and a "foreign substance/defect" is hidden by the protrusion, it can be detected by irradiation with an incident light beam from both sides at a symmetric angle and arranging a light receiving optical system at a symmetric angle. Note that, although FIG. 9A illustrates a case where an incident light beam is obliquely incident on a substrate, the incident light beam may be perpendicularly incident as in FIG. 9B and received obliquely with respect to the substrate. In the reflection type, arrangement is performed at a light receiving angle in consideration of N.A. so that regular reflected light is not received. In short, arrangement of a measurement system may be changed according to an inspection object.

The method of the present invention is also effective in a case where an inspection object is a printed matter, a functional film, or the like. That is, the method is effective for inspection of presence or absence of scratches and the like for a transmissive film, and for inspection of printing defects as well as scratches by using the reflection type for a non-transparent printed matter such as a paper sheet. Moreover, in the present invention, a depth of field is large. Accordingly, the present invention can be used even in a place where a conveyance system moves up and down, and has an expanded application range.

Further, in a light scattering transmissive medium, particularly in a medium having low transmittance, there is a case where a light beam is preferably narrowed. In this case, a diaphragm angle of a light beam is determined in consideration of a light receiving solid angle of a light receiving element. Furthermore, in a case where transmittance of a light scattering transmissive medium is high or in a case where reflectance of a reflecting medium is high, there is also an effect that light received at a light receiving solid angle of a light receiving element is less likely to become background noise as a light beam is expanded to some extent. For this reason, S/N of a signal is further improved by a method of collimating a light beam or contrivance of narrowing or expanding a light beam according to transmittance or reflectance of an inspection object. Note that "narrowing or expanding a light beam" means further narrowing or expanding a collimated parallel light flux. Although specific description is omitted, briefly, in a case of a light scattering transmissive medium, when a case where a light receiving solid angle hardly changes in a depth direction, it is possible to prevent a collimated parallel light beam from being directly incident on a light receiving element, and in a case where a reflecting medium is an inspection object, incident intensity of an illumination beam at a light receiving solid angle can be directly reduced as a light beam spreads on an inspection surface of an inspection object, and S/N of a signal based on light received by the light receiving element is improved. Note that the inspection surface of an inspection object is a surface on which a light beam is incident of the inspection object, and is not limited to one, and the configuration may be such that a light beam is incident on a plurality of inspection surfaces.

At present, densification of LEDs is progressing as represented by LED printers, and 1200 dpi has already been achieved. By using this LED array, high resolution can be realized. That is, emitted light emitted from an LED array is preferably collimated, and the collimated light beam is preferably used instead of the light source of FIG. 3A. A refractive index distribution lens array is an equal magnification imaging system of a refractive index distribution type lens in a case of an LED printer, but the refractive index distribution type lens used in the present invention has a focus at infinity. If LDs can be arranged at high density in the future, it is more preferable to use a high-output LD array. Alternatively, a linear light source in which semiconductor lasers represented by a vertical cavity surface emitting laser (VCSEL) are arranged on a plane or in an area may be used. The linear light sources can be arranged in a plurality of lines, and inspection accuracy can be improved by inspection using a plurality of wavelengths.

The above system will be described again with reference to FIGS. 3A to 3E. Reference numeral 31 denotes an LED or an LD array which is a light source. Reference numeral 32a denotes a collimator lens array. Reference numeral 34 denotes an inspection object, and reference numeral 35 denotes a "foreign substance/defect" in an inspection object. Reference numeral 37 denotes a light receiving lens array. Reference numeral 38 denotes a light receiving element array (photodiode array). Further, reference numeral 30 denotes a light beam emitted from the light source 31, and 33 denotes a light beam emitted from a collimator lens 32. The light beam 33 enters the inspection object 34, and then enters the "foreign substance/defect" 35. The light beam 33 incident on the "foreign substance/defect" 35 is scattered by the "foreign substance/defect" 35, becomes the scattered light 36, is incident on the light receiving lens array 37, and then is incident on the light receiving element array 38.

Next, a more excellent method for removing background noise illustrated in FIG. 4B will be described using FIG. 4B which is a schematic diagram illustrating that a collimated light beam is incident on the light receiving lens array 42, spreads after emission, and becomes background noise on the light receiving elements PD1 and PD2.

Figure 10:
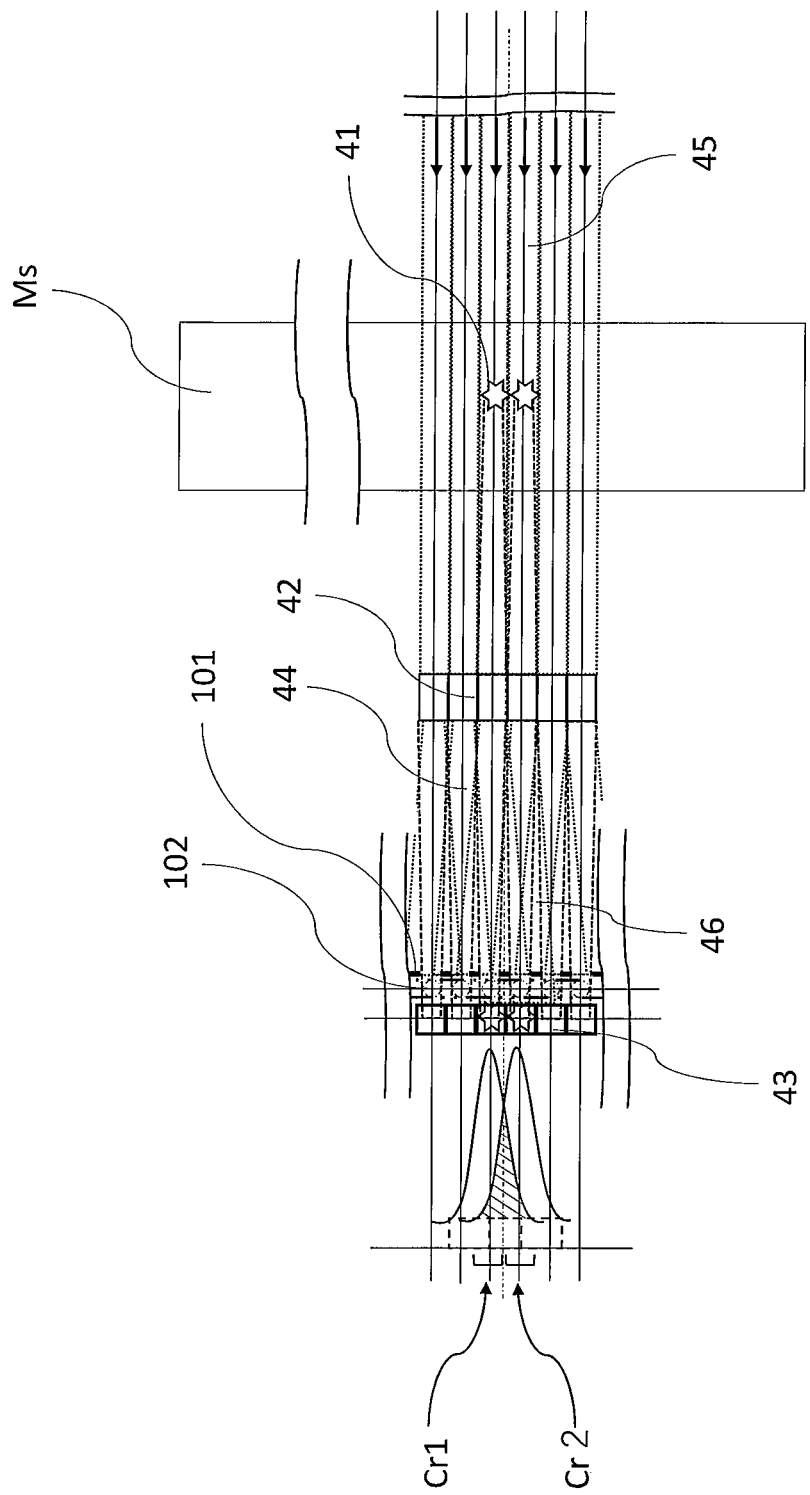
FIG. 10 is a schematic diagram of another system for further reducing a crosstalk component according to the present invention. This is a system in which an aperture (array) corresponding to each multi-eye lens of a light receiving system is provided.

In the light receiving optical system of FIG. 4B, background noise cannot be completely removed and can be suppressed only to some extent, and in order to further remove the background noise and obtain only a necessary net signal component, separate contrivance is required. The contrivance will be described below. A major disadvantage of a multi-eye lens is that, because of being a multi-eye lens, a crosstalk component from an adjacent multi-eye lens spreads considerably, and a background noise component spreads on an element surface of the light receiving element array (photodiode array) 43. Since a light flux spreads and attenuation occurs, a crosstalk component is reduced. However, there is still room for improvement, and S/N can be further improved by further reducing background noise. FIG. 10 is a schematic diagram of the present system. FIG. 10 illustrates a system in which an aperture (array) corresponding to each multi-eye lens of the light receiving system is provided.

Reference numeral 101 in FIG. 10 denotes an aperture corresponding to each multi-eye lens of a light receiving system as viewed from the optical axis direction. Reference numeral 102 virtually represents a cross section of the aperture. At the same time, each of the apertures 101 is located on an optical axis of each light source, a collimator lens (optionally also including a converging lens forming a beam waist), a light receiving lens, and a light receiving element, and substantially coincides with or is smaller than N.A. of the light receiving lens. Alternatively, the aperture may be once arranged on an image formation plane of the light receiving lens and spread light may be received in one-to-one correspondence. In this case, one-to-one correspondence is preferably corrected in advance, and only a signal from one pixel unit having the one-to-one correspondence is preferably output.

Figure 11:
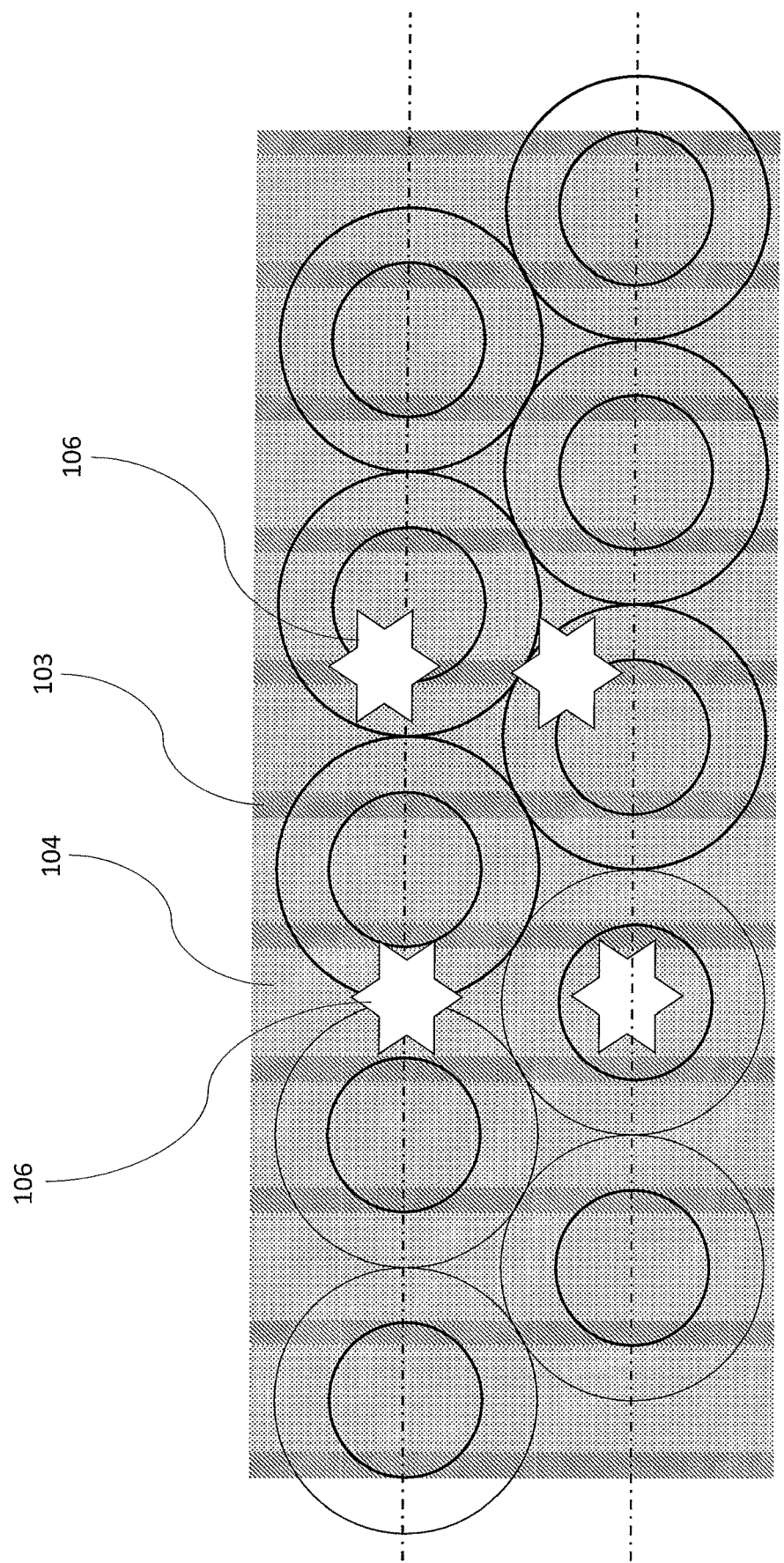
FIG. 11 is a schematic diagram illustrating a case where collimated light beams adjacent to each other overlap each other (cross-sectional view as viewed from an optical axis direction).

FIG. 11 is a schematic diagram illustrating a case where collimated light beams adjacent to each other overlap. As illustrated in FIG. 11, a collimated light beam may be larger than an effective diameter of a multi-eye lens of a light receiving system. By increasing size, a foreign substance/defect in an inspection object can be detected completely. Reference numeral 103 denotes a portion where collimated light beams overlap each other and reference numeral 104 denotes a portion where they do not overlap. A "foreign substance/defect" 105 is irradiated with a light beam in which adjacent collimated light beams overlap each other, and a "foreign substance/defect" 106 is irradiated with a light beam in which adjacent collimated light beams do not overlap each other. As a result, "foreign substances/defects" at all positions can be detected.

An example of an embodiment of the present invention will be described in detail with reference to FIGS. 3A to 3E. The light source 31 is easily arrayed or formed into a matrix, and a vertical cavity surface emitting laser (VCSEL) having high power is preferable. Alternatively, an LED array used in an LED printer may be used. The VCSELs are minutely arranged linearly to determine a pitch of the light source 31. For example, the pitch is adjusted to 600 dpi and 1200 dpi. However, the present invention is not limited to the above when used in a case other than a case of processing as an image. Next, a VCSEL array is arranged parallel with a refractive index distribution type lens array. Since a refractive index distribution type lens array is used as a collimator, a pitch near a ¼ pitch is used. Alternatively, the pitch may be close to a pitch at ¾. That is, the pitch is preferably determined so that a collimated light beam can be emitted. Further, other than a refractive index distribution type lens, a micro lens array having a minute spherical lens may be used. In this case, micro lenses are arranged in accordance with an optical axis of the light source 31. In the case of a collimated light beam, a beam waist is assumed to be on an emission surface of the VCSEL, and collimation is performed such that the beam waist coincides with a focal point of the collimator lens 32d.

In the present invention, a laser having a wavelength suitable for a light scattering transmissive medium is used, and particularly in relation to food, a wavelength around $\lambda=800$ nm to 900 nm is used in consideration of absorption by moisture. Food products also include a medium (confectionery typified by cacao) having low transmittance in the above-described wavelength band, and in this case, a wavelength used for optical communication in the vicinity of $\lambda=1500$ nm may be used. Since a material containing many substances such as $H_2O$, $CO_2$, and $O_2$ also has a wavelength region with high transmittance, a wavelength is preferably selected as necessary to illuminate an inspection object. Further, when a wavelength is selected, a light receiving element having a sensitivity range for the selected wavelength is used. For roll paper, roll films, paper sheets, resin films, metal films, and the like other than food, a wavelength in a visible range may be used.

In the present embodiment, $\lambda=830$ nm in a near-infrared range is used. At this wavelength, when thickness of a light scattering transmissive medium is 10 mm and a beam waist is placed in a central portion of the light scattering transmissive medium, a change is preferably suppressed to a beam diameter of about 5% at a distance of 5 mm. For example, when size of an emission port of the VCSEL is 10 μm in diameter, a collimated beam diameter d becomes d=210 μm when f=2 mm where f is a focal length of a SELFOC lens array according to Equation 1.

$$W0=\{4 \cdot f \cdot \lambda/(\pi \cdot d)\}/2 \qquad \text{(Equation 1)}$$

where
f: focal length of lens
λ: wavelength of laser beam
d: beam diameter.

Further, a method that a focus is placed in a central portion of a light scattering transmissive medium may be used. That is, a beam waist length may be adjusted so as to obtain a substantially parallel beam in the light scattering transmissive medium. In this case, a beam diameter at a beam waist position is obtained using Equation 2 of Kogelnik. However, since a refractive index in air (in vacuum) is different in a light scattering transmissive medium, it is necessary to determine a beam waist position in consideration of movement of a beam waist position, and details will be described later. Equation 2 of Kogelnik representing propagation of a laser beam is used to determine a range of an allowable radius of the beam.

$$W^2(z)=W0^2[1+\{\lambda \cdot z/(\eta \cdot W0^2)\}^2] \qquad \text{(Equation 2)}$$

where
W(z): beam radius at an optional position in an optical axis direction
W0: beam waist radius.

Since the beam waist radius W0 is obtained by Equation 1, for example, a range of a beam diameter with an error of 5% can be determined by Equation 2. A result of Equation 2 is 217 μm and may be considered to be in an allowable range.

A beam waist position in air (in vacuum) is determined by Equation 1, but in a light scattering transmissive medium, a refractive index is larger than that in air (in vacuum). For this reason, an actual beam waist position is far from the light source side. Then, as a convergence angle becomes lower, a beam waist diameter also changes. A movement distance Δf of a beam waist can be expressed by Equation 3. That is, it can be determined by a focal length of a condenser lens and a beam diameter of a collimation beam when a laser beam is incident on an incident end surface. Since it is a distance that does not require consideration of a beam in the vicinity of a diffraction limit, θ' is obtained by Snell'Law by approximately applying geometric optics.

$$\Delta f = \tan \theta'/di \qquad \text{(Equation 3)}$$

where
θ: maximum value of incident angle
θ': maximum value of refraction angle
di: beam radius at an incident end surface incident on a light scattering transmissive medium.

Since the equation of Kogelnik cannot be applied in a light scattering transmissive medium, a beam waist diameter needs to be newly obtained. For this purpose, since it is not necessary to use a convergence angle near a beam waist, a refraction angle obtained by Snell' Law of geometric optical approximation is used. A divergence angle Φ of a beam can be expressed by Equation 4 representing a diffraction limit.

$$\Phi = 2\lambda'/(\pi \cdot dms) \quad \text{(Equation 4)}$$

where
- $\lambda'$: wavelength in a light scattering transmissive medium
- dms: beam waist diameter in a light scattering transmissive medium
- $\lambda'$: $N \cdot \lambda$ ($\lambda$: refractive index in air (vacuum)).

By the above, with respect to the beam waist diameter dms in a light scattering transmissive medium, in a case where a condenser lens having a longer focal point as a focal length is more substantially equal to W.D. and a small numerical aperture (N.A.) f=50 mm is used, and the condenser lens is arranged on the rear side of a collimator lens and on the light source side of the light scattering transmissive medium, when an incident beam diameter to the condenser lens is 210 μm, a beam waist diameter 2W0 in the absence of the light scattering transmissive medium is 252 μm. Then, it can be seen that a focus movement distance in the light scattering transmissive medium when the lens having the focal length is used is 21 mm. Therefore, in a case where a beam waist position is arranged at a central portion, an illumination optical system is preferably lowered by 16 mm from the light scattering transmissive medium. Further, at that time, the beam diameter dms is 377 μm from Equation 4. By the above, a position of an optical system is preferably determined according to thickness and a refractive index of an inspection object. Further, an optical system may be configured to be movable in an optical axis direction as described above.

Figure 12A:
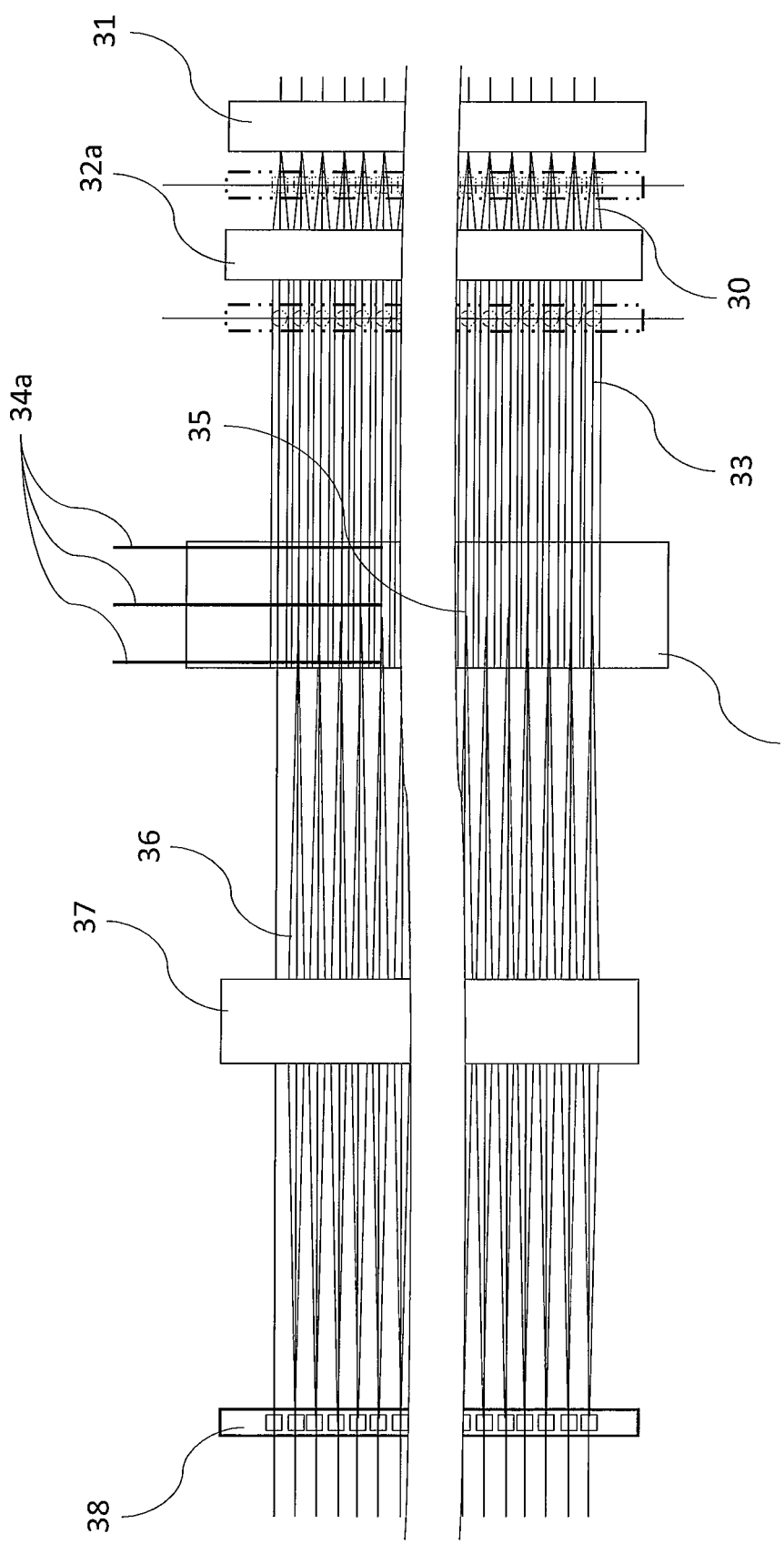
FIG. 12A is a schematic diagram of an experiment of an edge method of the present invention.
Figure 12B:
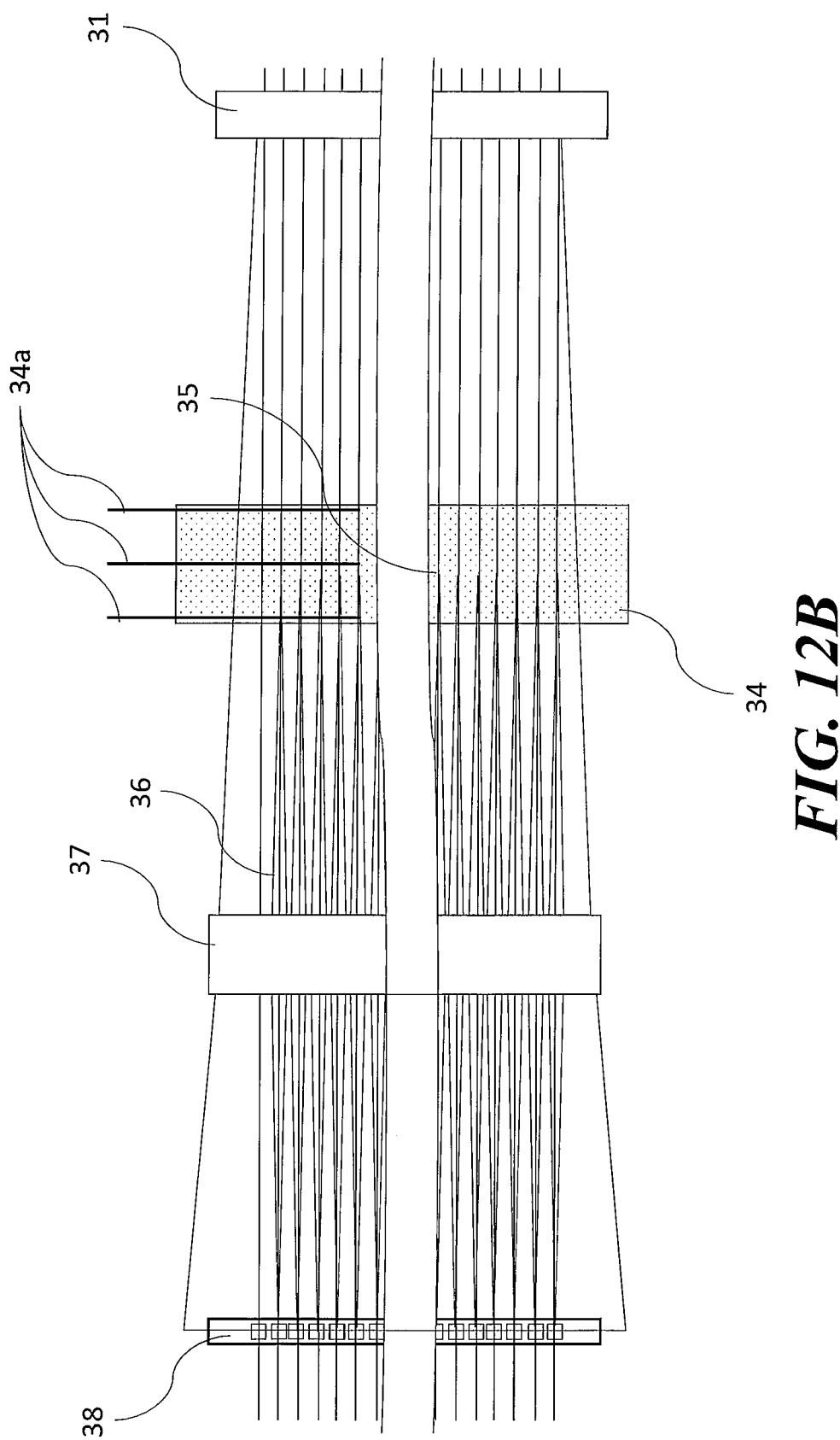
FIG. 12B is a schematic diagram of an experiment of an edge method of a conventional technique.
Figure 13:
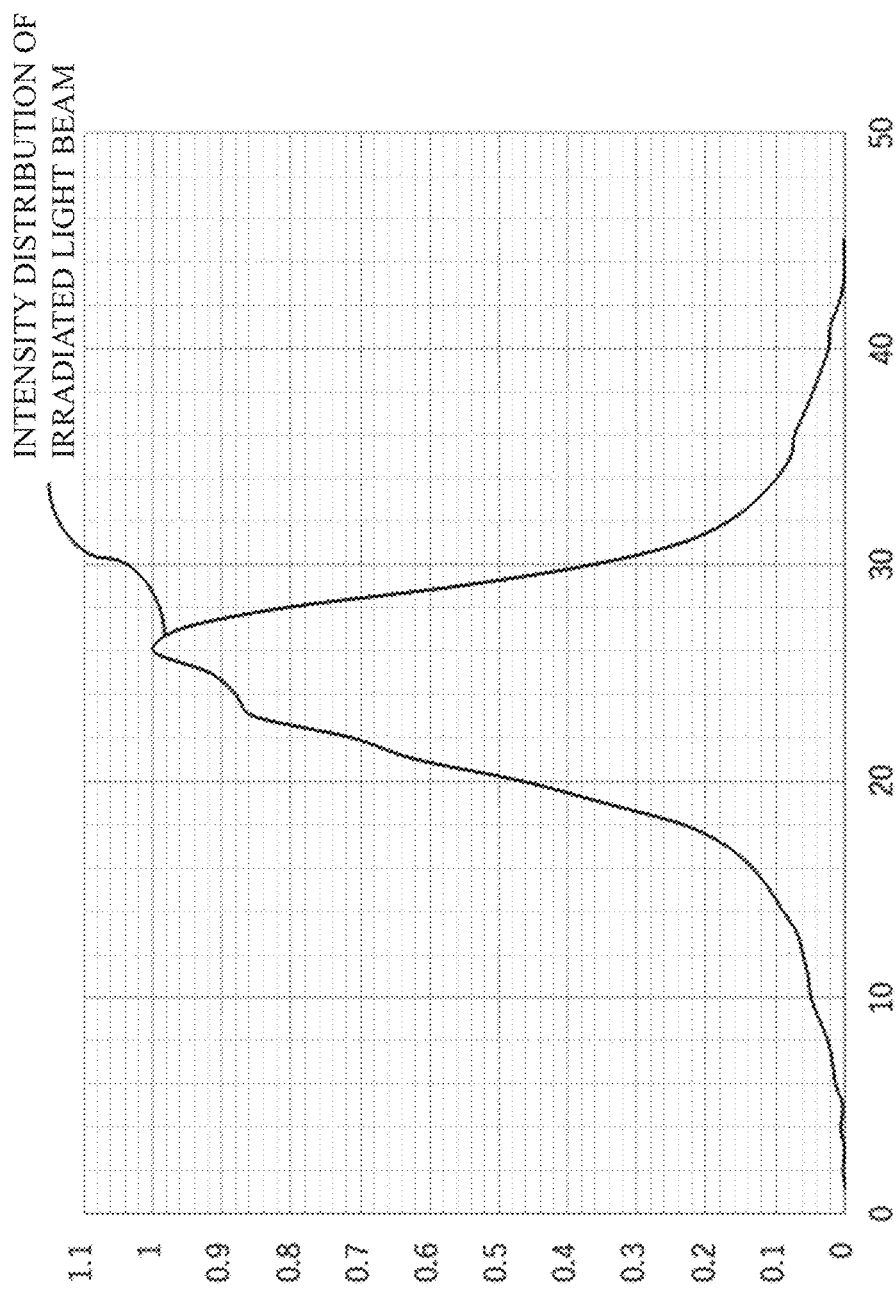
FIG. 13 illustrates a beam profile of an LD in an embodiment of the present invention.
Figure 14A:
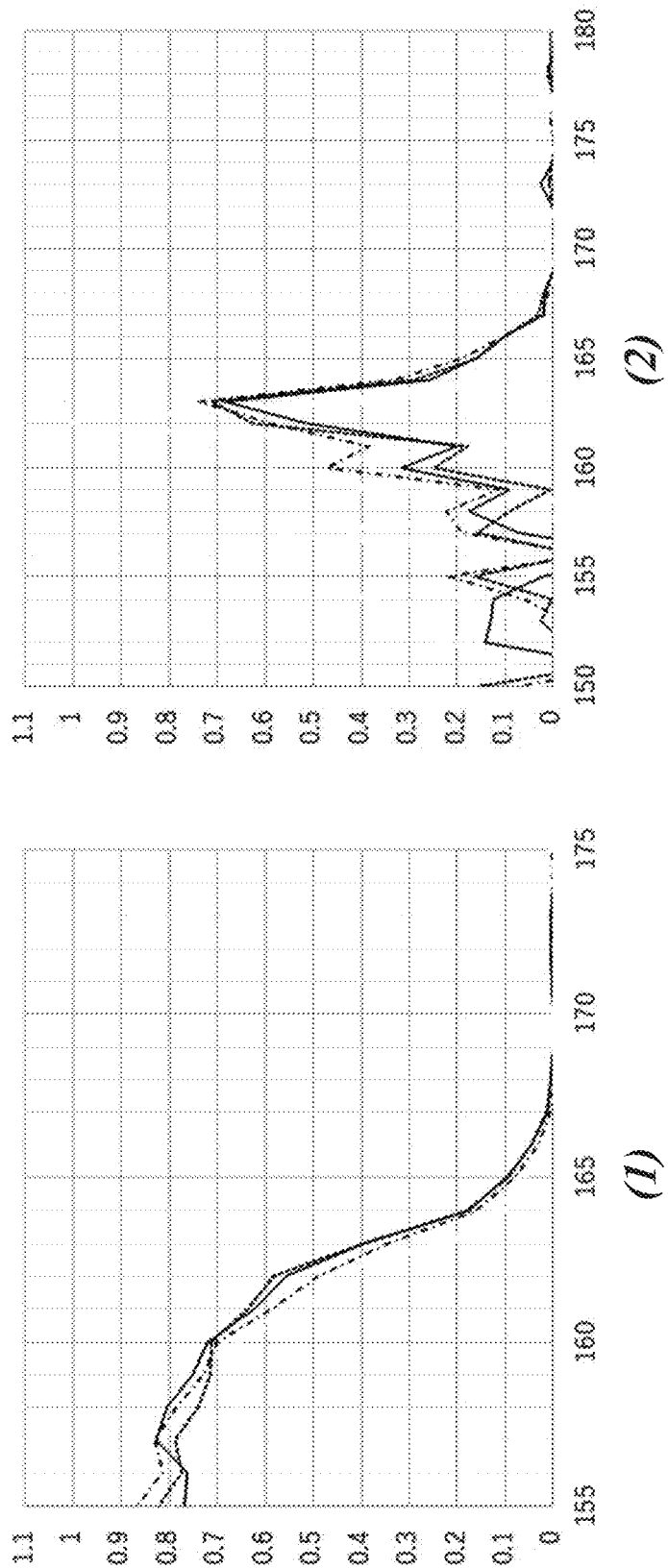
FIG. 14A shows (1) a graph (standard value) showing a response of an edge signal in a case of two diffusion plates and (2) a difference between adjacent pixels of an edge response signal (standard value) in the embodiment of the present invention.
Figure 14B:
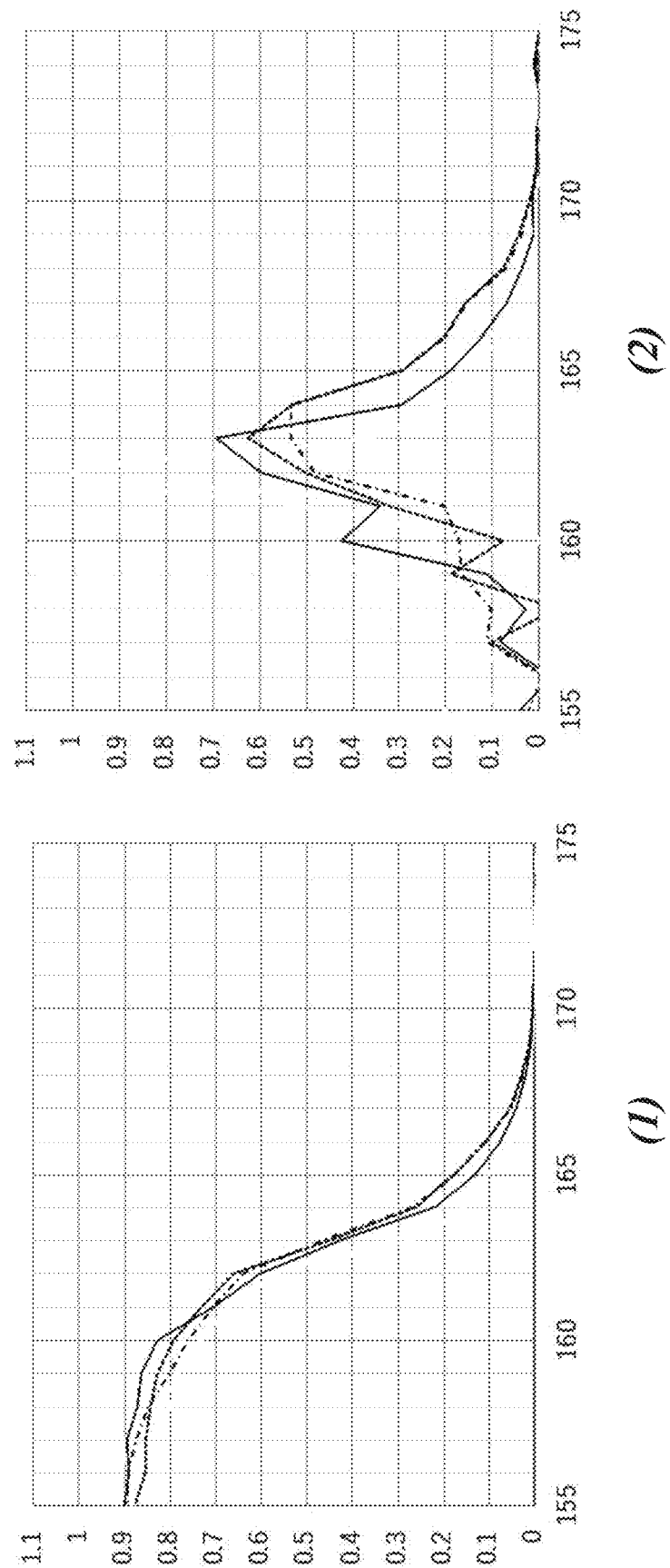
FIG. 14B shows (1) a graph (standard value) showing a response of an edge signal in a case of three diffusion plates and (2) a difference between adjacent pixels of an edge response signal (standard value) in the embodiment of the present invention.
Figure 14C:
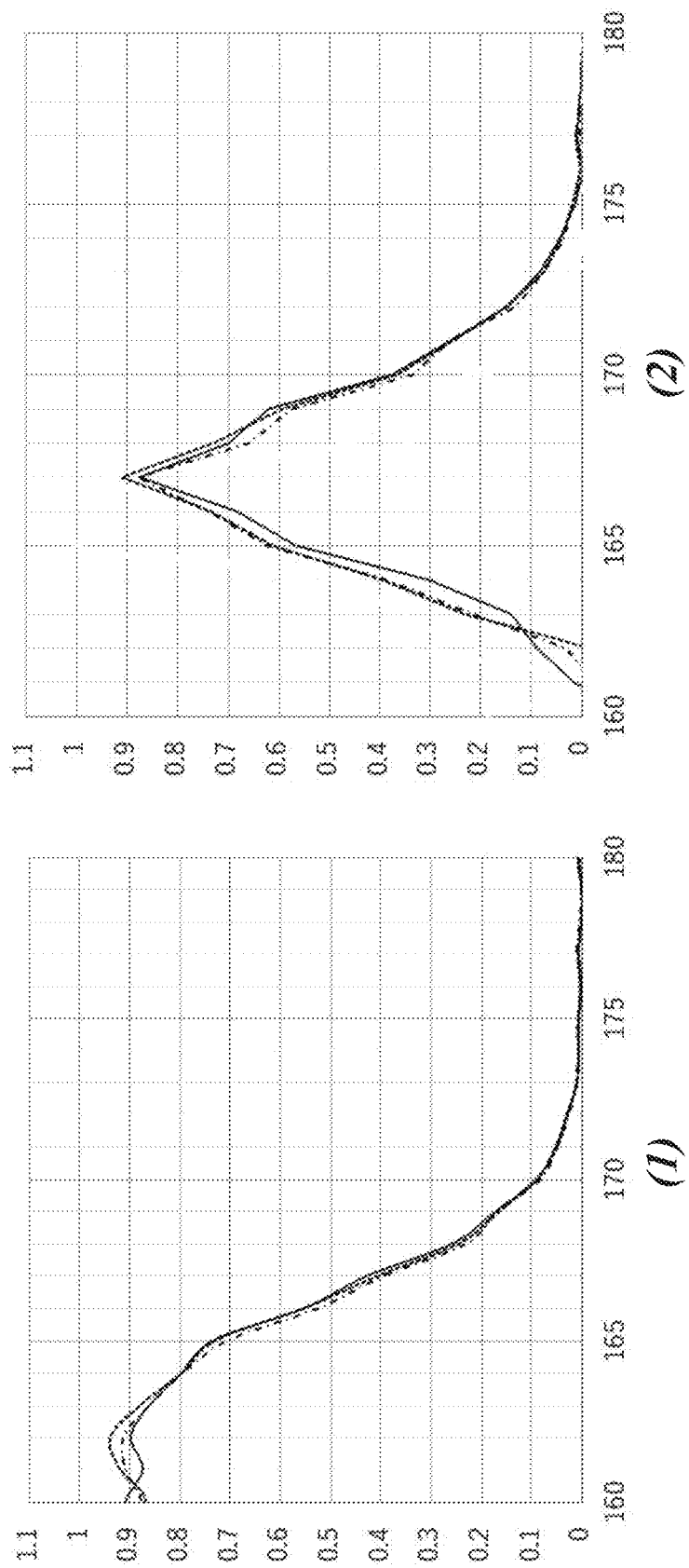
FIG. 14C shows (1) a graph (standard value) showing a response of an edge signal in a case of four diffusion plates and (2) a difference between adjacent pixels of an edge response signal (standard value) in the embodiment of the present invention.
Figure 14D:
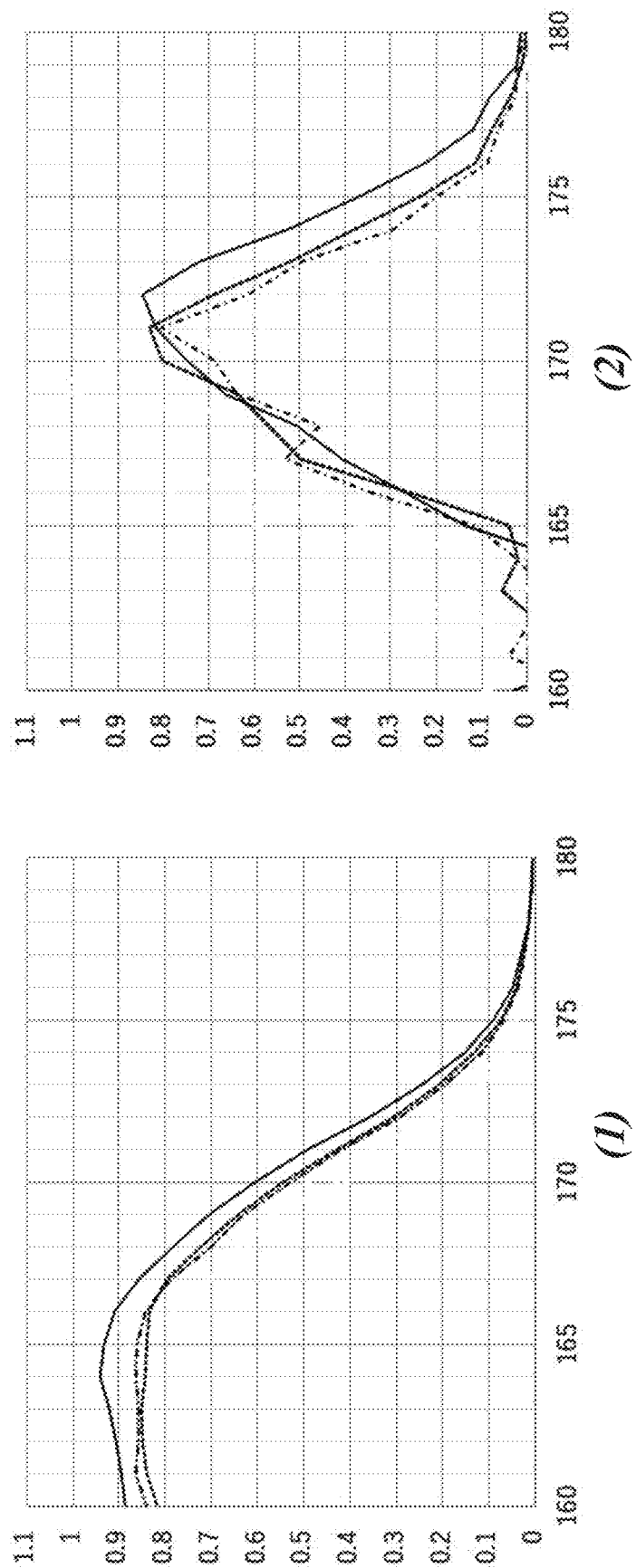
FIG. 14D shows (1) a graph (standard value) showing a response of an edge signal in a case of five diffusion plates and (2) a difference between adjacent pixels of an edge response signal (standard value) in the embodiment of the present invention.
Figure 15A:
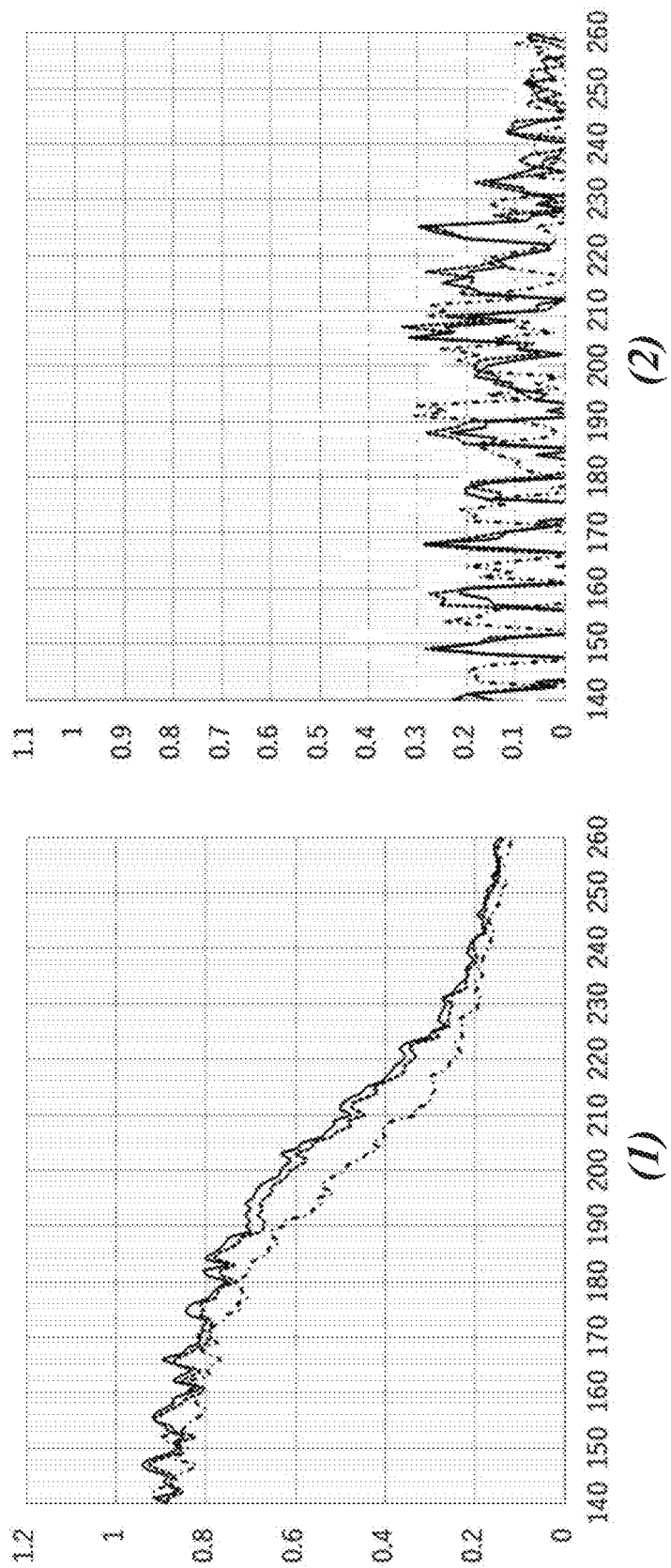
FIG. 15A shows (1) a graph (standard value) showing a response of an edge signal in a case of two diffusion plates and (2) a difference between adjacent pixels of an edge response signal (standard value) in a conventional system.
Figure 15B:
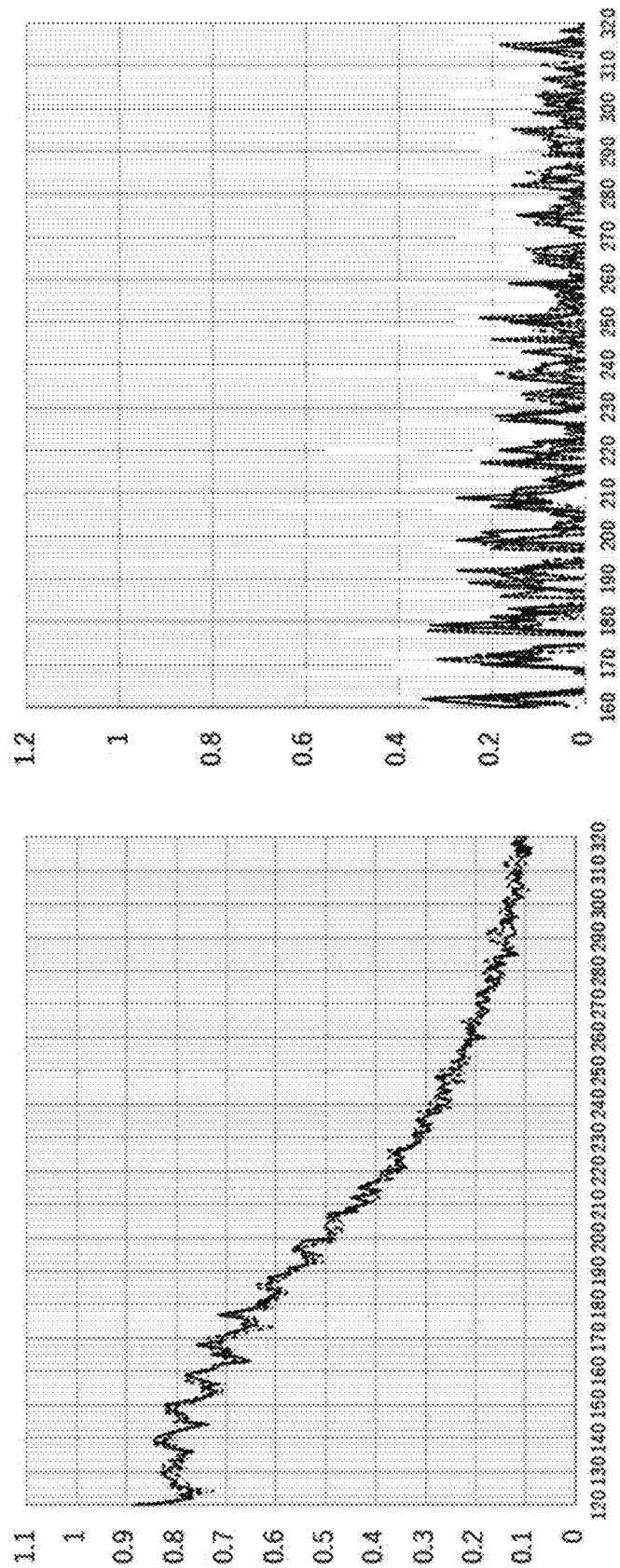
FIG. 15B shows (1) a graph (standard value) showing a response of an edge signal in a case of three diffusion plates and (2) a difference between adjacent pixels of an edge response signal (standard value) in the conventional system.
Figure 15C:
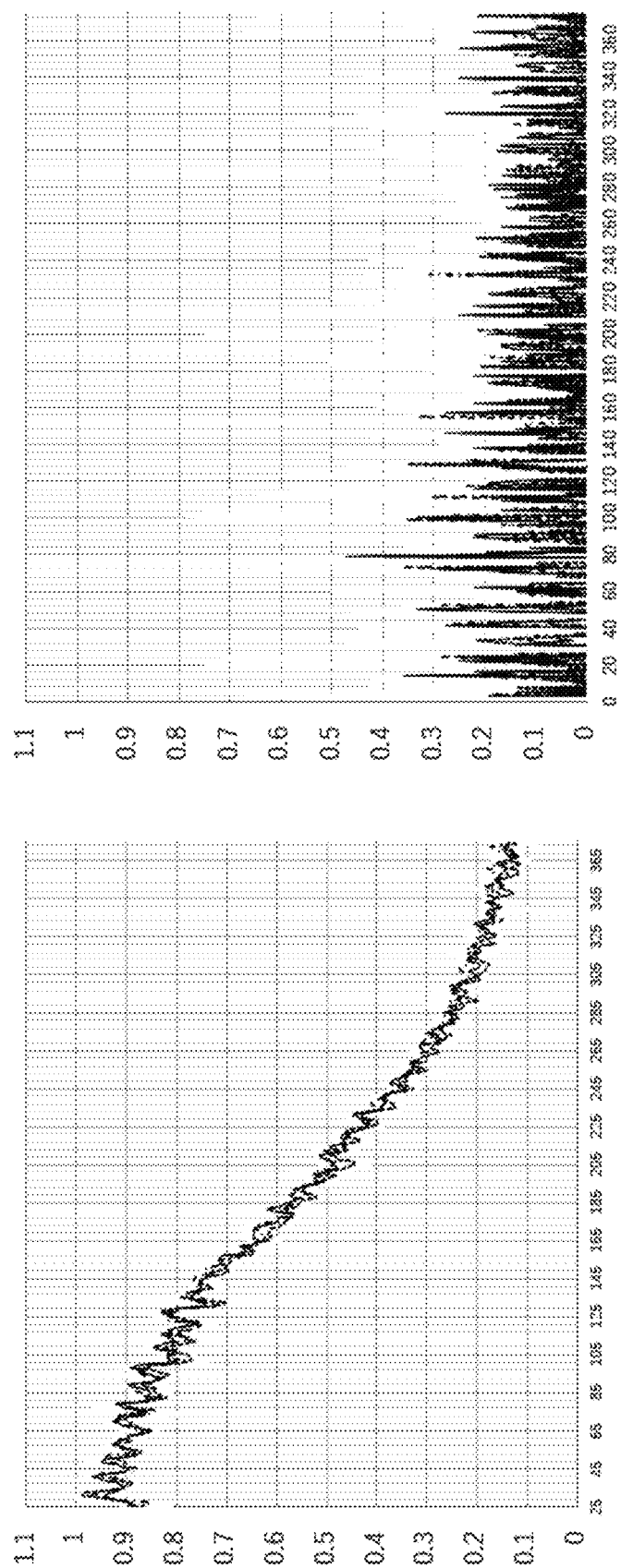
FIG. 15C shows (1) a graph (standard value) showing a response of an edge signal in a case of four diffusion plates and (2) a difference between adjacent pixels of an edge response signal (standard value) in the conventional system.
Figure 15D:
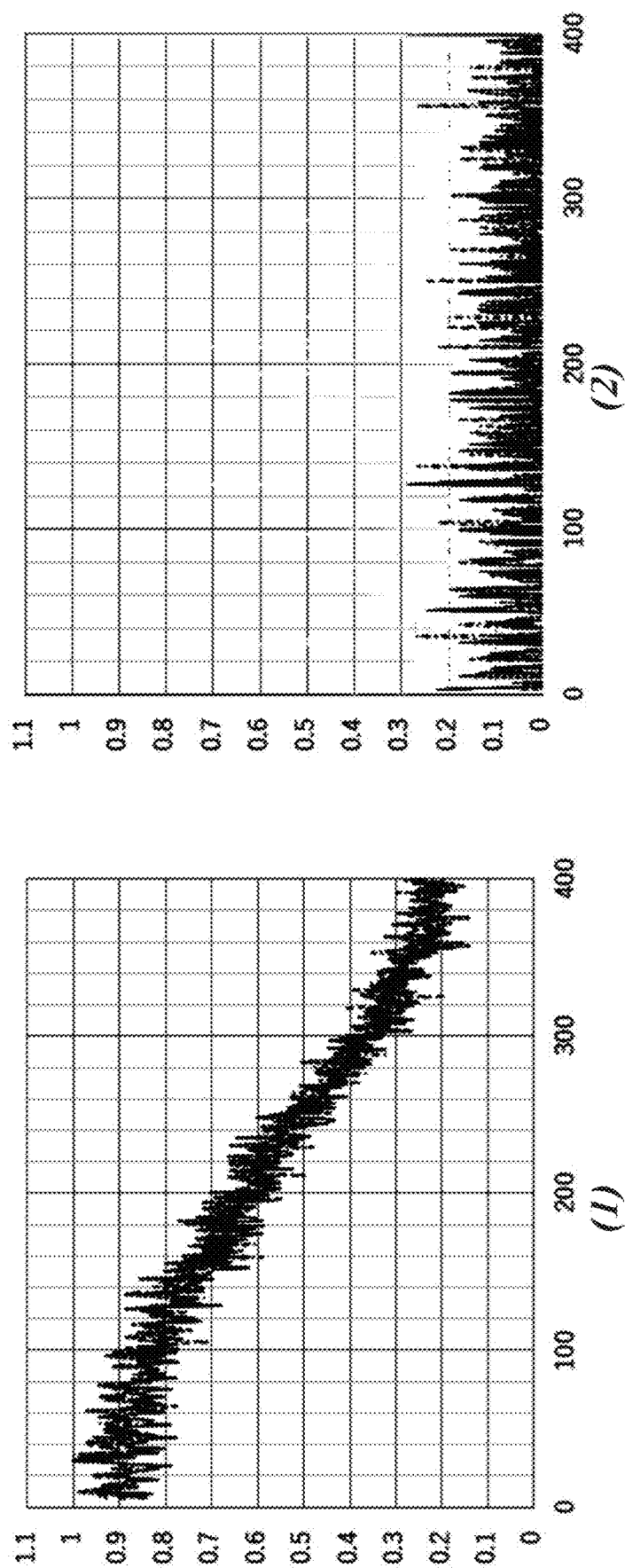
FIG. 15D shows (1) a graph (standard value) showing a response of an edge signal in a case of five diffusion plates and (2) a difference between adjacent pixels of an edge response signal (standard value) in the conventional system.

FIG. 12A shows a schematic diagram of an experiment of an edge method according to the embodiment of the present invention, and FIGS. 14A to 14D show actual measurement results. FIG. 12B shows a schematic diagram of an experiment of an edge method of the conventional technique, and FIGS. 15A to 15D show actual measurement results according to the conventional technique. Note that, in FIGS. 12A and 12B, a part of the light guiding means 32 is omitted for simplification of description. In FIGS. 12A and 12B, reference numeral 34a denotes a diffusion plate. FIG. 14A illustrates a case where there are two diffusion plates, FIG. 14B illustrates a case where there are three diffusion plates, FIG. 14C illustrates a case where there are four diffusion plates, and FIG. 14D illustrates a case where there are five diffusion plates (standard values). FIG. 15A illustrates a case where there are two diffusion plates, FIG. 15B illustrates a case where there are three diffusion plates, FIG. 15C illustrates a case where there are four diffusion plates, and FIG. 15D illustrates a case where there are five diffusion plates (standard values). In this actual measurement result, instead of "foreign substance/defect", in order to verify performance of the present invention, an edge was used as a measurement target, and a rising characteristic of the edge signal was observed. Further, a light scattering transmissive medium was a diffusion plate Kuraray COMOGLAS 432L (thickness: t=2 mm, total light transmittance: 61%, haze: 95%), and in order to check and verify a difference in thickness, the number of plates was set to two, three, four, and five, and maximum thickness was 10 mm. FIG. 14A(1), FIG. 14B(1), FIG. 14C(1), and FIG. 14D(1) illustrate results for each numbers of diffusion plates, and FIG. 15A(1), FIG. 15B(1), FIG. 15C(1), and FIG. 15D(1) illustrate rising characteristics of an edge signal of the conventional system as a comparative example. As a light source, a light beam obtained by collimating an LD (Panasonic LNCT28PS01WW) was used. FIG. 13 illustrates a beam profile of a semiconductor laser in an inspection object. To be regarded as an array, one LD was moved for each pixel pitch, and signals of pixels corresponding in one-to-one manner were sequentially obtained.

FIGS. 14A(1), 14B(1), 14C(1), and 14D(1) are graphs illustrating an edge response (relative intensity) of the above in an example of the embodiment of the present invention. A pixel dimension is about 62 μm in the main scanning direction. Further, FIGS. 14A(2), 14B(2), 14C(2), and 14D(2) illustrate differences (relative intensities) of output from adjacent pixels. As is clear from FIG. 14A(2), FIG. 14B(2), FIG. 14C(2), and FIG. 14D(2), there is a clear difference between adjacent pixels, and a difference in relative intensity is 10% of a peak value. Therefore, it can be seen that discrimination can be performed for each pixel (corresponding to 400 dpi). Further, when a dimension of an element is reduced, a pixel dimension and a pitch are reduced and narrowed, it is possible to realize a resolution of 600 dpi or 1200 dpi, or more. Size (pixel dimension) of a light receiving element is preferably set to satisfy 200 dpi or more.

FIGS. 15A to 15D illustrate an edge response (relative intensity) according to the conventional technique as a comparative example. There is a clear difference between the present invention and the conventional technique, and it can be seen that in the conventional technique, there is no pixel resolution in any diffusion plate, and a graph showing a difference is buried in background noise (random noise), and foreign substance detection is impossible. On the other hand, in the present invention, it can be seen that foreign substance can be detected at any thickness of the diffusion plate.

Figure 16:
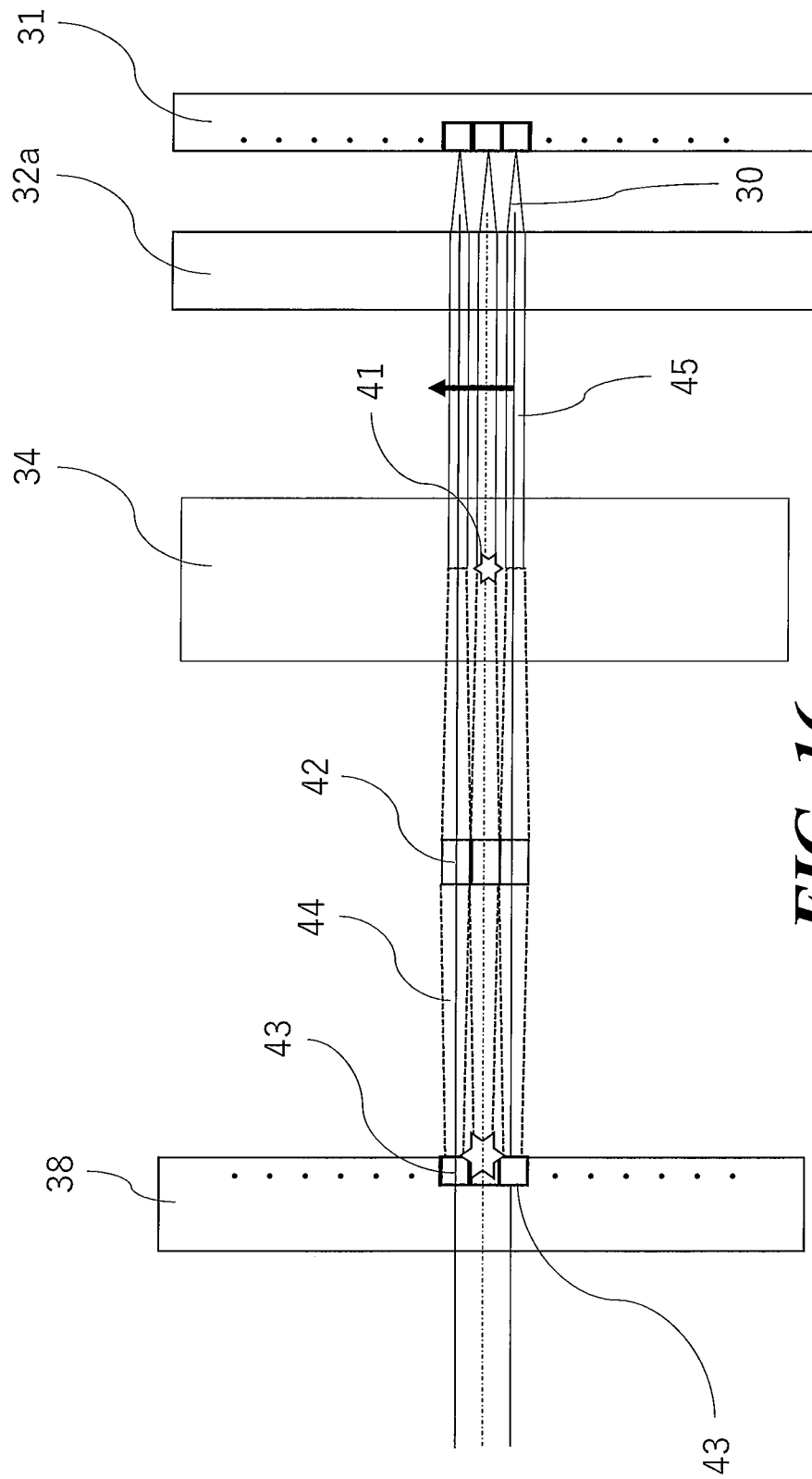
FIG. 16 is a schematic diagram illustrating a simulation model of the present invention.
Figure 17A:
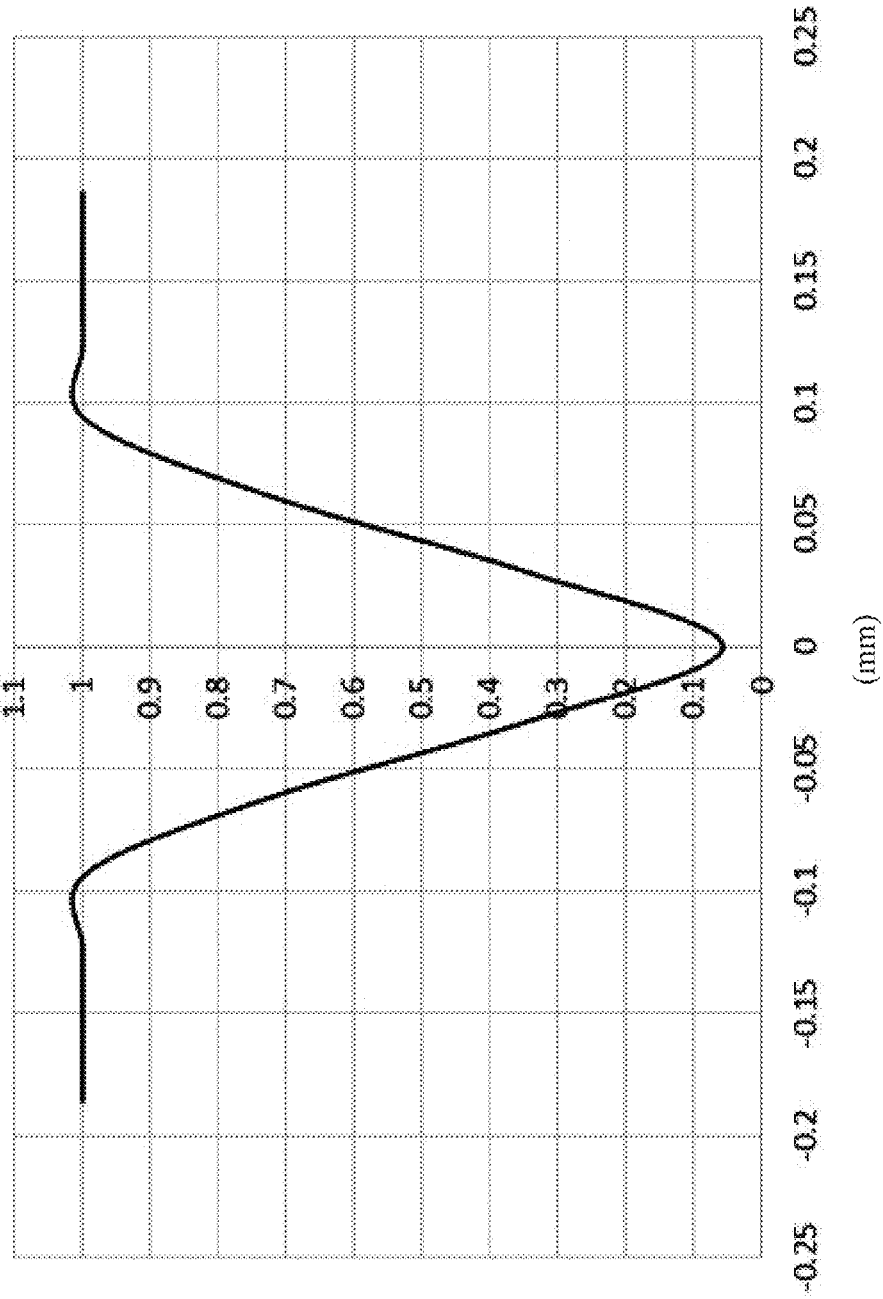
FIG. 17A is a graph showing a result of simulation and shows a case where a foreign particle is located at the center of a light scattering transmissive medium and concentration of scattering particles in the light scattering transmissive medium is 0.00 wt % (% by weight).
Figure 17B:
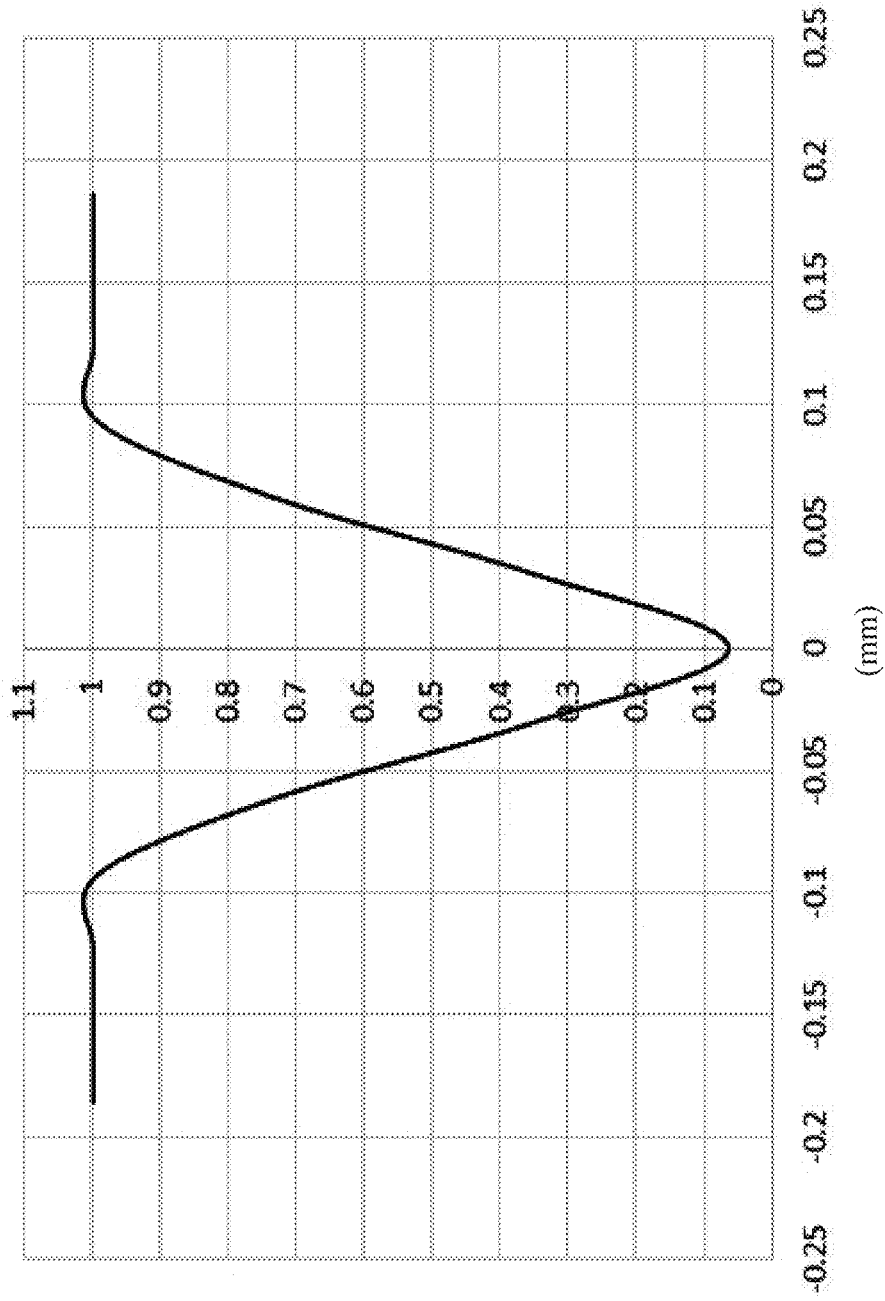
FIG. 17B is a graph showing a result of simulation and shows a case where a foreign particle is located at the center of a light scattering transmissive medium and concentration of scattering particles in the light scattering transmissive medium is 0.04 wt %.
Figure 17C:
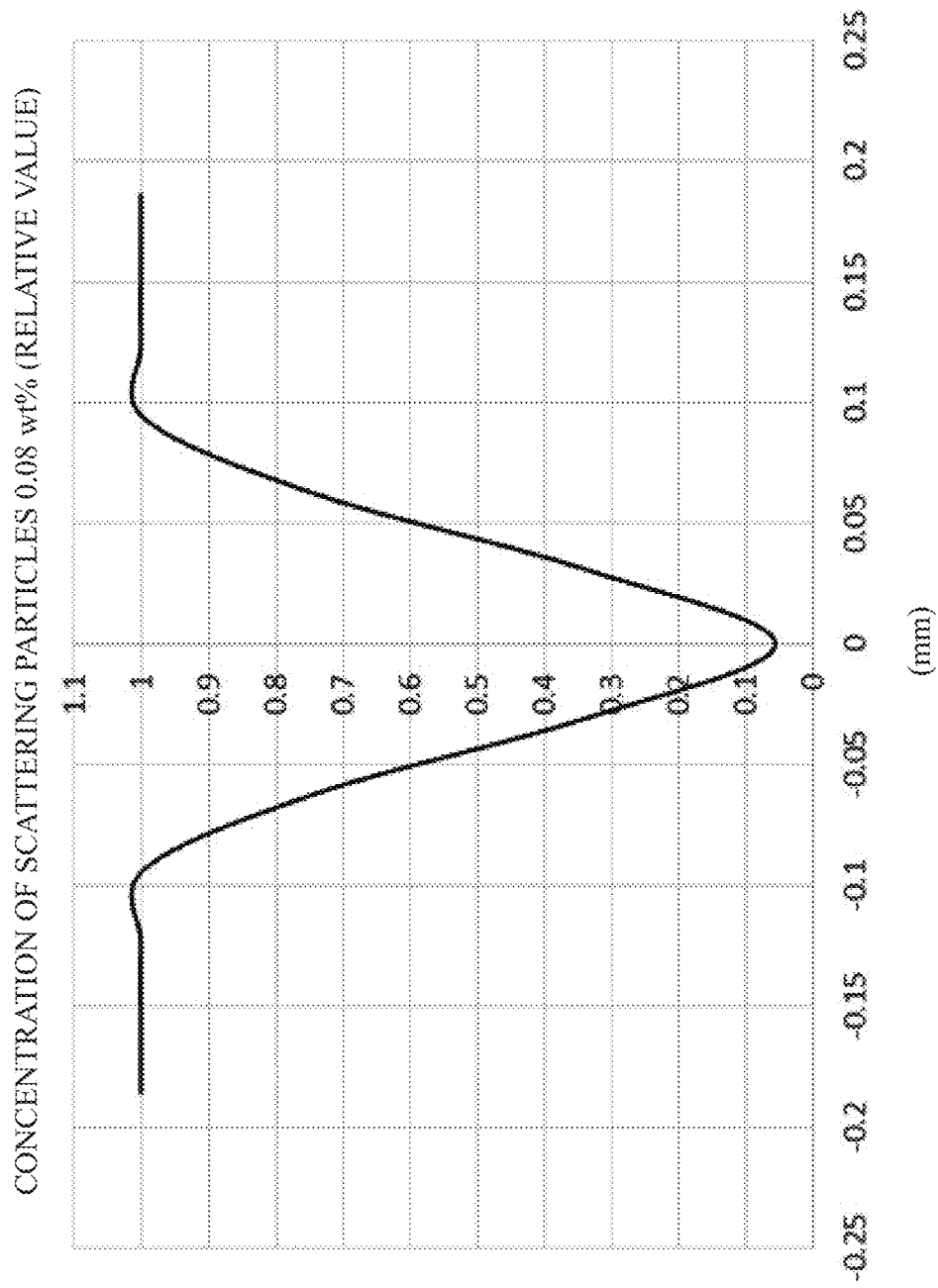
FIG. 17C is a graph showing a result of simulation and shows a case where a foreign particle is located at the center of a light scattering transmissive medium and concentration of scattering particles in the light scattering transmissive medium is 0.08 wt %.
Figure 17D:
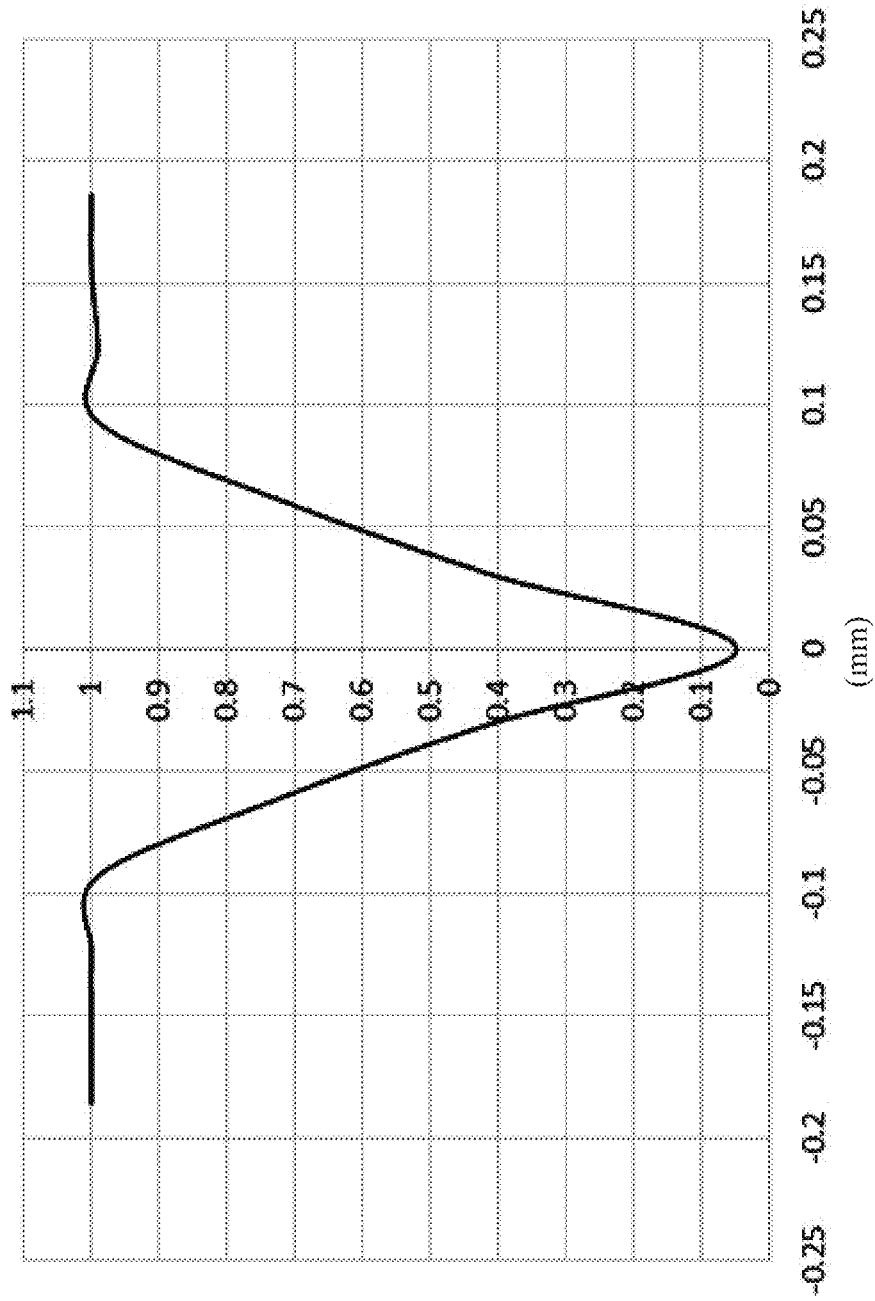
FIG. 17D is a graph showing a result of simulation and shows a case where a foreign particle is located at the center of a light scattering transmissive medium and concentration of scattering particles in the light scattering transmissive medium is 0.12 wt %.
Figure 17E:
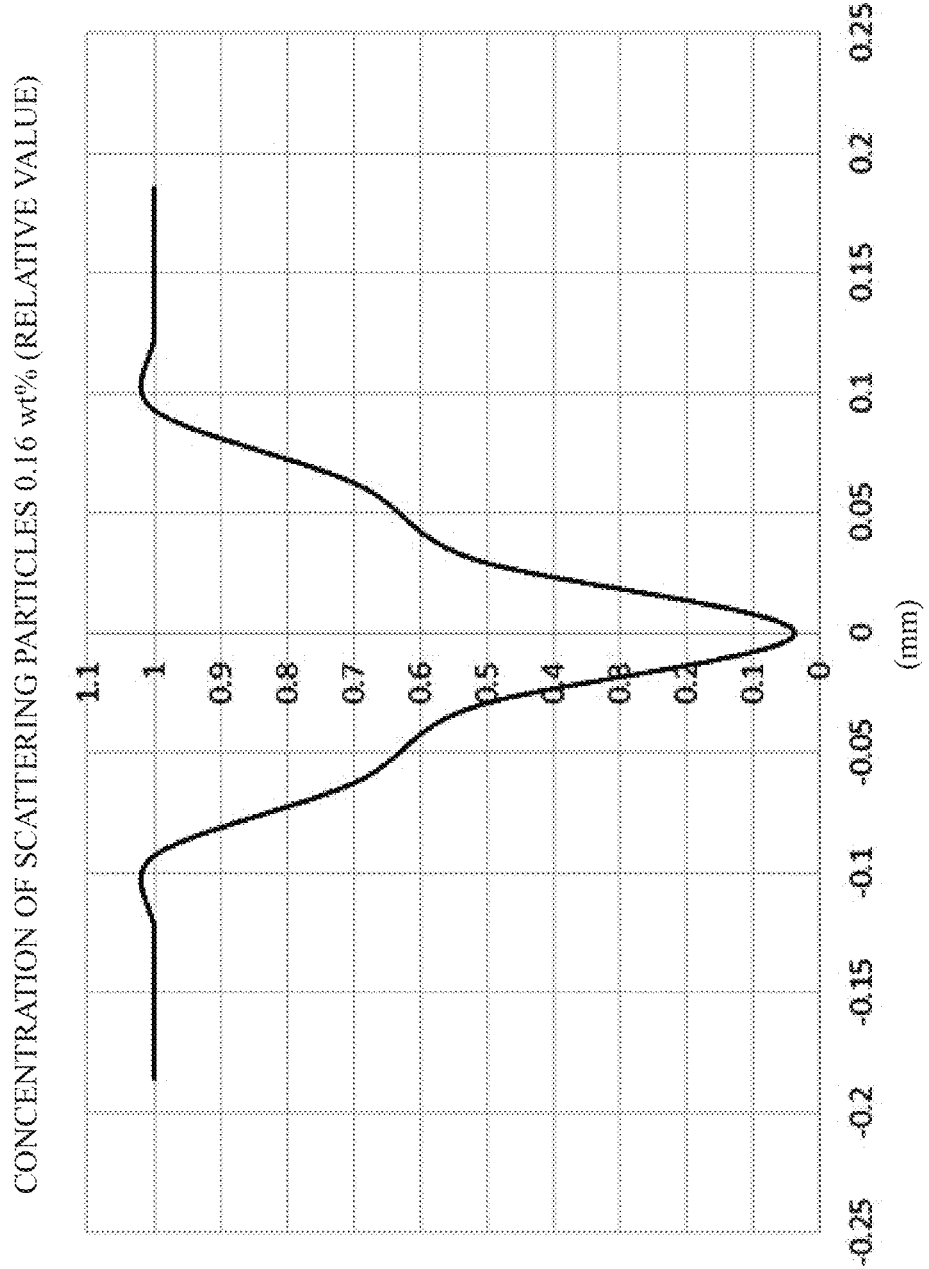
FIG. 17E is a graph showing a result of simulation and shows a case where a foreign particle is located at the center of a light scattering transmissive medium and concentration of scattering particles in the light scattering transmissive medium is 0.16 wt %.
Figure 17F:
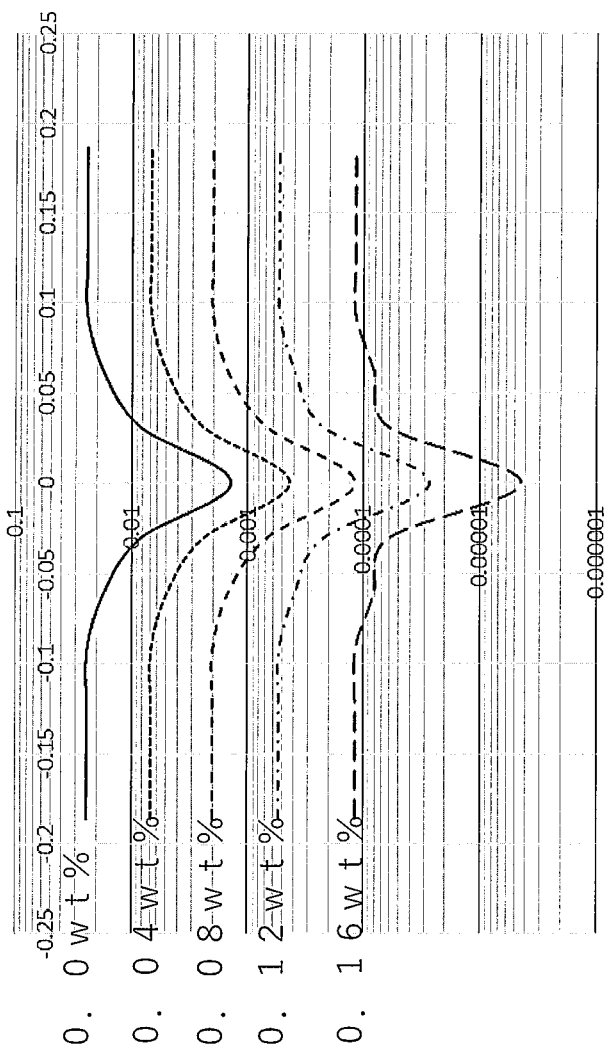
FIG. 17F is a graph illustrating a result of simulation in a case where a foreign particle is located at the center of a light scattering transmissive medium and illustrates output comparison at each concentration of the light scattering transmissive medium.
Figure 18A:
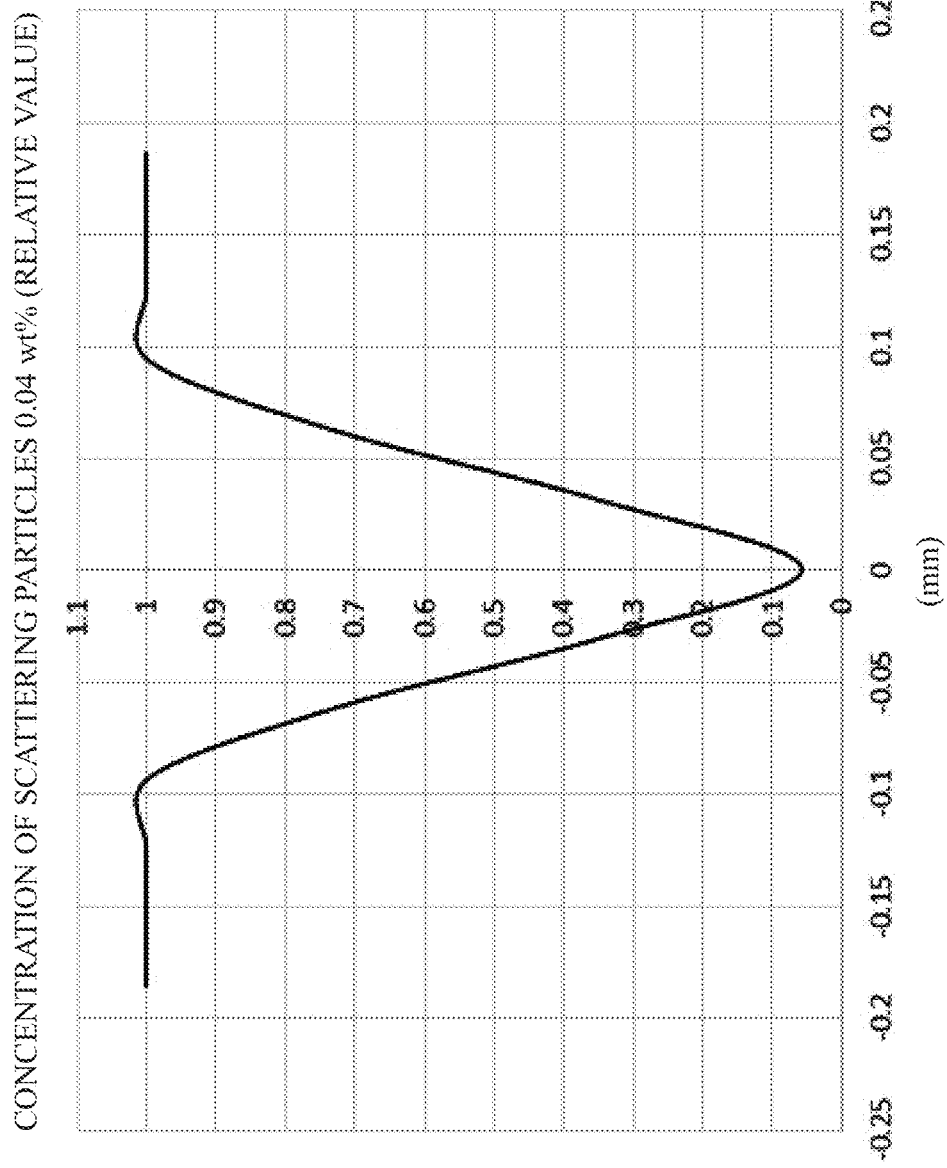
FIG. 18A is a graph showing a result of simulation and shows a case where a foreign particle is located in a light source side end portion of a light scattering transmissive medium and concentration of scattering particles in the light scattering transmissive medium is 0.00 wt %.
Figure 18B:
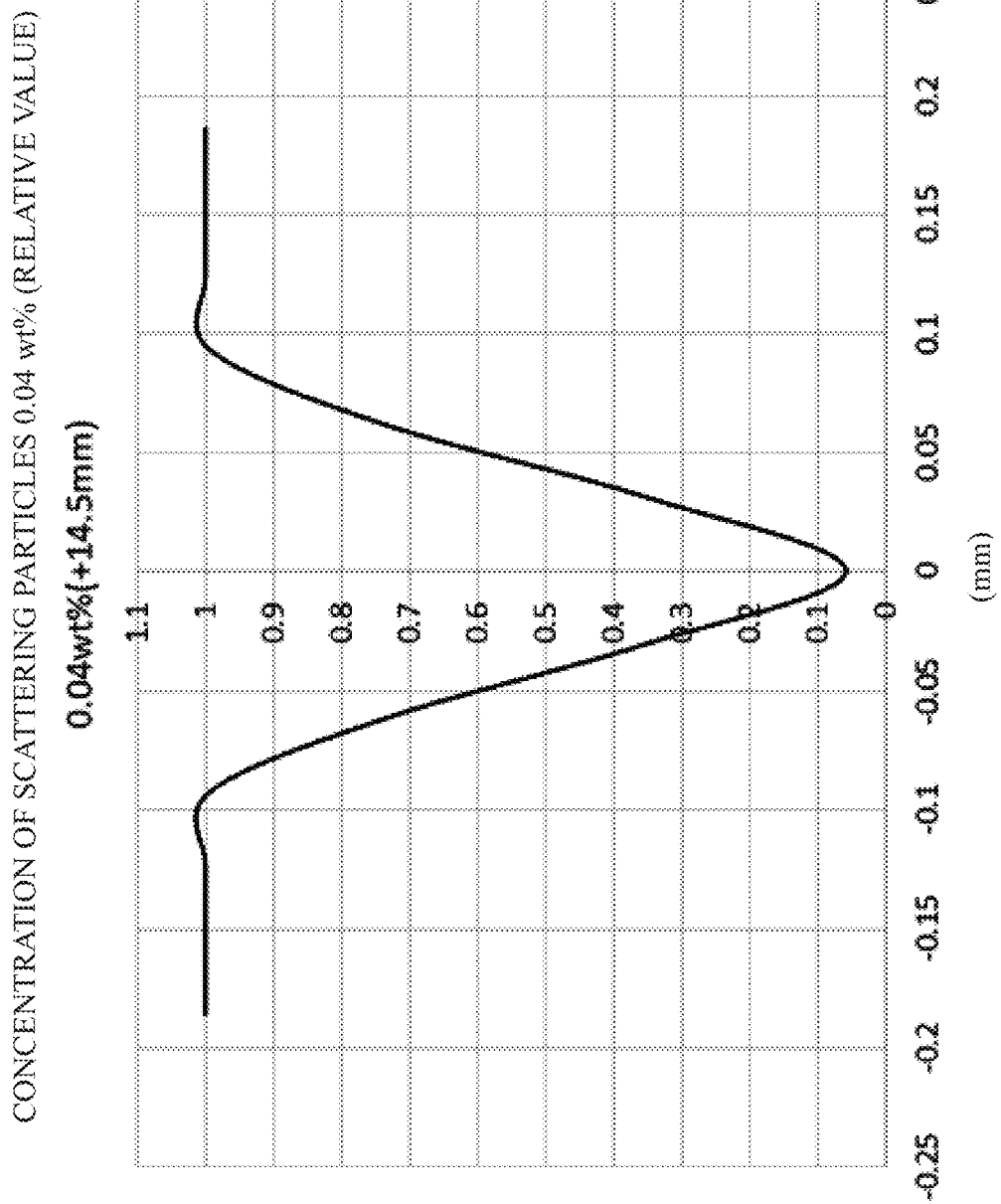
FIG. 18B is a graph showing a result of simulation and shows a case where a foreign particle is located in a light source side end portion of a light scattering transmissive medium and concentration of scattering particles in the light scattering transmissive medium is 0.04 wt %.
Figure 18C:
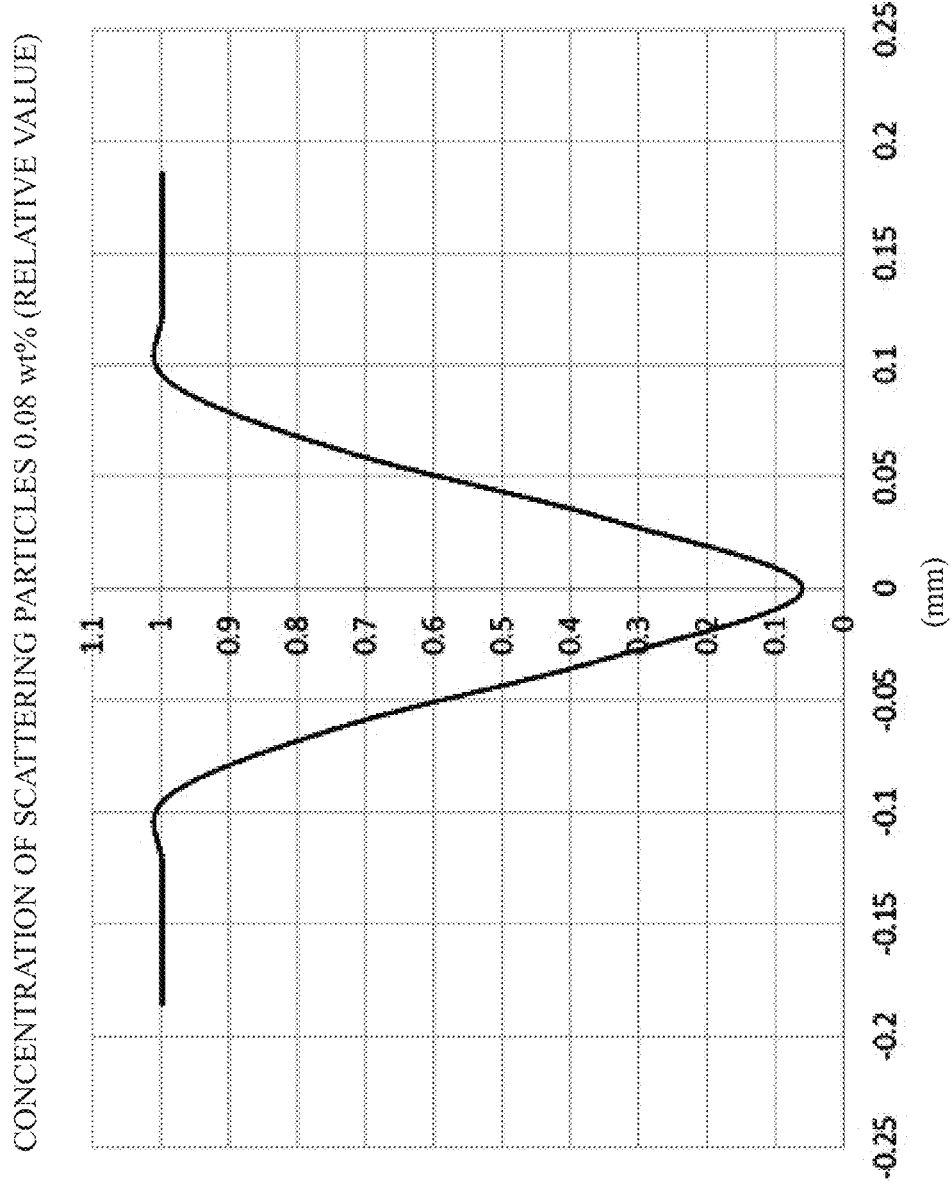
FIG. 18C is a graph showing a result of simulation and shows a case where a foreign particle is located in a light source side end portion of a light scattering transmissive medium and concentration of scattering particles in the light scattering transmissive medium is 0.08 wt %.
Figure 18D:
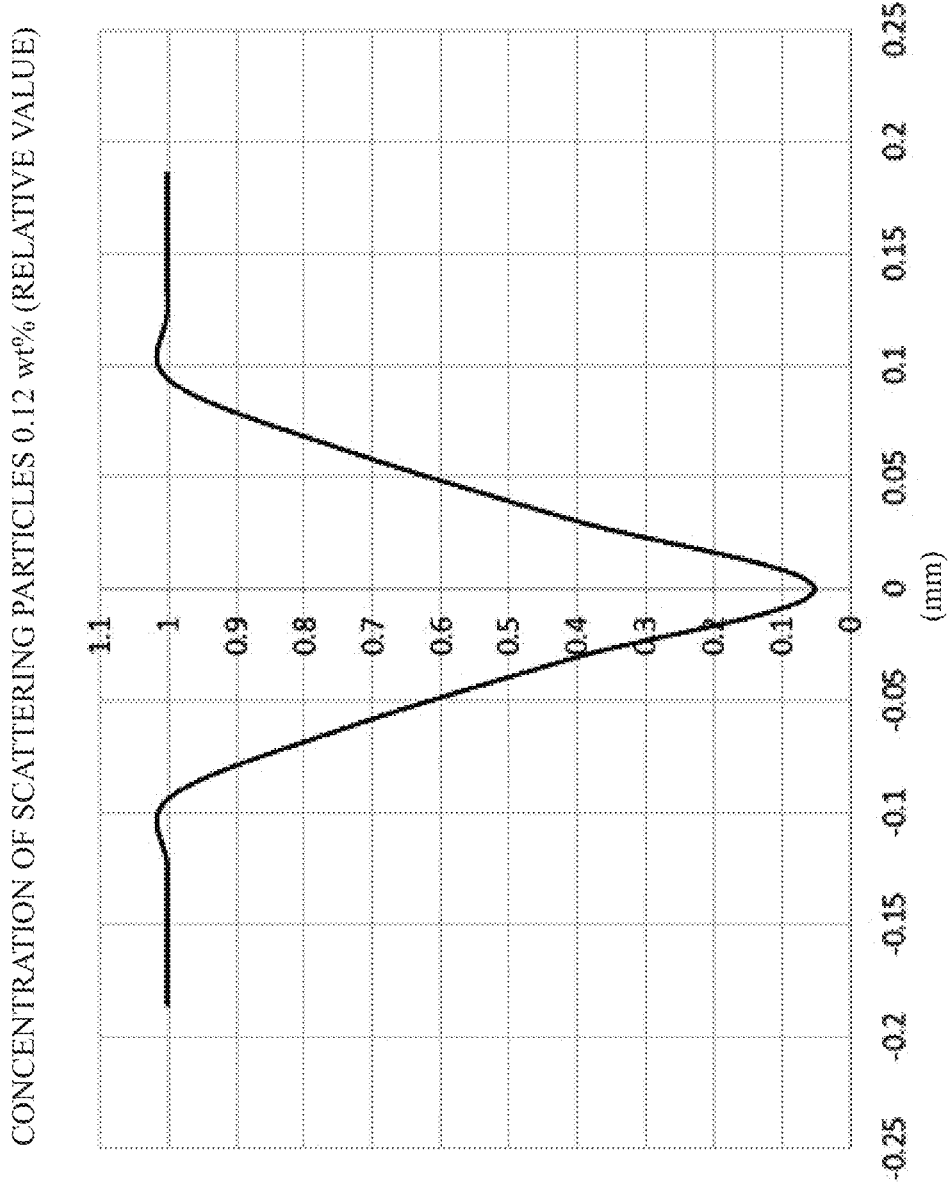
FIG. 18D is a graph showing a result of simulation and shows a case where a foreign particle is located in a light source side end portion of a light scattering transmissive medium and concentration of scattering particles in the light scattering transmissive medium is 0.12 wt %.
Figure 18E:
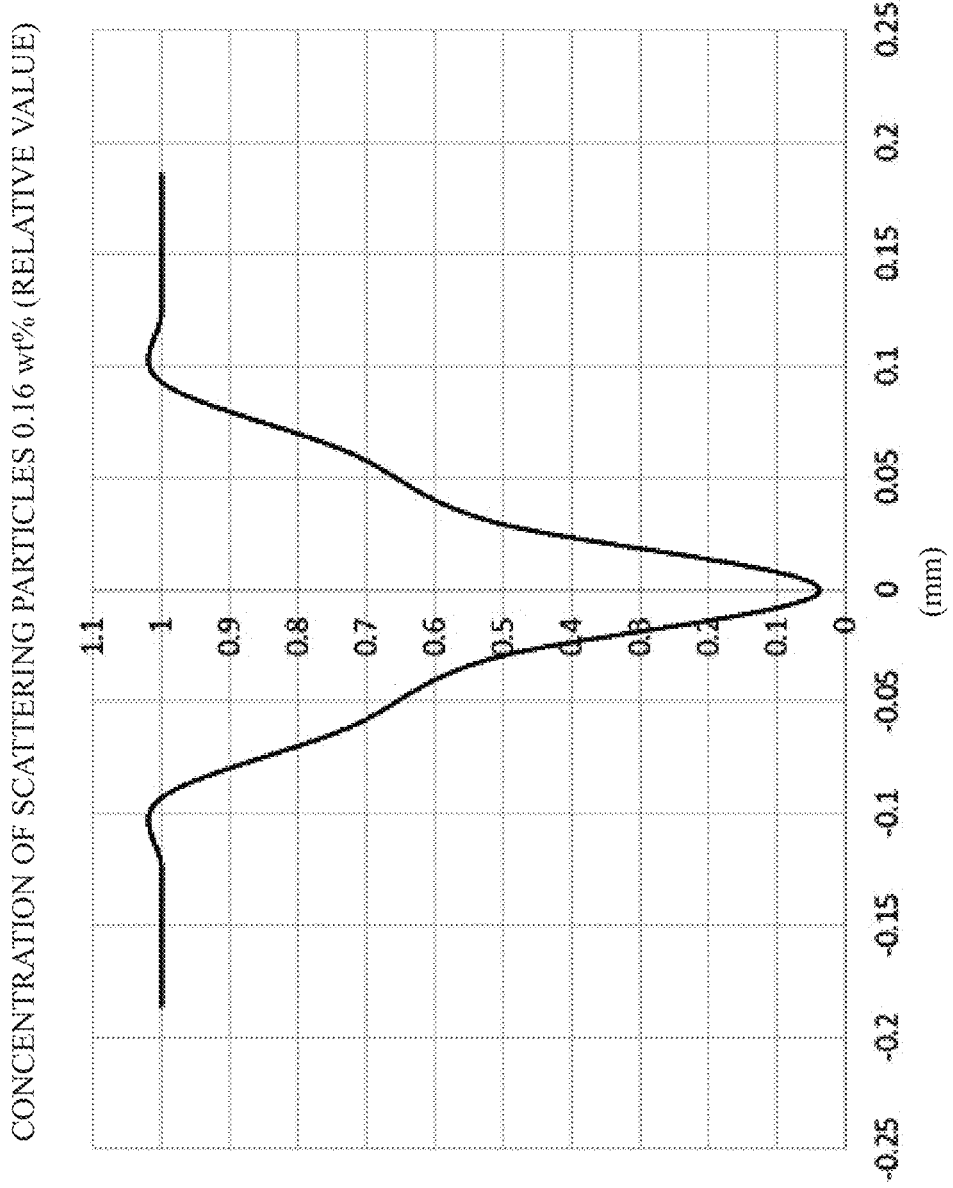
FIG. 18E is a graph showing a result of simulation and shows a case where a foreign particle is located in a light source side end portion of a light scattering transmissive medium and concentration of scattering particles in the light scattering transmissive medium is 0.16 wt %.
Figure 18F:
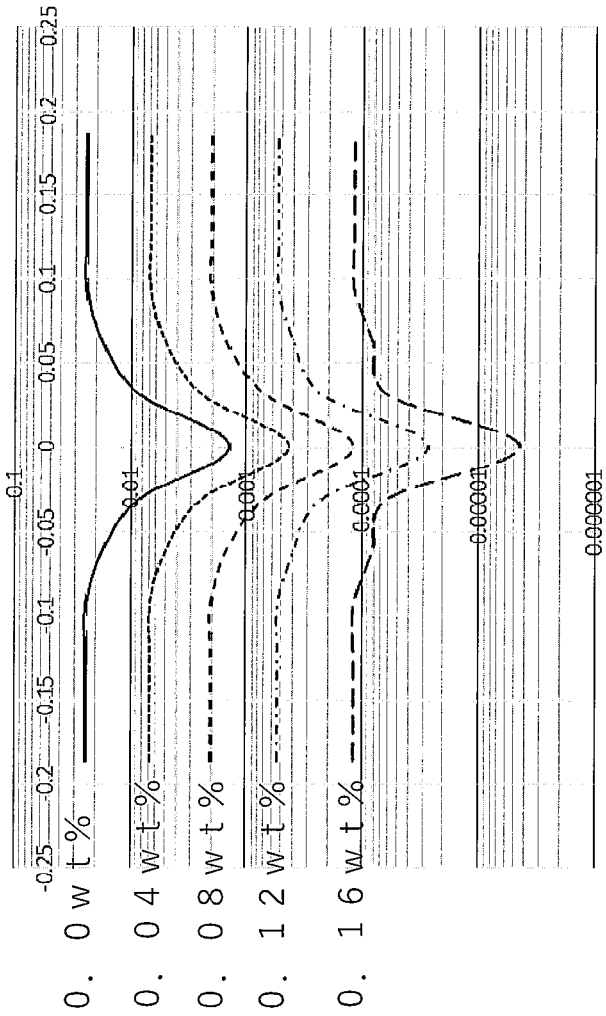
FIG. 18F is a graph illustrating a result of simulation in a case where a foreign particle is located in a light source side end portion of a light scattering transmissive medium and illustrates output comparison at each concentration.
Figure 19A:
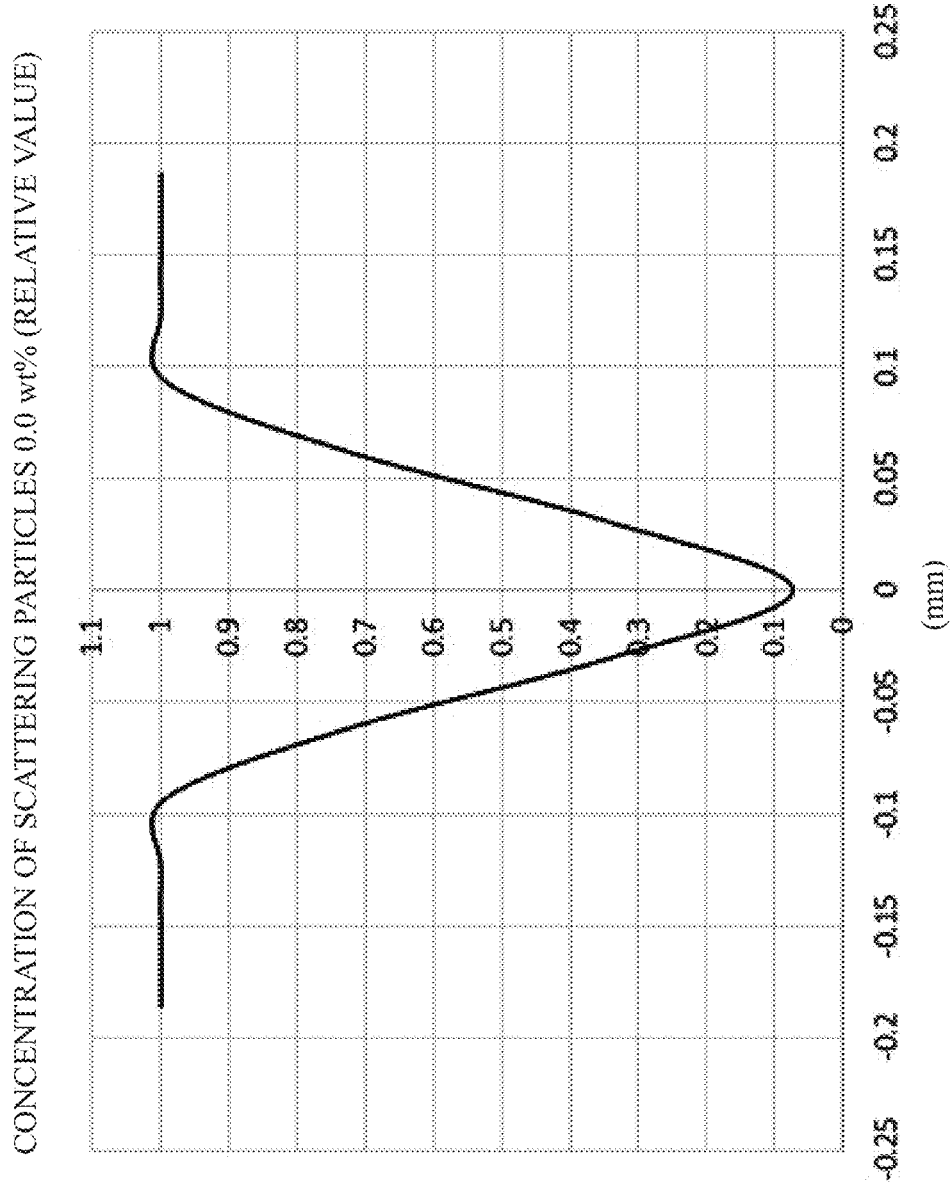
FIG. 19A is a graph showing a result of simulation and shows a case where a foreign particle is located in a light receiving sensor side end portion of a light scattering transmissive medium and concentration of scattering particles in the light scattering transmissive medium is 0.00 wt %.
Figure 19B:
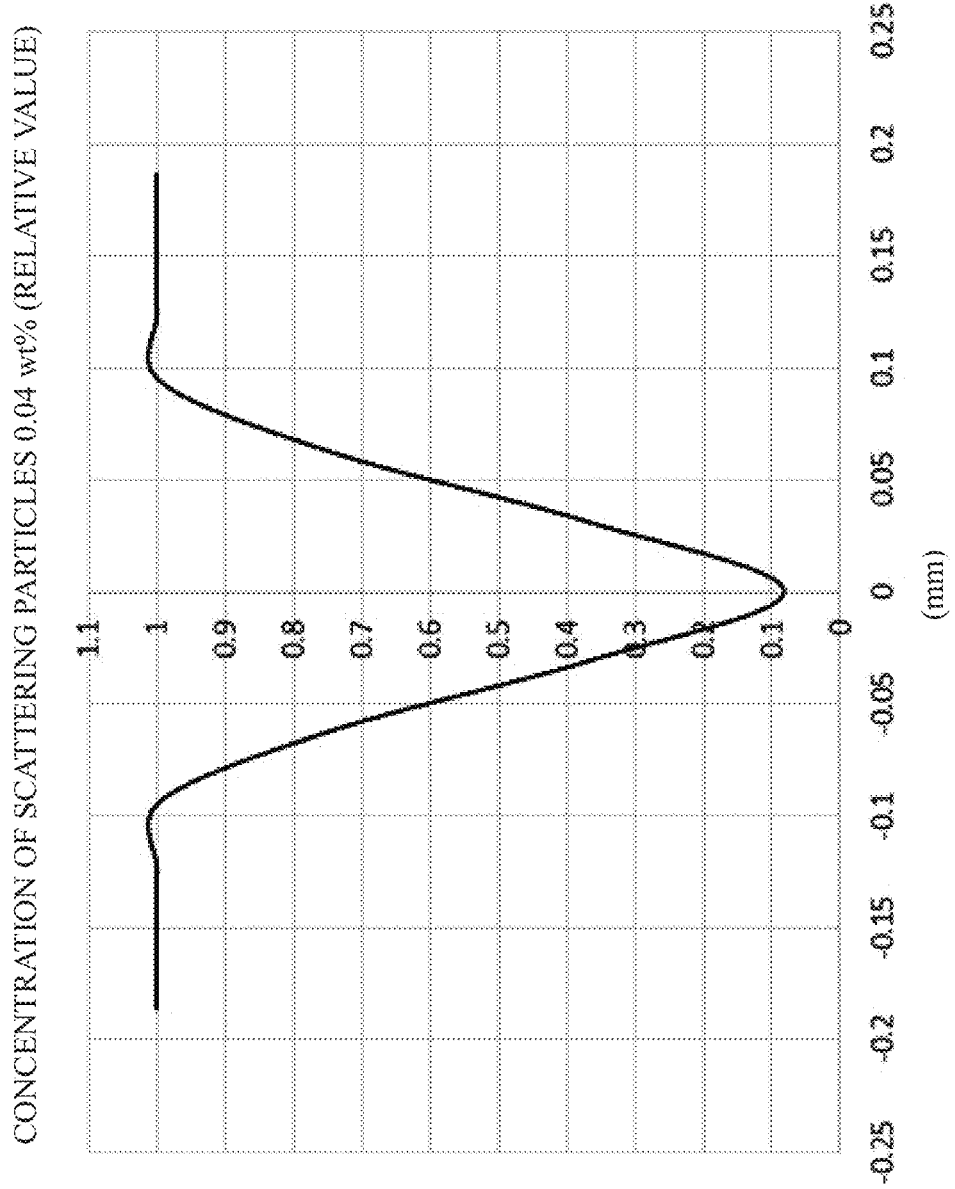
FIG. 19B is a graph showing a result of simulation and shows a case where a foreign particle is located in a light receiving sensor side end portion of a light scattering transmissive medium and concentration of scattering particles in the light scattering transmissive medium is 0.04 wt %.
Figure 19C:
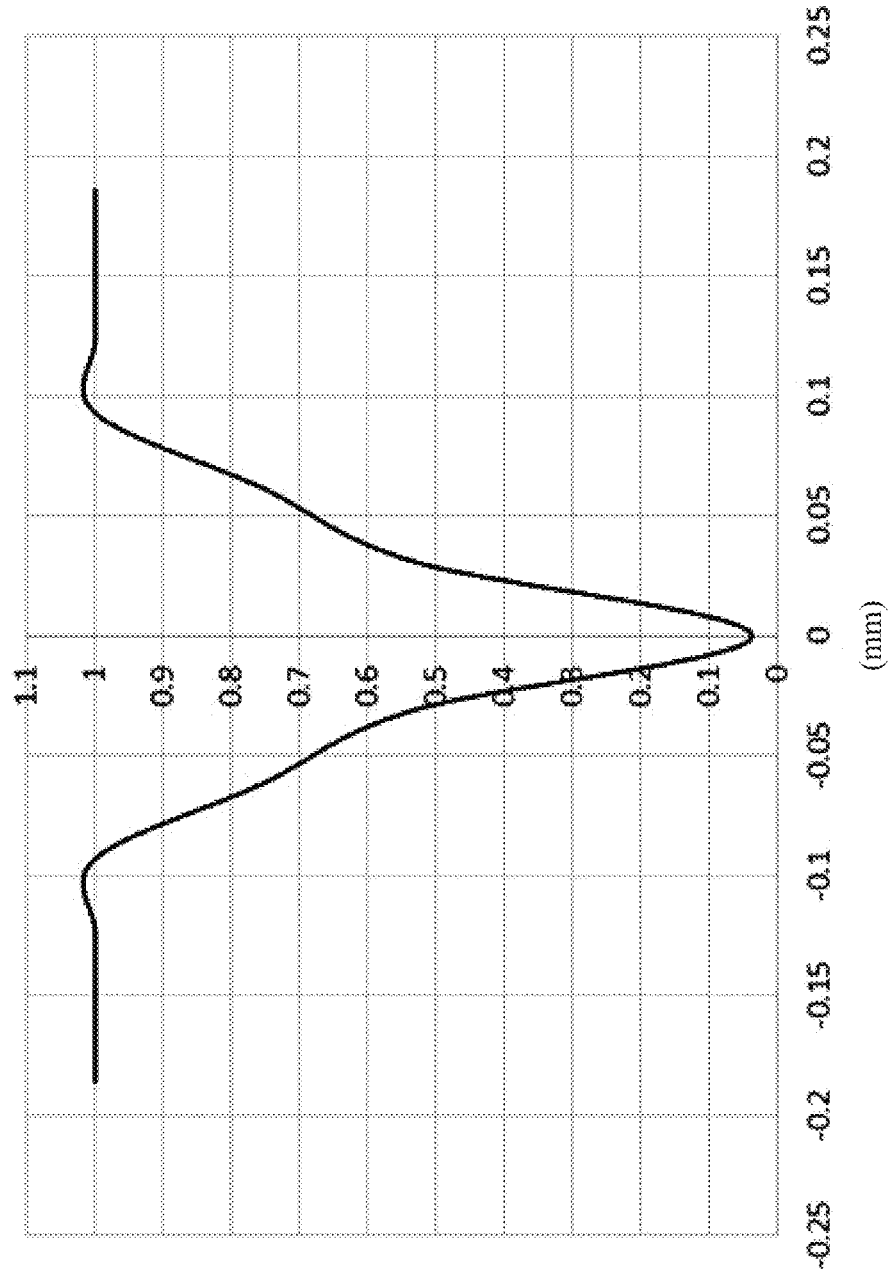
FIG. 19C is a graph showing a result of simulation and shows a case where a foreign particle is located in a light receiving sensor side end portion of a light scattering transmissive medium and concentration of scattering particles in the light scattering transmissive medium is 0.08 wt %.
Figure 19D:
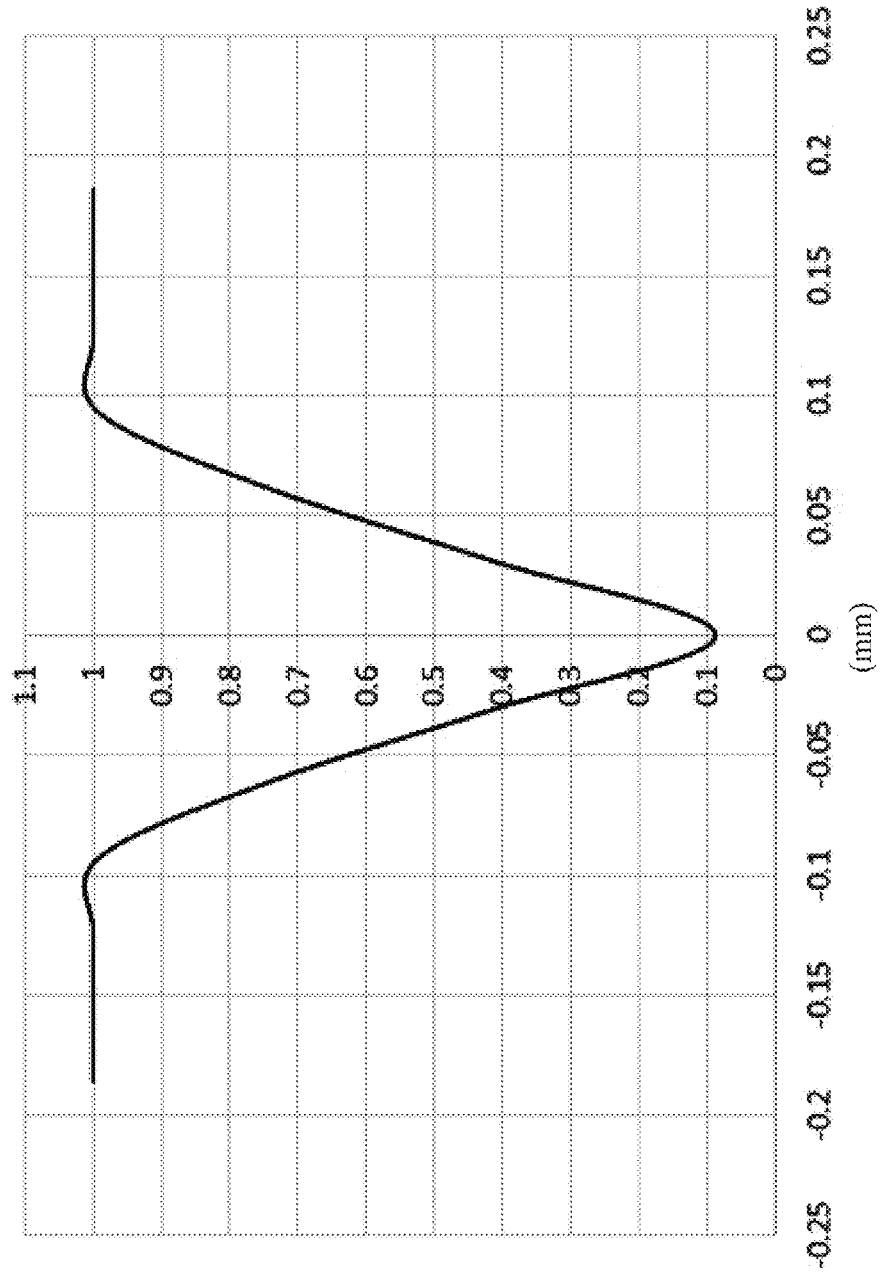
FIG. 19D is a graph showing a result of simulation and shows a case where a foreign particle is located in a light receiving sensor side end portion of a light scattering transmissive medium and concentration of scattering particles in the light scattering transmissive medium is 0.12 wt %.
Figure 19E:
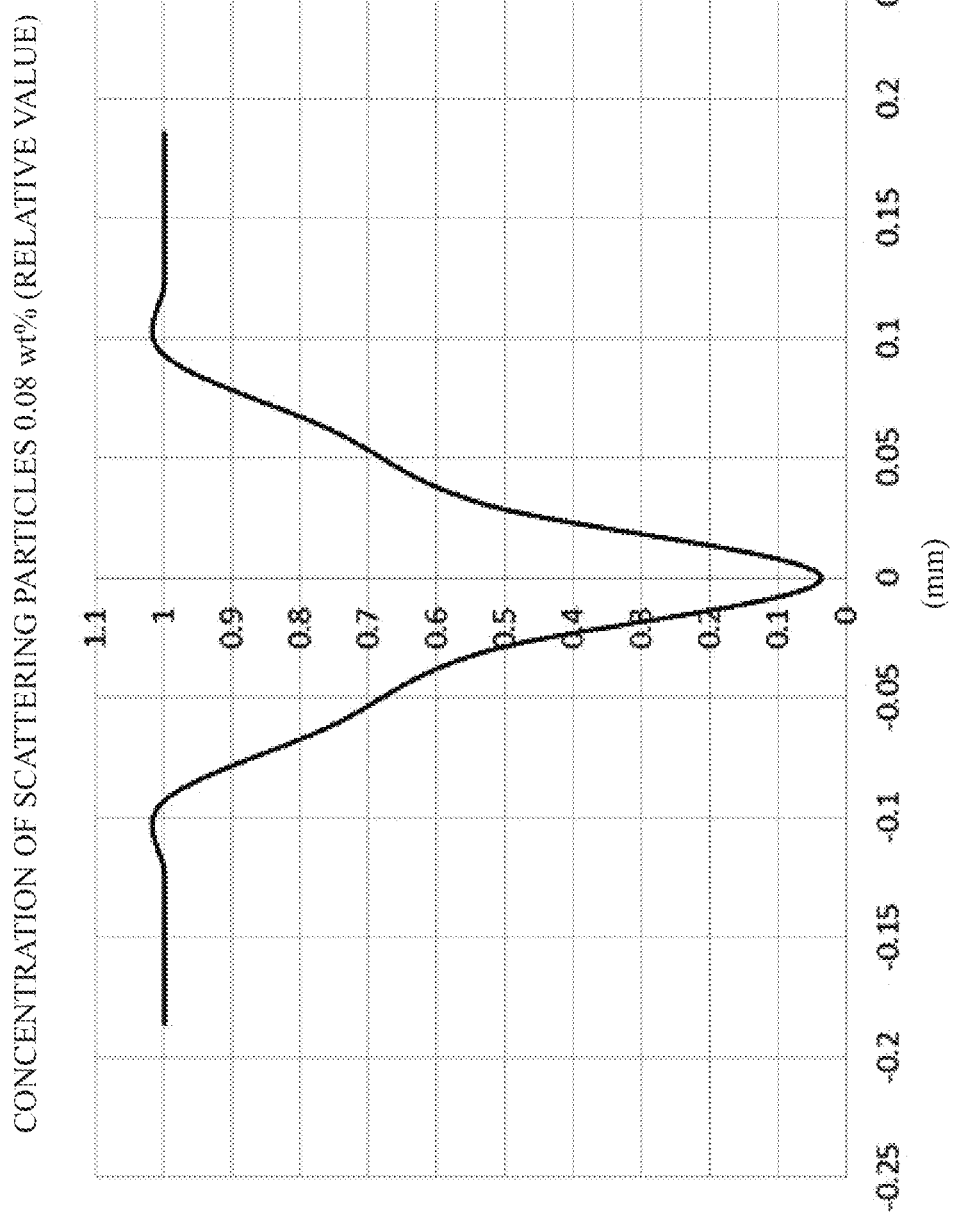
FIG. 19E is a graph showing a result of simulation and shows a case where a foreign particle is located in a light receiving sensor side end portion of a light scattering transmissive medium and concentration of scattering particles in the light scattering transmissive medium is 0.16 wt %.
Figure 19F:
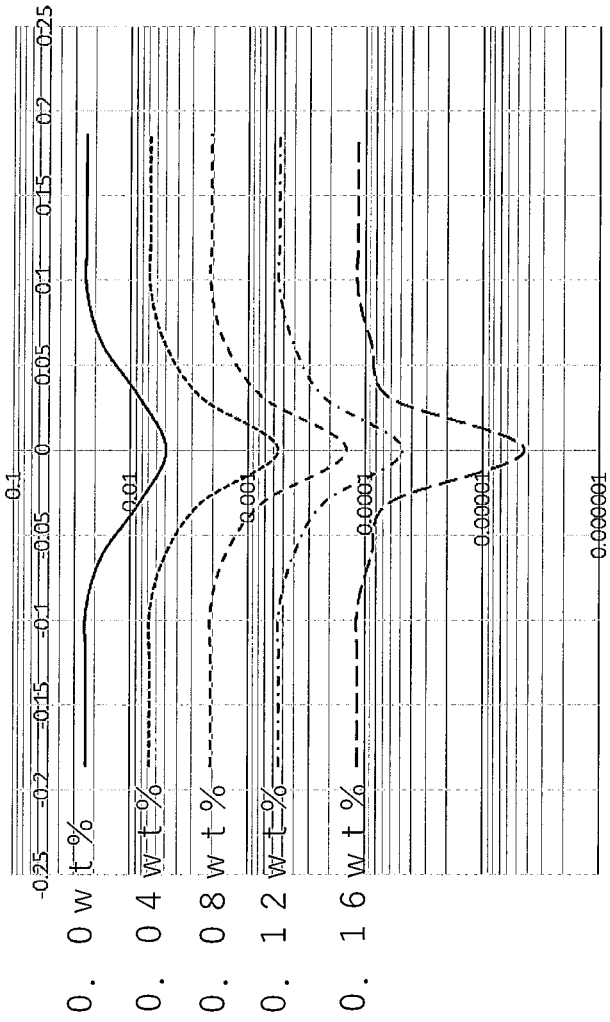
FIG. 19F is a graph illustrating a result of simulation in a case where a foreign particle is located in a light receiving sensor side end portion of a light scattering transmissive medium and illustrates output comparison at each concentration.

Next, a result of obtaining a response of a light receiving sensor when a "foreign substance/defect" exists in a light scattering transmissive medium having thickness (t=30 mm) in an optical axis direction by a simulation model will be described. A schematic diagram of the model is illustrated in FIG. 16. Note that, in FIG. 16, a part of the light guiding means 32 is omitted for simplification of description. PMMA was selected as an inspection object, and silicone spherical particles having particle size of 2 μm were used as light scattering particles. Concentration was varied from 0.04 wt % to 0.20 wt %. A light source was collimated and had cross-sectional size of 150 μm larger than that of a light receiving element (main scanning direction size: 62 μm). FIGS. 17A to 17F are graphs showing simulation results, and FIGS. 17A to 17F are graphs showing simulation results. A foreign substance was a sphere having a diameter of 100 μm and an absorber having an interface with transmittance of 0%. Further, a foreign particle is located at the center of the inspection object. A foreign particle is located at the center of the inspection object. FIG. 17A illustrates a case where scattering particle concentration is 0.00 wt %, FIG. 17B illustrates a case where scattering particle concentration is 0.04 wt %, FIG. 17C illustrates a case where scattering particle concentration is 0.08 wt %, FIG. 17D illustrates a case where scattering particle concentration is 0.12 wt %, FIG. 17E illustrates a case where scattering particle concentration is 0.16 wt %, and FIG. 17F illustrates output comparison at each concentration.

Further, FIGS. 18A to 18F and FIGS. 19A to 19F are graphs showing simulation results of a foreign particle at a position separated by ±14.5 mm from the center of the inspection object. That is, the foreign particle is located at a depth of 0.5 mm from an end portion of the inspection object. FIGS. 18A to 18F illustrate a case where the foreign particle is located at a light source side end portion of the inspection object, and FIGS. 19A to 19F illustrate a case where the foreign particle is located at a light receiving element side end portion of the inspection object. According to the simulation results, it can be seen that both have a response similar to that in the case of the foreign article in the central portion of the light scattering transmissive medium, and well represent the effect of the present invention, and suitability for detecting a "foreign substance/defect" in a thick light scattering transmissive medium is extremely excellent.

As described above, it can be seen that the present invention is excellent in detection accuracy for a "foreign substance/defect" in a light scattering transmissive medium as compared with the conventional technique. Further, the system of the present invention is also applicable to detection of a "foreign substance/defect" of a reflective medium. Furthermore, it is also possible to generate an image on the basis of a light receiving signal from a light scattering transmissive medium and to further analyze a defective product removed based on a level of a detection signal. In this case, offline inspection is assumed to be mainly performed instead of online inspection, but online analysis can also be automatically performed by increasing a signal processing speed. As described above, it is possible to perform an inspection which has not been able to be applied in the conventional technique, to further improve quality of an inspection, and to improve quality of a product as an inspection object.

Operation and Effect

As described above, by using a collimated parallel light beam having a sufficiently small diameter or adjusting and using a beam waist so as to form a substantially parallel light beam in an inspection object having light scattering transparency, and further, by adjusting a light beam narrowing angle or a spreading angle according to an inspection object, overlap of spread of light due to light scattering (diffusion) can be suppressed. In addition, by selecting an output signal from a pixel so as to receive only a signal in the vicinity of an optical axis of a light beam by a light receiving element of one pixel unit corresponding one-to-one to a light source at each irradiation position, it is possible to suppress crosstalk between pixels, and it is possible to separate and detect light that causes background noise due to scattered light (diffused light), directly incident light, or the like and a light quantity change derived from a "foreign substance/defect". Accordingly, a "foreign substance/defect" object in an inspection object can be clarified, and accurate inspection can be performed. Further, the light guiding means enables detection with high resolution. Furthermore, in a case where a light receiving system that enlarges a beam interval that is once reduced is provided, it is possible to unify intervals between the light receiving elements while maintaining resolution for a "foreign substance/defect" in an inspection object, and thus, it is possible to have a cost reduction effect and improve S/N by increasing size of the light receiving element.

DESCRIPTION OF REFERENCE SIGNS 10 linear illumination light source
11 lens array
12 light receiving unit
31 light source
32 light guiding means
32a collimator lens array
32b optical fiber array
32c lens array
32d collimator lens
32e optical fiber
32f lens
32g, 32h, 32i, 32k combination lens
33 light beam
34 inspection object
36 scattered light
37 light receiving lens array
38 light receiving element array
39 focal position
42 light receiving lens array
45 light beam
74 light receiving lens array
76 inspection object
77 pixel
91 inspection object
92 light source
94 collimator lens
95 light receiving lens array

The invention claimed is:

1. A foreign substance/defect inspection device, comprising:
an illumination optical system including optical scanning means that performs scanning with a) a light beam obtained by collimating light emitted from a plurality of light sources arranged to be separated linearly with respect to at least one or more inspection surfaces in an inspection object having light scattering property, or a light beam obtained by further substantially concentrating a collimated light beam, or b) a light beam obtained by adjusting to narrow, or a light beam obtained by adjusting to expand, light emitted from a plurality of light sources arranged to be separately linearly with respect to at least one or more inspection surfaces in an inspection object having light scattering property;
a light receiving optical system that is arranged in parallel with a scanning direction of the illumination optical system such that the light source and one pixel unit including at least one light receiving element have a one-to-one correspondence, and includes a plurality of light receiving elements that receive scattered light, diffused light, or light having intensity after absorption/diffuse reflection or transmission and diffusion from a foreign substance or a defect in the inspection object after the foreign substance or the defect is irradiated with the light beam transmitted through an inspection surface of the inspection object; and
detecting means that causes a light beam from the light source at an optional position in a main scanning direction of the illumination optical system to be detected only by a corresponding light receiving element, wherein
a spatial resolution of the one pixel unit including at least one light receiving element is equal to or higher than a spatial resolution of the light beam formed by the illumination optical system on an inspection surface of an inspection object, and
the illumination optical system includes a light guiding means for guiding to an inspection object by reducing an interval between optical axis of light beams emitted from the plurality of light sources in an arrangement direction of the plurality of light sources.

2. The foreign substance/defect inspection device according to claim 1, wherein: the light guiding means includes an optical fiber array having a plurality of optical fibers on which light beams emitted from the plurality of light sources are incident, and an interval between emission ends of optical fibers is smaller than an interval between incidence ends of the optical fibers; the light guiding means includes a plurality of collimator lenses that collimate emitted light from optical fibers in a one-to-one correspondence with emission ends of the optical fibers, and the plurality of collimator lenses are arranged as many as the plurality of light sources, and an arrangement direction of the collimator lenses coincides with an arrangement direction of the light receiving elements.

3. The foreign substance/defect inspection device according to claim 2, wherein: the light guiding means includes a reduction combination lens including a combination of a plurality of lenses arranged between the optical fiber array and the inspection object or a reduction combination lens including a combination of a plurality of lenses arranged between the plurality of light sources and an inspection object, and an interval between optical axes of light beams emitted through the reduction combination lens is smaller than an interval between optical axes of the light beams incident on the reduction combination lens.

4. The foreign substance/defect inspection device according to claim 1, wherein:
the light receiving optical system includes an enlargement combination lens including a combination of a plurality of lenses arranged between an inspection object and the plurality of light receiving elements,
an interval between optical axes of light beams emitted through the enlargement combination lens is larger than an interval between optical axes of the light beams incident on the enlargement combination lens, and
the enlargement combination lens has a magnification ratio by which an interval between optical axes of light beams emitted through the enlargement combination lens is enlarged so as to match an interval between the light receiving elements.

5. The foreign substance/defect inspection device according to claim 1, wherein:
a scanning interval of the light beam of the illumination optical system is equal to or less than a spatial resolution of a pixel unit including at least one light receiving element arranged in a main scanning direction.

6. The foreign substance/defect inspection device according to claim 1, wherein:
size of the collimated light beam or a light beam obtained by further substantially concentrating a collimated light beam is 10 µm or more and 1000 µm or less, and size of the light receiving element satisfies 200 dpi or more.

7. The foreign substance/defect inspection device according to claim 1, wherein:
an inspection object is a medium having property of transmitting light emitted from the light source.

8. The foreign substance/defect inspection device according to claim 1, wherein:
the detecting means outputs a signal only for a light receiving element near a central portion of the light beam at each scanning position in the plurality of light receiving elements in synchronization with scanning with the light beam in the illumination optical system.

9. The foreign substance/defect inspection device according to claim 1, further comprising:
a plurality of combinations of the light source and the at least one light receiving element of one pixel unit with respect to one inspection surface of the inspection object.

10. The foreign substance/defect inspection device according to claim 1, wherein:
the light source of the illumination optical system is a light source including at least one LD or at least one LED, and scanning with a light beam obtained by collimating a light beam emitted from the light source or a light beam obtained by further substantially concentrating a collimated light beam can be performed in an arrangement direction of the plurality of light receiving elements on the inspection surface of the inspection object.

11. The foreign substance/defect inspection device according to claim 1, wherein:
a set of the illumination optical system and the light receiving optical system is movable in an optical axis direction.

12. The foreign substance/defect inspection device according to claim 1, wherein:
the light receiving element is a line sensor or an area sensor.

13. The foreign substance/defect inspection device according to claim 1, wherein:
the light receiving optical system includes a lens array,
the lens array includes a multi-eye lens having a one-to-one correspondence with each pixel, and
an aperture corresponding to each pixel in a one-to-one manner is provided between the multi-eye lens and each pixel, and each of the apertures is located on an optical axis of each light source.

14. The foreign substance/defect inspection device according to claim 1, wherein:
an aperture angle of a light receiving lens system is 1 mrad to 20 mrad with respect to an incident angle on the light receiving lens system of scattered light generated by light scattering in light transmitted through the inspection surface, diffused light, or light having intensity after absorption/diffuse reflection or transmission and diffusion.

15. The foreign substance/defect inspection device according to claim 1, further comprising:
the light source having at least one wavelength,
wherein the light source arranged to be separated linearly includes a plurality of linear light sources having a plurality of lines and a same wavelength or linear light sources having a plurality of different wavelengths, and further comprises,
at least one inspection surface of the inspection object and at least one depth of field region in an optical axis direction.

16. A foreign substance/defect inspection method, comprising the steps of:
scanning with a light beam by an illumination optical system including optical scanning means that performs scanning with a) a light beam obtained by collimating light emitted from a plurality of light sources arranged to be separated linearly with respect to at least one or more inspection surfaces in an inspection object having light scattering property, or a light beam obtained by further substantially concentrating a collimated light beam, or b) a light beam obtained by adjusting to narrow, or a light beam obtained by adjusting to expand, light emitted from a plurality of light sources arranged to be separated linearly with respect to at least one or more inspection surfaces in an inspection object having light scattering property;
receiving a light beam by a light receiving optical system that is arranged in parallel with a scanning direction of the illumination optical system such that the light source and one pixel unit including at least one light receiving element have a one-to-one correspondence, and includes a plurality of light receiving elements that receive scattered light, diffused light, or light having intensity after absorption/diffuse reflection or transmission and diffusion from a foreign substance or a defect in the inspection object after the foreign substance or the defect is irradiated with the light beam transmitted through an inspection surface of the inspection object; and causing a light beam from the light source at an optional position in a main scanning direction of the illumination optical system to be detected only by a corresponding light receiving element, wherein a spatial resolution of the one pixel unit including at least one light receiving element is equal to or higher than a spatial resolution of the light beam formed by the illumination optical system on an inspection surface of an inspection object, and the illumination optical system includes a light guiding means for guiding to an inspection object by reducing an interval between optical axis of light beams emitted from the plurality of light sources in an arrangement direction of the plurality of light sources.

17. The foreign substance/defect inspection method according to claim 16, wherein:

the light guiding means includes an optical fiber array having a plurality of optical fibers on which light beams emitted from the plurality of light sources are incident, an interval between emission ends of optical fibers is smaller than an interval between incidence ends of the optical fibers, the light guiding means includes a plurality of collimator lenses that collimate emitted light from optical fibers in a one-to-one correspondence with emission ends of the optical fibers, and the plurality of collimator lenses are arranged as many as the plurality of light sources, and an arrangement direction of the collimator lenses coincides with an arrangement direction of the light receiving elements.

18. The foreign substance/defect inspection method according to claim 17, wherein:

the light guiding means includes a reduction combination lens including a combination of a plurality of lenses arranged between the optical fiber array and the inspection object or a reduction combination lens including a combination of a plurality of lenses arranged between the plurality of light sources and an inspection object, and an interval between optical axes of light beams emitted through the reduction combination lens is smaller than an interval between optical axes of the light beams incident on the reduction combination lens.

19. The foreign substance/defect inspection method according to claim 18, wherein:

the illumination optical system includes an enlargement combination lens including a combination of a plurality of lenses arranged between an inspection object and the plurality of light receiving elements, an interval between optical axes of light beams emitted through the enlargement combination lens is larger than an interval between optical axes of the light beams incident on the enlargement combination lens, and the enlargement combination lens has a magnification ratio by which an interval between optical axes of light beams emitted through the enlargement combination lens is enlarged so as to match an interval between the light receiving elements.

20. The foreign substance/defect inspection method according to claim 16, wherein:

a scanning interval of the light beam of the illumination optical system is equal to or less than a spatial resolution of a pixel unit including at least one light receiving element arranged in a main scanning direction.

21. The foreign substance/defect inspection method according to claim 16, further comprising:

the light source having at least one wavelength, wherein the light source arranged to be separated linearly includes a plurality of linear light sources having a plurality of lines and a same wavelength or linear light sources having a plurality of different wavelengths, and further comprises at least one inspection surface of the inspection object and at least one depth of field region in an optical axis direction.

* * * * *